(12) United States Patent
Yamazaki et al.

(10) Patent No.: US 11,923,707 B2
(45) Date of Patent: Mar. 5, 2024

(54) BATTERY PROTECTION CIRCUIT, POWER STORAGE DEVICE, AND ELECTRIC DEVICE

(71) Applicant: Semiconductor Energy Laboratory Co., Ltd., Kanagawa-ken (JP)

(72) Inventors: Shunpei Yamazaki, Tokyo (JP); Takayuki Ikeda, Kanagawa (JP); Munehiro Kozuma, Kanagawa (JP); Takanori Matsuzaki, Kanagawa (JP); Akio Suzuki, Kanagawa (JP); Seiya Saito, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 368 days.

(21) Appl. No.: 17/293,215

(22) PCT Filed: Nov. 6, 2019

(86) PCT No.: PCT/IB2019/059520
§ 371 (c)(1),
(2) Date: May 12, 2021

(87) PCT Pub. No.: WO2020/099984
PCT Pub. Date: May 22, 2020

(65) Prior Publication Data
US 2022/0052535 A1    Feb. 17, 2022

(30) Foreign Application Priority Data

Nov. 16, 2018 (JP) .................................. 2018-215129
Nov. 30, 2018 (JP) .................................. 2018-224703
Dec. 21, 2018 (JP) .................................. 2018-239482

(51) Int. Cl.
*H02J 7/00* (2006.01)

(52) U.S. Cl.
CPC ........ *H02J 7/0029* (2013.01); *H02J 7/00712* (2020.01)

(58) Field of Classification Search
CPC ...................................................... H02J 7/0029
(Continued)

(56) References Cited

U.S. PATENT DOCUMENTS 4,532,443 A    7/1985   Glennon
8,467,825 B2   6/2013   Kato et al.
(Continued)

FOREIGN PATENT DOCUMENTS

CN    103367820 A    10/2013
CN    105552852 A    5/2016
(Continued)

OTHER PUBLICATIONS

International Search Report (Application No. PCT/IB2019/059520) dated Feb. 4, 2020.
(Continued)

*Primary Examiner* — Yalkew Fantu
(74) *Attorney, Agent, or Firm* — Husch Blackwell LLP

(57) ABSTRACT

A battery protection circuit with a novel configuration and a power storage device including the battery protection circuit are provided. The battery protection circuit includes a switch circuit for controlling charge and discharge of a battery cell; the switch circuit includes a mechanical relay, a first transistor, and a second transistor; the switch circuit has a function of controlling electrical connection between a first terminal and a second terminal; the mechanical relay has a function of breaking electrical connection between the first terminal and the second terminal; the first transistor has a function of supplying first current between the first terminal and the second terminal; the second transistor has a function of supplying second current between the first terminal and
(Continued)

the second terminal; and the first current is higher than the second current.

20 Claims, 38 Drawing Sheets

(58) Field of Classification Search
USPC .......................................................... 320/128
See application file for complete search history.

(56) References Cited

U.S. PATENT DOCUMENTS

| | | | |
|---|---|---|---|
| 8,892,158 | B2 | 11/2014 | Kato et al. |
| 9,231,283 | B2 | 1/2016 | Ikeuchi et al. |
| 9,373,643 | B2 | 6/2016 | Kato et al. |
| 9,741,867 | B2 | 8/2017 | Kato et al. |
| 9,935,451 | B2 | 4/2018 | Ikeuchi et al. |
| 10,121,904 | B2 | 11/2018 | Kato et al. |
| 10,355,499 | B2 | 7/2019 | Takeda et al. |
| 10,404,082 | B2 | 9/2019 | Ono |
| 2007/0041142 | A1 | 2/2007 | Lal et al. |
| 2011/0267726 | A1 | 11/2011 | Ikeuchi et al. |
| 2013/0265010 | A1 | 10/2013 | Nomura et al. |
| 2016/0118821 | A1 | 4/2016 | Takeda et al. |
| 2016/0301224 | A1* | 10/2016 | Kim ..................... H01M 10/443 |
| 2016/0344206 | A1* | 11/2016 | Ono ....................... H02J 7/0031 |
| 2017/0244239 | A1* | 8/2017 | Jin ........................ H02J 7/0029 |

FOREIGN PATENT DOCUMENTS

| | | |
|---|---|---|
| GB | 2 152 779 A | 8/1985 |
| JP | 60-501682 | 10/1985 |
| JP | 2010-187532 A | 8/2010 |
| JP | 2011-129891 A | 6/2011 |
| JP | 2013-233072 A | 11/2013 |
| JP | 5888387 B1 | 3/2016 |
| JP | 2016-082832 A | 5/2016 |
| JP | 2016-220389 A | 12/2016 |
| JP | 2017-228532 A | 12/2017 |
| JP | 2018-161049 A | 10/2018 |
| KR | 2013-0113979 A | 10/2013 |
| KR | 2016-0047382 A | 5/2016 |
| TW | 201351833 | 12/2013 |
| WO | WO 1985/000253 A1 | 1/1985 |
| WO | WO-2011/062042 | 5/2011 |

OTHER PUBLICATIONS

Written Opinion (Application No. PCT/IB2019/059520) dated Feb. 4, 2020.

* cited by examiner

T1

T2

T3

BATTERY PROTECTION CIRCUIT, POWER STORAGE DEVICE, AND ELECTRIC DEVICE

This application is a 371 of international application PCT/IB2019/059520 filed on Nov. 6, 2019 which is incorporated herein by reference.

TECHNICAL FIELD

One embodiment of the present invention relates to a battery protection circuit, a power storage device, and an electric device.

BACKGROUND ART

Power storage devices (also referred to as batteries or secondary batteries) have been utilized in a wide range of areas from small electric devices to automobiles. The power storage devices are each usually provided with a battery protection circuit for detecting an abnormality at charge and discharge, such as overdischarge, overcharge, overcurrent, or a short circuit.

The battery protection circuit acquires data of voltage, current, and the like to detect an abnormality at charge or discharge. The battery protection circuit controls opening and closing of a switch provided in a charge path or a discharge path, on the basis of the observed data, thereby preventing overcharge or overdischarge of a battery cell (e.g., see Patent Document 1).

REFERENCE

Patent Document

[Patent Document 1] Specification of United States Patent Application Publication No. 2016-118821

SUMMARY OF THE INVENTION

Problems to be Solved by the Invention

It is favorable that the switch provided in the charge path or the discharge path is able to more surely shut off current when no current should be supplied to a load. In addition, it is favorable that the switch provided in the charge path or the discharge path allows large current supply when current should be supplied to the load.

An object of one embodiment of the present invention is to provide a novel battery protection circuit, a novel power storage device, a novel electric device, and the like. Alternatively, an object of one embodiment of the present invention is to provide a battery protection circuit, a power storage device, an electric device, and the like with a novel configuration capable of both shutting off current and supplying a high current.

Note that the objects of one embodiment of the present invention are not limited to the objects listed above. The objects listed above do not preclude the existence of other objects. Note that the other objects are objects that are not described in this section and will be described below. The objects that are not described in this section will be derived from the description of the specification, the drawings, and the like and can be extracted as appropriate from the description by those skilled in the art. Note that one embodiment of the present invention is to solve at least one of the objects listed above and/or the other objects.

Means for Solving the Problems

One embodiment of the present invention is a battery protection circuit which includes a switch circuit for controlling charge and discharge of a battery cell and in which the switch circuit includes a mechanical relay, a first transistor, and a second transistor; the switch circuit has a function of controlling electrical connection between a first terminal and a second terminal; the mechanical relay has a function of breaking electrical connection between the first terminal and the second terminal; the first transistor has a function of supplying first current between the first terminal and the second terminal; the second transistor has a function of supplying second current between the first terminal and the second terminal; and the first current is higher than the second current.

One embodiment of the present invention is a battery protection circuit which includes a switch circuit for controlling charge and discharge of a battery cell and in which the switch circuit includes a mechanical relay, a first transistor, and a second transistor; the switch circuit has a function of controlling electrical connection between a first terminal and a second terminal; the mechanical relay has a function of breaking electrical connection between the first terminal and the second terminal; the first transistor has a function of supplying first current between the first terminal and the second terminal; the first transistor includes a semiconductor layer including a channel formation region and formed of silicon; the second transistor has a function of supplying second current between the first terminal and the second terminal; the second transistor includes a semiconductor layer including a channel formation region and formed of an oxide semiconductor; and the first current is higher than the second current.

In the battery protection circuit in one embodiment of the present invention, it is preferable that the first current and the second current be on-state current flowing between sources and drains of the first transistor and the second transistor.

In the battery protection circuit in one embodiment of the present invention, it is preferable that first off-state current flowing between the source and the drain of the first transistor during off operation thereof be higher than second off-state current flowing between the source and the drain of the second transistor during off operation thereof.

One embodiment of the present invention is a battery protection circuit which includes a switch circuit for controlling charge and discharge of a battery cell and in which the switch circuit has a function of controlling electrical connection between a first terminal and a second terminal; the switch circuit includes a first transistor; the first transistor includes a back gate electrode; the first transistor is capable of switching first current and second current flowing between the first terminal and the second terminal during on operation, by control of voltage applied to the back gate electrode; and the first current is higher than the second current.

One embodiment of the present invention is a power storage device which includes a battery cell and a switch circuit for controlling charge and discharge of the battery cell and in which the switch circuit includes a mechanical relay, a first transistor, and a second transistor; the switch circuit has a function of controlling electrical connection between a first terminal and a second terminal; the mechanical relay has a function of breaking electrical connection between the first terminal and the second terminal; the first transistor has a function of supplying first current between the first terminal and the second terminal; the second transistor has a function of supplying second current between the first terminal and the second terminal; and the first current is higher than the second current.

One embodiment of the present invention is a power storage device which includes a battery cell and a switch circuit for controlling charge and discharge of the battery cell and in which the switch circuit includes a mechanical relay, a first transistor, and a second transistor; the switch circuit has a function of controlling electrical connection between a first terminal and a second terminal; the mechanical relay has a function of breaking electrical connection between the first terminal and the second terminal; the first transistor has a function of supplying first current between the first terminal and the second terminal; the first transistor includes a semiconductor layer including a channel formation region and formed of silicon; the second transistor has a function of supplying second current between the first terminal and the second terminal; the second transistor includes a semiconductor layer including a channel formation region and formed of an oxide semiconductor; and the first current is higher than the second current.

In the power storage device in one embodiment of the present invention, it is preferable that the first current and the second current be on-state current flowing between sources and drains of the first transistor and the second transistor.

In the power storage device in one embodiment of the present invention, it is preferable that first off-state current flowing between the source and the drain of the first transistor during off operation thereof be higher than second off-state current flowing between the source and the drain of the second transistor during off operation thereof.

One embodiment of the present invention is a power storage device which includes a battery cell and a switch circuit for controlling charge and discharge of the battery cell and in which the switch circuit has a function of controlling electrical connection between a first terminal and a second terminal; the switch circuit includes a first transistor; the first transistor includes a back gate electrode; the first transistor is capable of switching first current and second current flowing between the first terminal and the second terminal during on operation, by control of voltage applied to the back gate electrode; and the first current is higher than the second current.

In one embodiment of the present invention, the above power storage device is preferably a power storage device which includes a battery protection circuit for controlling the switch circuit and a charge control circuit for switching a charge mode of the battery cell and in which the first transistor has a function of controlling the amount of current flowing between the first terminal and the second terminal, and the battery protection circuit controls the amount of the current in accordance with a signal of the charge control circuit.

In the power storage device in one embodiment of the present invention, it is preferable that the battery protection circuit have a function of controlling the amount of the current such that the charge mode is switched from a constant current charge mode to a constant voltage charge mode.

In the power storage device in one embodiment of the present invention, it is preferable that the first transistor include an oxide semiconductor in a channel formation region.

One embodiment of the present invention is an electric device which includes the above-described power storage device and a housing.

Note that other embodiments of the present invention are shown in the description of the following embodiments and the drawings.

Effect of the Invention

One embodiment of the present invention can provide a novel battery protection circuit, a novel power storage device, a novel electric device, and the like. Alternatively, one embodiment of the present invention can provide a battery protection circuit, a power storage device, an electric device, and the like with a novel configuration capable of both shutting off current and supplying a high current. This makes it possible to prevent a state of charge to voltage exceeding voltage that causes overcharge or a state of discharge to voltage exceeding overdischarge voltage.

Note that the effects of one embodiment of the present invention are not limited to the effects listed above. The effects listed above do not preclude the existence of other effects. Note that the other effects are effects that are not described in this section and will be described below. The other effects that are not described in this section will be derived from the description of the specification, the drawings, and the like and can be extracted as appropriate from the description by those skilled in the art. Note that one embodiment of the present invention is to have at least one of the effects listed above and/or the other effects. Accordingly, depending on the case, one embodiment of the present invention does not have the effects listed above in some cases.

MODE FOR CARRYING OUT THE INVENTION

Figure 1A:
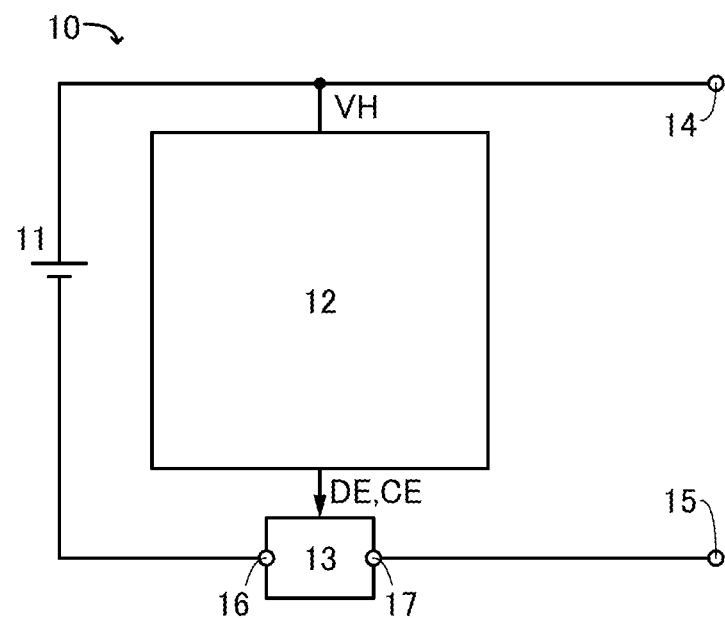
FIG. 1A and FIG. 1B are a block diagram and a circuit diagram illustrating one embodiment of the present invention.

Hereinafter, embodiments will be described with reference to the drawings. Note that the embodiments can be implemented with many different modes, and it will be readily understood by those skilled in the art that modes and details thereof can be changed in various ways without departing from the spirit and scope thereof. Thus, the present invention should not be construed as being limited to the following description of the embodiments.

Note that ordinal numbers such as "first," "second," and "third" in this specification and the like are used in order to avoid confusion among components. Thus, the ordinal numbers do not limit the number of components. In addition, the ordinal numbers do not limit the order of components. Furthermore, in this specification and the like, for example, a "first" component in one embodiment can be referred to as a "second" component in other embodiments or claims. Moreover, in this specification and the like, for example, a "first" component in one embodiment can be omitted in other embodiments or claims.

Note that in the drawings, the same elements, elements having similar functions, elements formed of the same material, elements formed at the same time, or the like are sometimes denoted by the same reference numerals, and repeated description thereof is omitted in some cases.

Embodiment 1

Configurations of a battery protection circuit and a power storage device including the battery protection circuit that are embodiments of the present invention will be described with reference to FIG. 1 to FIG. 12.

FIG. 1A shows an example of a block diagram of the power storage device including the battery protection circuit. A power storage device 10 illustrated in FIG. 1 includes a battery cell 11, a battery protection circuit 12, and a switch circuit 13.

In the power storage device 10, a charge circuit for performing charge and/or a load for supplying power is/are provided between a terminal 14 and a terminal 15. The charge circuit is a circuit supplying current for charging the battery cell (charge current). The load is a circuit driven with current that flows by discharge of the battery cell (discharge current).

Although described as a single battery cell, the battery cell 11 may be a combination of a plurality of battery cells. Note that although described as a lithium-ion secondary battery cell, the battery cell 11 is not limited to a lithium-ion secondary battery cell, and a material containing an element A, an element X, and oxygen can be used as a positive electrode material for a secondary battery, for example. The element A is one or more selected from the Group 1 elements and the Group 2 elements. As the Group 1 element, for example, an alkali metal such as lithium, sodium, or potassium can be used. In addition, as the Group 2 element, for example, calcium, beryllium, magnesium, or the like can be used. As the element X, for example, one or more selected from metal elements, silicon, and phosphorus can be used. Moreover, the element X is one or more selected from cobalt, nickel, manganese, iron, and vanadium. Typical examples include lithium-cobalt composite oxide $LiCoO_3$ and lithium iron phosphate $LiFePO_4$.

The battery protection circuit 12 has a function of generating a signal DE and a signal CE for controlling the switch circuit 13 for controlling charge current and discharge current. For example, the signal DE (a plurality of signals DE are referred to as signals DE1 and DE2) is a signal for controlling discharge. The signal CE (a plurality of signals CE are referred to as signals CE1 and CE2) is a signal for controlling charge. The battery protection circuit 12 has a function of monitoring current flowing between the terminal 14 and the terminal 15 or voltage between the terminals (e.g., voltage VH of the terminal 14) and generating the signal DE and the signal CE on the basis of obtained voltage.

The switch circuit 13 is provided in series with the battery cell 11. The switch circuit 13 has a function of controlling charge current and discharge current flowing in the power storage device 10, in accordance with the signal DE and the signal CE. Specifically, the switch circuit 13 has a function of controlling electrical connection between a terminal 16 and a terminal 17. Note that the switch circuit 13 operates in a manner to prevent overcurrent or overvoltage in the battery cell 11 in cooperation with the battery protection circuit 12. Thus, in this specification and the drawings, the battery protection circuit 12 and the switch circuit 13 are sometimes collectively referred to as a battery protection circuit. In that case, the switch circuit 13 is sometimes described as being included in the battery protection circuit 12.

Figure 1B:
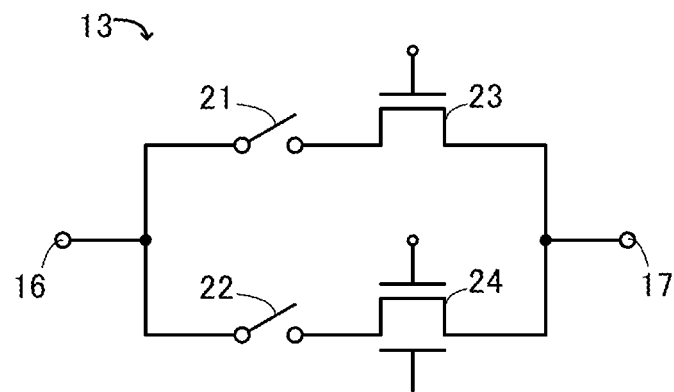

FIG. 1B is a circuit specifically exemplifying the switch circuit 13. The switch circuit 13 illustrated in FIG. 1B includes a mechanical relay 21, a mechanical relay 22, a transistor 23, and a transistor 24. The mechanical relay 21, the mechanical relay 22, the transistor 23, and the transistor 24 are independently controlled to be on or off in accordance with the signal DE or the signal CE.

The mechanical relays 21 and 22 include contacts and have a function of mechanically opening and closing the contacts by electromagnetic action to control whether or not to shut off current. The mechanical relays 21 and 22 each include a coil portion that receives an electrical signal and produces mechanical motion in accordance with the received electrical signal and a contact portion that converts electricity into opening and closing motion. The coil portion and the contact portion are physically apart from each other, which allows the mechanical relays 21 and 22 to ensure insulation between two terminals. In other words, no current flows when the mechanical relays 21 and 22 are switched off. Note that the mechanical relays 21 and 22 are shown as switches in the drawings and the like because they have a function of switching electrical connection between the two terminals.

The transistor 23 is a transistor in which a semiconductor layer including a channel formation region is formed of silicon (referred to as a Si transistor). As a material used for a Si transistor, single crystal silicon and non-single crystal silicon (e.g., polycrystalline silicon or the like) can be used. Use of single crystal silicon for a Si transistor can increase the current flowing between the source and the drain in an on state (also referred to as on-state current). Note that besides silicon, a semiconductor such as germanium (Ge) and a compound semiconductor such as GaAs, InP, SiC, ZnSe, GaN, or SiGe can also be used as a material for the semiconductor layer. Note that the transistor 23 has a function of a transistor that is designed so as to supply current to the load, and is referred to as a power MOSFET in some cases.

The transistor 24 is a transistor in which a semiconductor layer including a channel formation region is formed of an oxide semiconductor (referred to as an OS transistor). The oxide semiconductor, when having a low carrier density, can make the current flowing between the source and the drain in an off state (also referred to as off-state current or leakage current) extremely low. The details of an OS transistor will be described in a later embodiment. Note that although the transistor 24 is represented by a circuit symbol having a back gate in FIG. 1B, the transistor 24 may have a structure with no back gate. Note that the transistor 24 has a function of a transistor that is designed so as to supply current to the load, and is referred to as a power MOSFET in some cases.

An OS transistor can freely be placed by being stacked over a circuit using a Si transistor or the like, which facilitates integration. Furthermore, an OS transistor can be manufactured with a manufacturing apparatus similar to that for a Si transistor and thus can be manufactured at low cost.

In addition, when an OS transistor has a back gate electrode in addition to a gate electrode, a source electrode, and a drain electrode, the OS transistor can be a four-terminal semiconductor element. An electric circuit network that can independently control input and output of signals flowing between a source and a drain depending on a voltage applied to the gate electrode or the back gate electrode can be constituted. Thus, circuit design with the same ideas as those of an LSI is possible. Furthermore, electrical characteristics of the OS transistor are better than those of a Si transistor in a high-temperature environment. Specifically, the ratio between on-state current and off-state current is large even at a high temperature higher than or equal to 100° C. and lower than or equal to 200° C., preferably higher than or equal to 125° C. and lower than or equal to 150° C.; thus, favorable switching operation can be performed.

Next, operation of the switch circuit 13 illustrated in FIG. 1B will be described with reference to the circuit diagrams shown in FIG. 2A to FIG. 2D, FIG. 3A and FIG. 3B, and FIG. 4A and FIG. 4B.

Figure 2A:
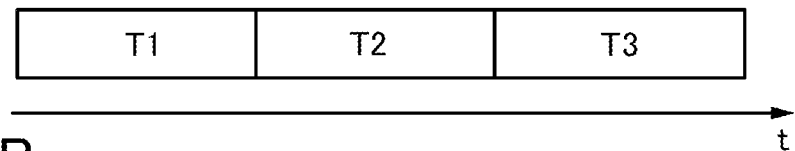
FIG. 2A, FIG. 2B, FIG. 2C, and FIG. 2D are drawings illustrating one embodiment of the present invention.

FIG. 2A is a drawing for illustrating three possible states of the power storage device 10. A period T1 corresponds to a period in which the switch circuit 13 is switched so that a high current flows to the load. A period T2 corresponds to a period in which it is possible to switch between control for performing control to supply current to the load and control to make the current flowing in the switch circuit 13 extremely low. A period T3 corresponds to a period for control such that the current flowing between the terminals (the terminals 16 and 17) of the switch circuit 13 becomes extremely low.

Figure 2B:
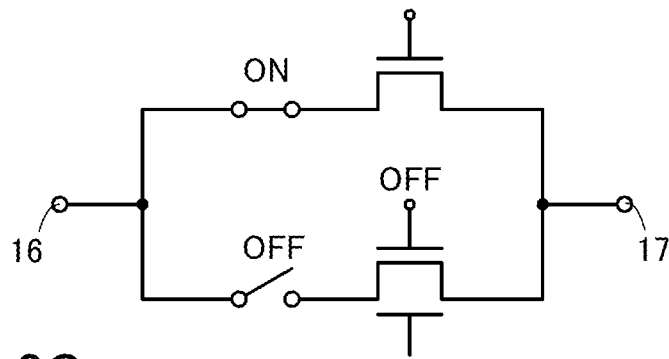

FIG. 2B is a drawing for illustrating the operation in the period T1. The mechanical relay 21 is configured to be turned on in the period T1. In the period T1, the mechanical relay 22 and the transistor 24 are turned off.

Figure 3A:
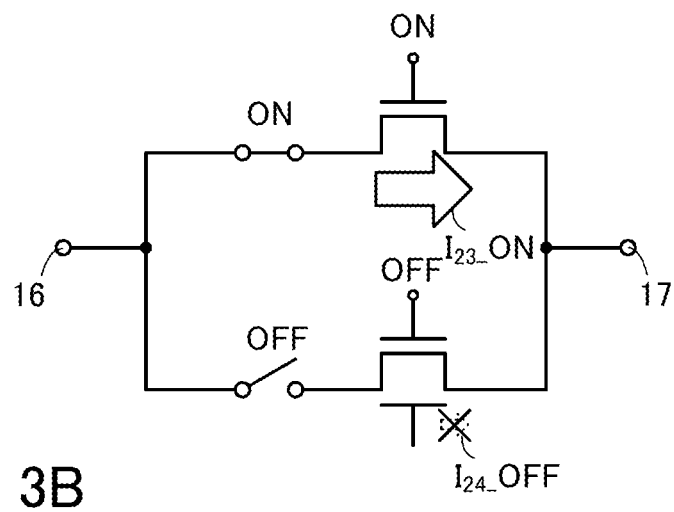
FIG. 3A and FIG. 3B are circuit diagrams illustrating one embodiment of the present invention.
Figure 3B:
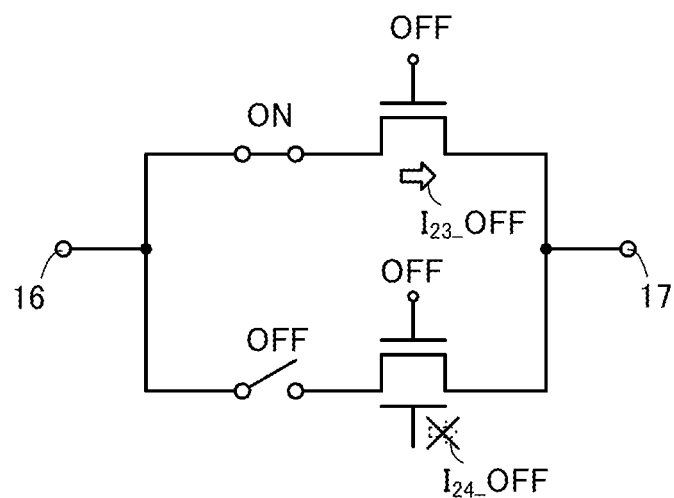

When the mechanical relay 21, the mechanical relay 22, and the transistor 24 are switched as illustrated in the FIG. 2B, the switch circuit 13 can control shutting off of current on the basis of on/off of the transistor 23. That is, when the transistor 23 is on as illustrated in FIG. 3A, current $I_{23\_ON}$ can be supplied to the transistor 23 that is a Si transistor. At this time, the mechanical relay 22 and the transistor 24 are off and thus, current $I_{24\_OFF}$ flowing in the transistor 24 is extremely low. In contrast, when the transistor 23 is off as illustrated in FIG. 3B, current $I_{23\_OFF}$ that is off-state current flows in the transistor 23, which is a Si transistor. At this time, the mechanical relay 22 and the transistor 24 are off and thus, the current $I_{24\_OFF}$, which is off-state current flowing in the transistor 24, is extremely low.

Figure 2C:
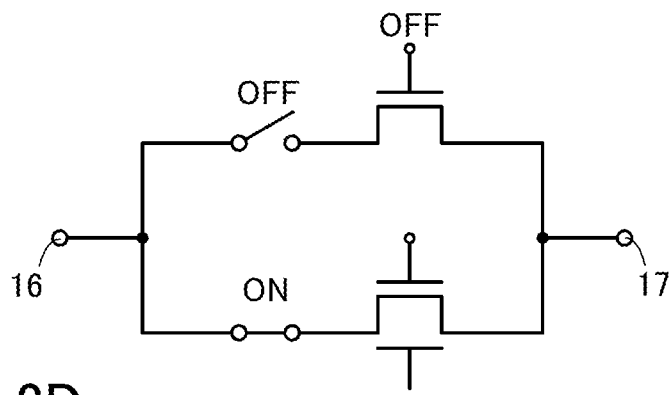

FIG. 2C is a drawing for illustrating the operation in the period T2. The mechanical relay 22 is configured to be turned on in the period T2. In the period T2, the mechanical relay 21 and the transistor 23 are turned off.

Figure 4A:
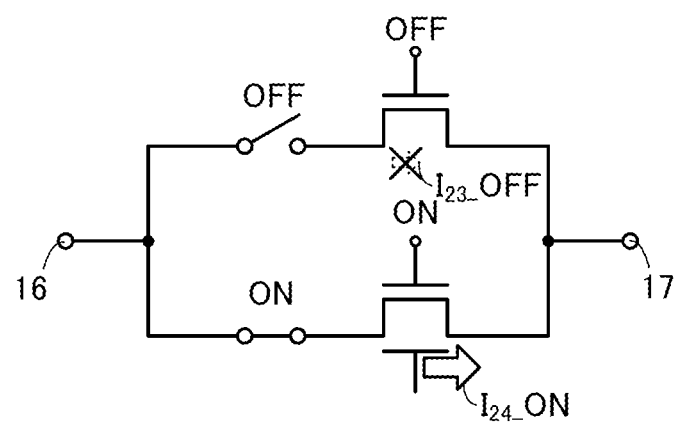
FIG. 4A and FIG. 4B are circuit diagrams illustrating one embodiment of the present invention.
Figure 4B:
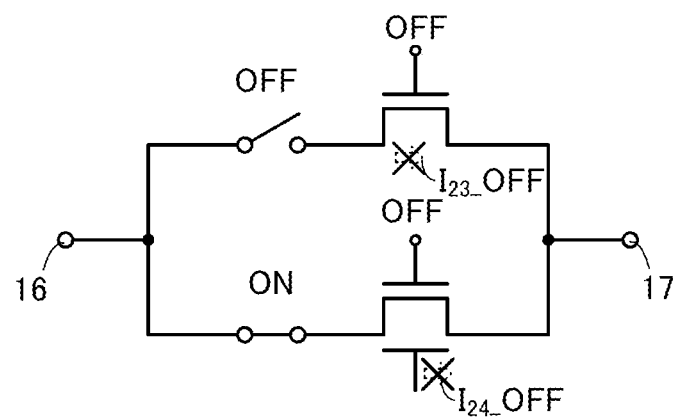

When the mechanical relay 21, the mechanical relay 22, and the transistor 23 are switched as illustrated in the FIG. 2C, the switch circuit 13 can control shutting off of current on the basis of on/off of the transistor 24. That is, when the transistor 24 is on as illustrated in FIG. 4A, current $I_{24\_ON}$ can be supplied to the transistor 23 that is an OS transistor. At this time, the mechanical relay 21 is off and thus, the current $I_{23}$_OFF flowing in the transistor 24 is extremely low. In contrast, when the transistor 24 is off as illustrated in FIG. 4B, the current $I_{24}$_OFF, which is off-state current flowing in the transistor 24, can be extremely low since it is an OS transistor. At this time, the mechanical relay 21 is off and thus, the current $I_{23}$_OFF flowing in the transistor 23 is extremely low.

Figure 2D:
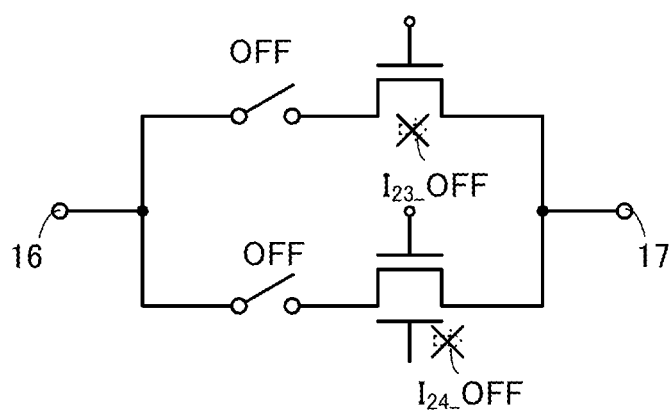

FIG. 2D is a drawing for illustrating the operation in the period T3. Both of the mechanical relays 21 and 22 are configured to be turned off in the period T3. Thus, both the current $I_{23}$_OFF flowing in the transistor 23 and the current $I_{24}$_OFF are extremely low.

In the configuration of one embodiment of the present invention, current is supplied via the mechanical relay 21 and the transistor 23. Being a Si transistor whose semiconductor layer contains single crystal silicon, the transistor 23 can have a high on-state current. The mechanical relay 21 can ensure insulation between the two terminals and thus, the current flowing between the terminals can be extremely low regardless of the off-state current of the transistor 23.

Furthermore, in the configuration of one embodiment of the present invention, current is supplied via the mechanical relay 22 and the transistor 24. Being an OS transistor whose semiconductor layer contains an oxide semiconductor, the transistor 24 can have an extremely low off-state current. The mechanical relay 22 can ensure insulation between the two terminals and thus, the current flowing between the terminals in an off state can be extremely low regardless of the off-state current of the transistor 24. Accordingly, when the transistors with different electrical characteristics are switched and used, both shutting off current flowing in the switch circuit and supplying a high current to the load can be achieved.

When a configuration is employed in which mechanical relays and transistors with different electrical characteristics are switched and operated as in the configuration of one embodiment of the present invention, the frequency of switching opening and closing of the mechanical relays can be suppressed. It is also possible to supply a high current to the load and to shut off current flowing between the terminals by utilizing the extremely low off-state current.

Furthermore, when the configuration of one embodiment of the present invention is employed, the battery cell can be charged in a short time or a high current can be supplied to the load. In addition, when the configuration of one embodiment of the present invention is employed, supplying and shutting off of current can be switched in operation without any influence of off-state current, which makes it possible to more surely prevent a state of charge to voltage exceeding voltage that causes overcharge or a state of discharge to voltage exceeding overdischarge voltage.

The configuration of the switch circuit 13 in FIG. 1B, which is described as one embodiment of the present invention, may be different. For example, the configuration of the switch circuit illustrated in FIG. 5A may be employed.

Figure 5A:
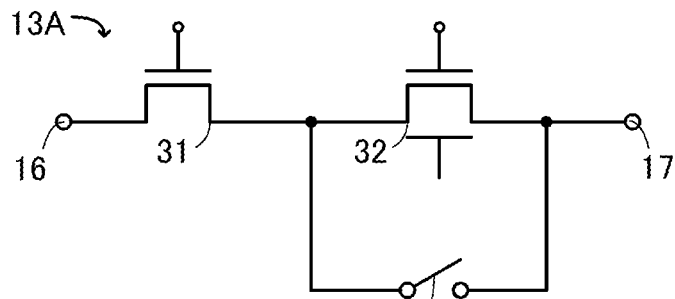
FIG. 5A, FIG. 5B, FIG. 5C, and FIG. 5D are circuit diagrams illustrating one embodiment of the present invention.

A switch circuit 13A illustrated in FIG. 5A includes a transistor 31, a transistor 32, and a mechanical relay 33. The number of mechanical relays between the terminal 16 and the terminal 17 can be smaller by one in the configuration of the switch circuit 13A illustrated in FIG. 5A than in the configuration of the switch circuit 13 in FIG. 1B.

As with FIG. 2B to FIG. 2D, FIG. 5B to FIG. 5D are drawings for the illustration corresponding to the three possible states of the power storage device 10.

Figure 5B:
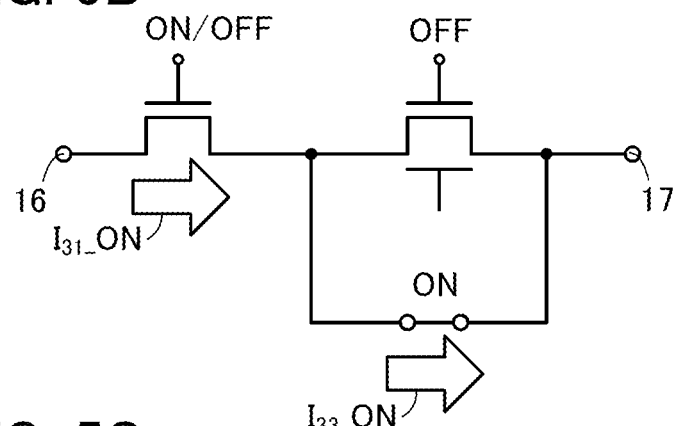

FIG. 5B illustrates the operation corresponding to the period T1 in which the switch circuit 13A is switched so that a high current flows to the load. In FIG. 5B, the mechanical relay 33 is configured to be turned on, and the current flowing between the terminals of the switch circuit 13A is controlled by turning on or off the transistor 31. Note that the transistor 32 is turned off in the period T1.

As illustrated in FIG. 5B, the switch circuit 13A can control shutting off of current on the basis of on/off of the transistor 31. That is, when the transistor 31 is turned on, current $I_{31}$_ON can be supplied to the transistor 31 that is a Si transistor. At this time, current $I_{33}$_ON which is as high as the current flowing in the transistor 31 flows in the mechanical relay 33.

Figure 5C:
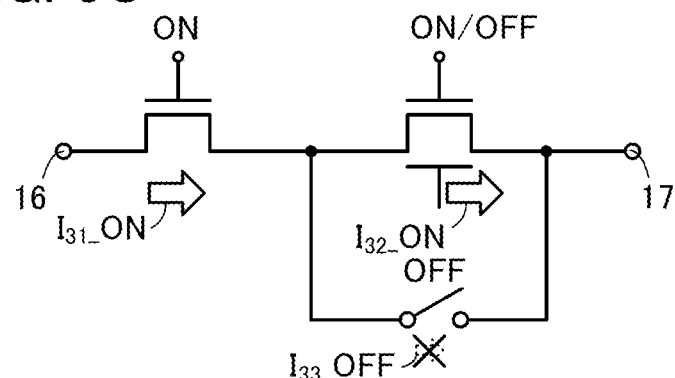

FIG. 5C illustrates the operation corresponding to the period T2 in which it is possible to switch between control for performing control to supply current to the load and control to make the current flowing in the switch circuit 13A extremely low. In FIG. 5C, the transistor 31 is configured to be turned on, and the current flowing between the terminals of the switch circuit 13A is controlled by turning on or off the transistor 32. Note that the mechanical relay 33 is turned off and the transistor 31 is turned on in the period T2. At this time, the current $I_{31}$_ON which is as high as the current flowing in the transistor 32 flows in the transistor 31.

As illustrated in FIG. 5C, the switch circuit 13A can control shutting off of current on the basis of on/off of the transistor 32. That is, when the transistor 32 is turned on, current $I_{32}$_ON can be supplied to the transistor 32 that is an OS transistor. In addition, when the transistor 32, which is an OS transistor with an extremely low off-state current, is turned off, the current between the terminal 16 and the terminal 17 is shut off.

Figure 5D:
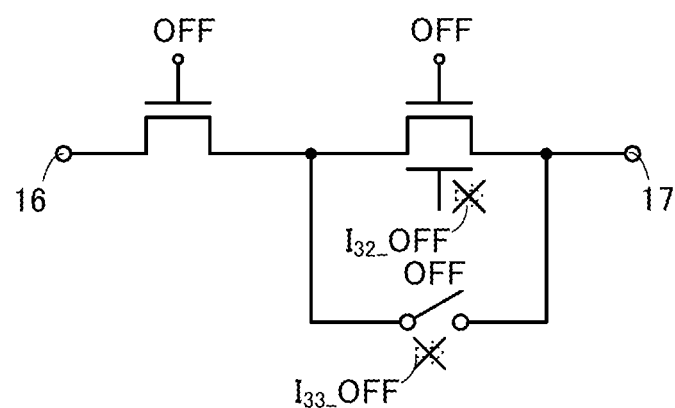

Furthermore, FIG. 5D illustrates the operation corresponding to the period T3 for control such that the current flowing between the terminals (the terminals 16 and 17) of the switch circuit 13A becomes extremely low. In FIG. 5D, the transistors 31 and 32 and the mechanical relay 33 are turned off, so that the current flowing between the terminals of the switch circuit 13A is controlled.

In the switch circuit 13A, current (current $I_{32}$_OFF and current $I_{33}$_OFF) based on off of the transistor 32 and off of the mechanical relay 33 can be shut off as illustrated in FIG. 5D. That is, when off of the transistor 32, which is an OS transistor with an extremely low off-state current, is combined with off of the mechanical relay 33, the current flowing between the terminals of the switch circuit 13A can be shut off.

Operation as illustrated in FIG. 5B to FIG. 5D can bring about function effects similar to those in FIG. 2B to FIG. 2D. When a configuration is employed in which a mechanical relay and transistors with different electrical characteristics are switched and operated as in the configuration in FIG. 5A, the frequency of switching opening and closing of the mechanical relay can be suppressed. It is also possible to supply a high current to the load and to shut off current flowing between the terminals by utilizing the extremely low off-state current.

Furthermore, when the configuration in FIG. 5A is employed, the battery cell can be charged in a short time or a high current can be supplied to the load. In addition, when the configuration of one embodiment of the present invention is employed, supplying and shutting off of current can be switched in operation without any influence of off-state current, which makes it possible to more surely prevent a state of charge to voltage exceeding voltage that causes overcharge or a state of discharge to voltage exceeding overdischarge voltage.

Control of the switch circuit 13 at the time of overcharge of the battery cell 11 in the power storage device 10 illustrated in FIG. 1A and FIG. 1B will be described with reference to FIG. 6A and FIG. 6B.

Figure 6A:
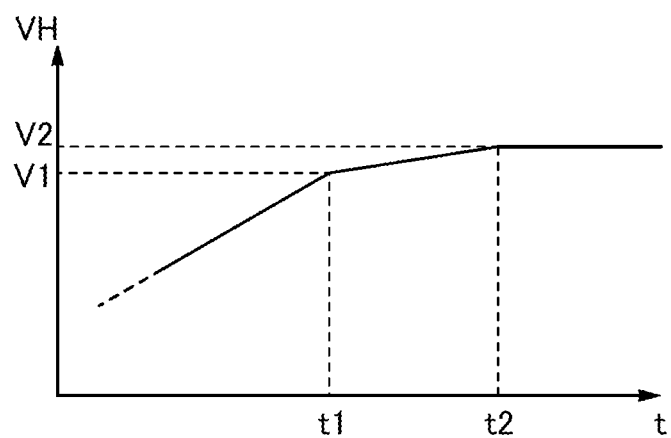
FIG. 6A and FIG. 6B are a graph and a flow chart illustrating one embodiment of the present invention.

FIG. 6A is a graph schematically showing a change in the voltage VH on the terminal 14 side at the time of overcharge. At the time of charge, the voltage VH increases to be voltage V1 at Time t1 and voltage V2 at Time t2. The voltage V1 corresponds to voltage which is set such that completion of charge is determined when the voltage is exceeded. The voltage V2 is higher than voltage 1.

Figure 6B:
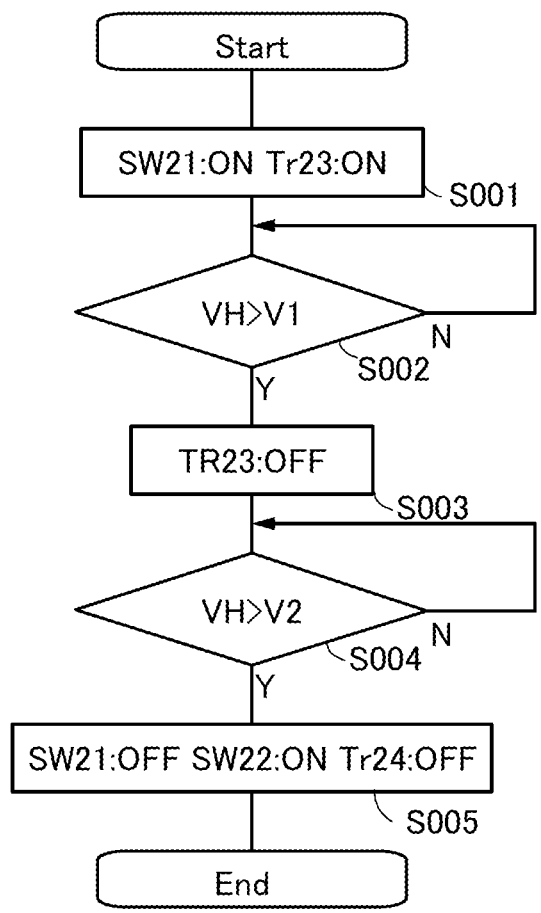

FIG. 6B is a flow chart for illustrating the operation of the switch circuit 13 at the time of the voltage change shown in FIG. 6A.

The battery protection circuit 12 performs control to turn on the mechanical relay 21 (abbreviated to SW21 in the drawing) of the switch circuit 13 and turn on the transistor 23 (abbreviated to Tr23 in the drawing) thereof in the initial state at the time of charge (Step S001). This control corresponds to the operation in the period T1 described with reference to FIG. 2A to FIG. 2D.

The battery protection circuit 12 detects whether or not the voltage VH exceeds the voltage V1 as a result of an increase in the voltage VH, to determine full charge (Step S002). When the voltage VH exceeds the voltage V1, the operation transitions to the next state.

In the case where full charge is determined in Step S002, the battery protection circuit 12 performs control to turn off the transistor 23 (Step S003). The transistor 23 is a Si transistor as described above; thus, off-state current flows even when the transistor 23 is switched off, and the voltage VH continues to increase accordingly.

The battery protection circuit 12 detects excess of the voltage VH over the voltage V2 resulting from an increase in the voltage VH, to determine the completion of charge (Step S004). When the voltage VH exceeds the voltage V2, the operation transitions to the next state.

In the case where the completion of charge is determined in Step S004, the battery protection circuit 12 performs control to turn off the mechanical relay 21, turn on the mechanical relay 22 (abbreviated to SW22 in the drawing), and turn off the transistor 24 (abbreviated to Tr24 in the drawing) (Step S005). This control corresponds to the operation in the period T2 described with reference to FIG. 2A to FIG. 2D. As described above, the transistor 24 is an OS transistor and can have an extremely low off-state current when switched off; thus, an increase in the voltage VH can be inhibited.

Control of the switch circuit 13 at the start of charge of the battery cell 11 in the power storage device 10 illustrated in FIG. 1A and FIG. 1B will be described with reference to FIG. 7A and FIG. 7B.

Figure 7A:
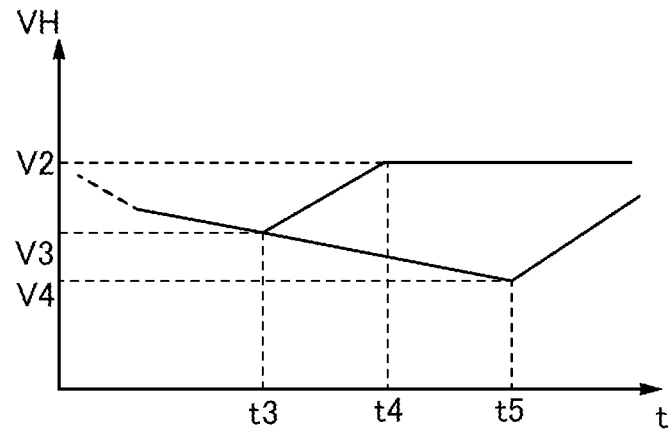
FIG. 7A and FIG. 7B are a graph and a flow chart illustrating one embodiment of the present invention.

FIG. 7A is a graph schematically showing a change in the voltage VH on the terminal 14 side at the start of charge. Before the start of charge, discharge operation such as current supply to the load decreases the voltage VH. When the voltage VH becomes voltage V3 at Time t3, charge is started. The voltage VH becomes the voltage V2 again at Time t4, and the charge is completed. In contrast, in the case where the voltage VH further decreases owing to voltage drop by discharge operation, the voltage VH becomes voltage V4 at Time t5. The voltage V3 is lower than voltage 2. The voltage V4 is lower than voltage 3.

Figure 7B:
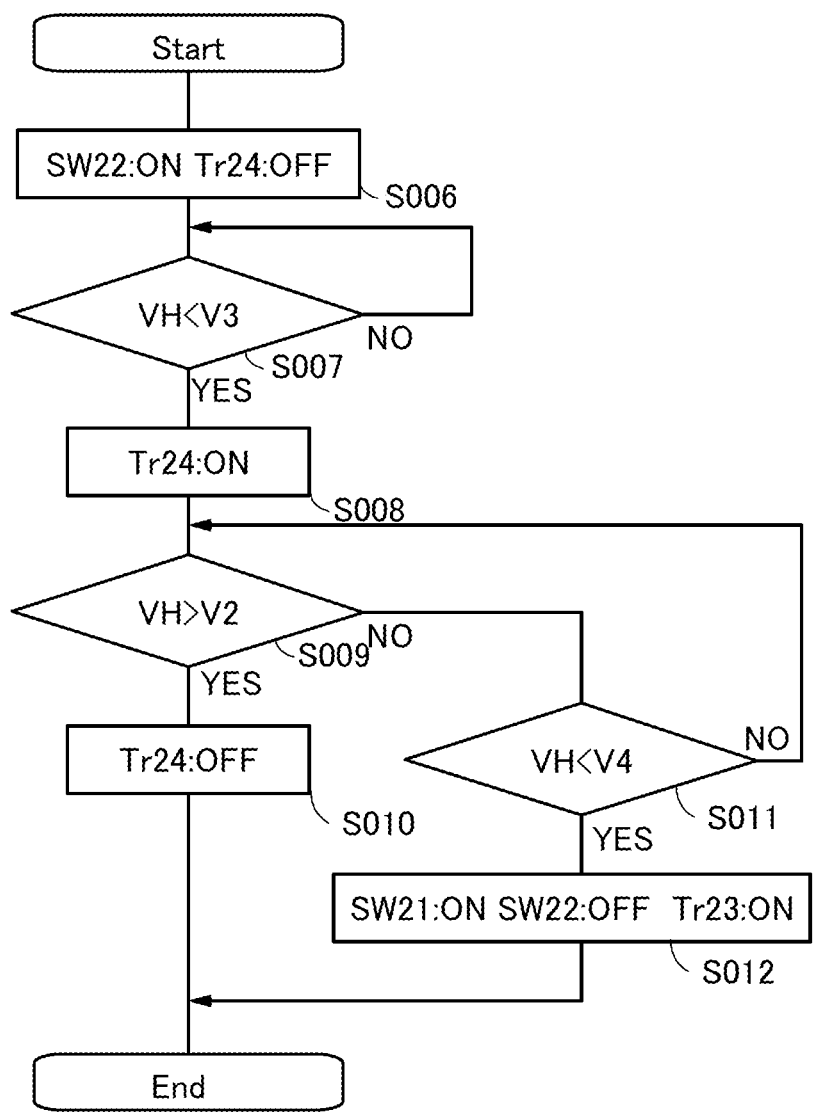

FIG. 7B is a flow chart for illustrating the operation of the switch circuit 13 at the time of the voltage change shown in FIG. 7A.

The battery protection circuit 12 performs control to turn on the mechanical relay 22 of the switch circuit 13 and turn off the transistor 24 thereof by discharge operation (Step S006). This control corresponds to the operation in the period T2 described with reference to FIG. 2A to FIG. 2D. As described above, the transistor 24 is an OS transistor and can have an extremely low off-state current when switched off; thus, a decrease in the voltage VH can be inhibited.

The battery protection circuit 12 detects the voltage VH falling below the voltage V3 as a result of a decrease in the voltage VH, to determine the start of charge (Step S007). When the voltage VH exceeds the voltage V2, the operation transitions to the next state.

In the case where the start of charge is determined in Step S007, the battery protection circuit 12 performs control to turn on the transistor 24 (Step S008). This control corresponds to the operation in the period T2 described with reference to FIG. 2A to FIG. 2D.

The battery protection circuit 12 detects whether or not the voltage VH exceeds the voltage V2 as a result of an increase in the voltage VH by turning on the transistor 24, to determine the completion of charge (Step S009). When the voltage VH exceeds the voltage V2, control to turn off the transistor 24 is performed (Step S010). As described above, the transistor 24 is an OS transistor and can have an extremely low off-state current when switched off; thus, an increase in the voltage VH can be inhibited.

In the case where the voltage VH does not increase by turning on the transistor 24 and decreases further from the voltage V3, the battery protection circuit 12 determines whether or not the voltage VH falls below the voltage V4 (Step S011). In the case where the voltage VH falls below the voltage V4, the battery protection circuit 12 performs control to turn on the mechanical relay 21, turn off the mechanical relay 22, and turn on the transistor 23 (Step S012). This control corresponds to the operation in the period T1 described with reference to FIG. 2A to FIG. 2D. As described above, the transistor 23 is a Si transistor and when switched on, can have a current higher than that flowing in an OS transistor; thus, the voltage VH can be increased even when large voltage drop is caused by discharge operation.

Figure 8A:
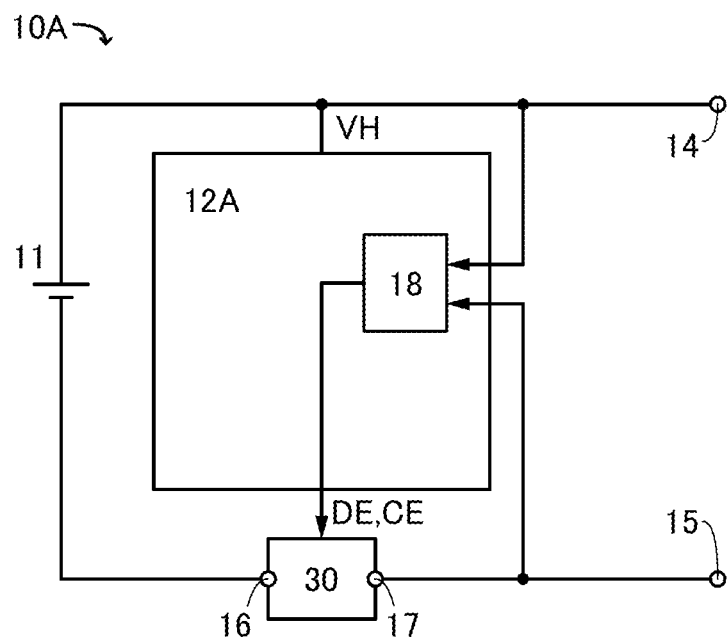
FIG. 8A and FIG. 8B are a block diagram and a circuit diagram illustrating one embodiment of the present invention.
Figure 8B:
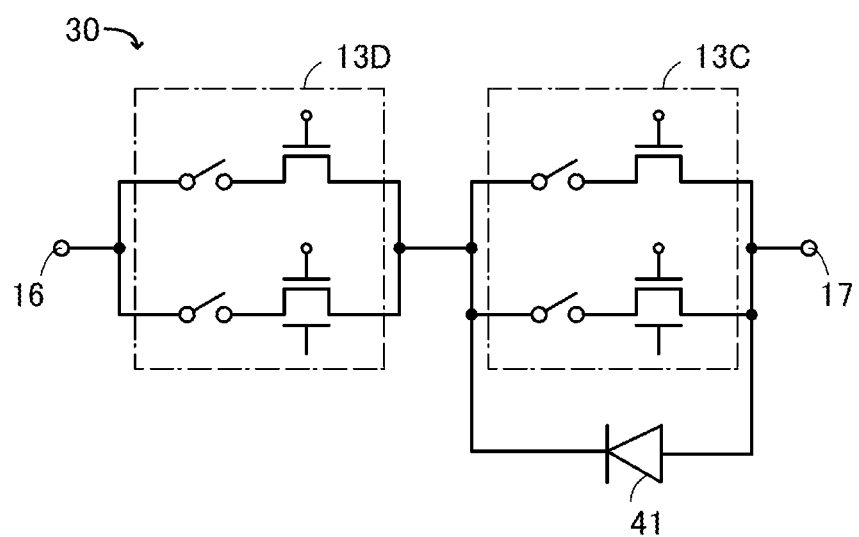

Note that in the case where the power storage device 10 illustrated in FIG. 1A is configured such that the switch circuit 13 is used to switch control between charge and discharge, the configuration in FIG. 8A and FIG. 8B can be employed, for example.

FIG. 8A is a block diagram of a power storage device 10A. The power storage device 10A is different from the power storage device 10 illustrated in FIG. 1A in including a voltage detection circuit 18 for detecting the voltage between the terminal 14 and the terminal 15 in a battery protection circuit 12A and a charge/discharge switching circuit 30 for switching control between charge and discharge. The voltage detection circuit 18 has a function of generating the signal DE and the signal CE for controlling the charge/discharge switching circuit 30 in accordance with the voltage between the terminal 14 and the terminal 15.

FIG. 8B is a drawing illustrating a configuration example of the charge/discharge switching circuit 30 illustrated in FIG. 8A. A switch circuit 13D, a switch circuit 13C, and a diode element 41 are provided between the terminal 16 and the terminal 17. In accordance with control of the switch circuit 13D, discharge of the battery cell 11 is controlled. In accordance with control of the switch circuit 13C, charge of the battery cell 11 is controlled. Note that although shown in the circuit diagram in FIG. 8B, the diode element 41 can be omitted when diode junction provided parasitically on the Si transistor is utilized.

Control of the charge/discharge switching circuit 30 including the switch circuits 13C and 13D in the process in which the battery cell 11 shifts from discharge operation to charge operation (or "at the start of charge") in the power storage device 10A described with reference to FIG. 8A and FIG. 8B will be described with reference to FIG. 9A and FIG. 9B.

Figure 9A:
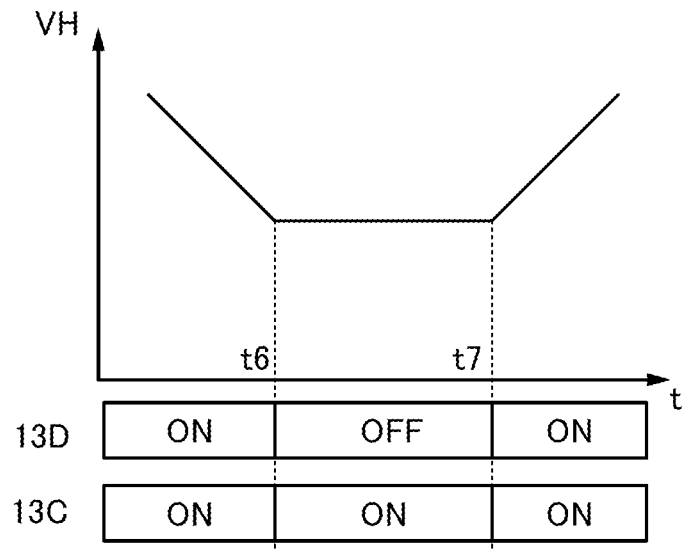
FIG. 9A, FIG. 9B, and FIG. 9C are a graph and circuit diagrams illustrating one embodiment of the present invention.

FIG. 9A is a graph schematically showing a change in the voltage VH on the terminal 14 side at the start of charge. FIG. 9A shows the state where the voltage VH decreases owing to discharge to the load (discharge operation), the discharge to the load stops at Time t6 (stop operation) just before an overdischarge state arises, charge subsequently starts at Time t7 (charge operation), and the voltage VH increases.

Figure 9B:
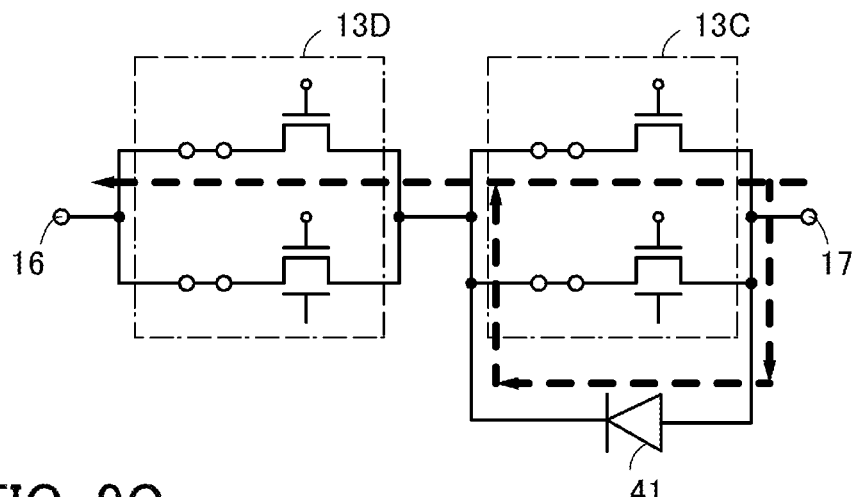

FIG. 9B is a drawing visualizing, with dotted arrows, the current that flows in the charge/discharge switching circuit 30 during the charge operation in FIG. 9A. As illustrated in FIG. 9B, current flows when the switch circuits 13C and 13D are both on.

Figure 9C:
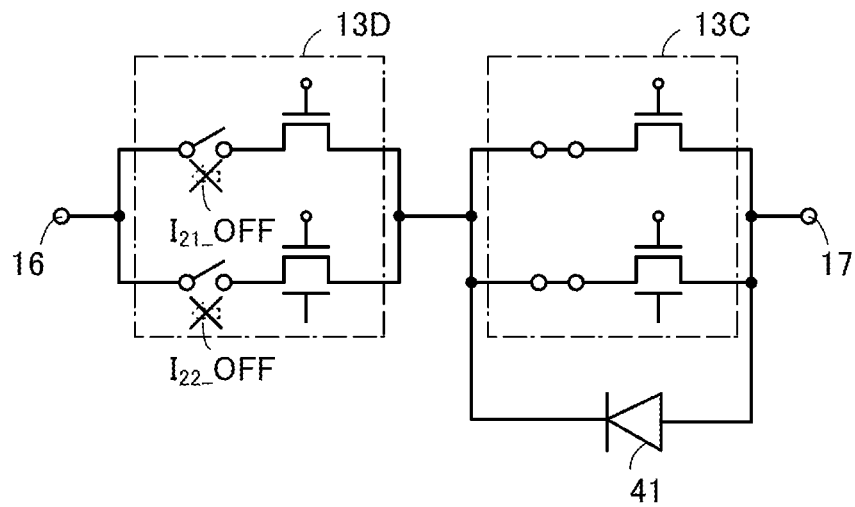

FIG. 9C is a drawing illustrating the state of the charge/discharge switching circuit 30 during the stop operation in FIG. 9A. As illustrated in FIG. 9C, the mechanical relays 21 and 22 are both turned off in the switch circuit 13D to make flowing current ($I_{21}$_OFF and $I_{22}$_OFF) extremely low. This configuration can inhibit overdischarge-induced degradation of the battery cell 11. Note that the mechanical relay may be on when taking advantage of the low off-state current of the transistor 24.

Control of the charge/discharge switching circuit 30 including the switch circuits 13C and 13D at the start of discharge of the battery cell 11 in the power storage device 10A described with reference to FIG. 8A and FIG. 8B will be described with reference to FIG. 10A and FIG. 10B.

Figure 10A:
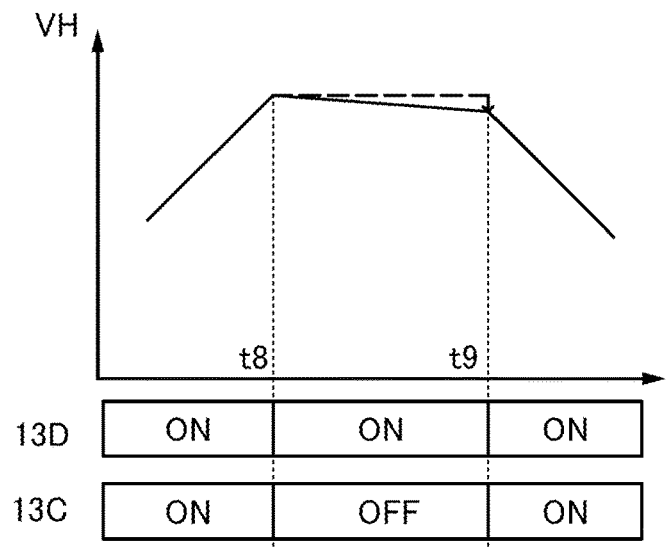
FIG. 10A, FIG. 10B, and FIG. 10C are a graph and circuit diagrams illustrating one embodiment of the present invention.

FIG. 10A is a graph schematically showing a change in the voltage VH on the terminal 14 side in the process of a shift from charge operation to discharge operation (or "at the start of discharge"). FIG. 10A shows the state where the voltage VH rises owing to discharge to the battery cell 11 (charge operation), the discharge to the battery cell 11 stops at Time t8 (stop operation) just before an overcharge state arises, discharge subsequently starts at Time t9 (discharge operation), and the voltage VH decreases.

Figure 10B:
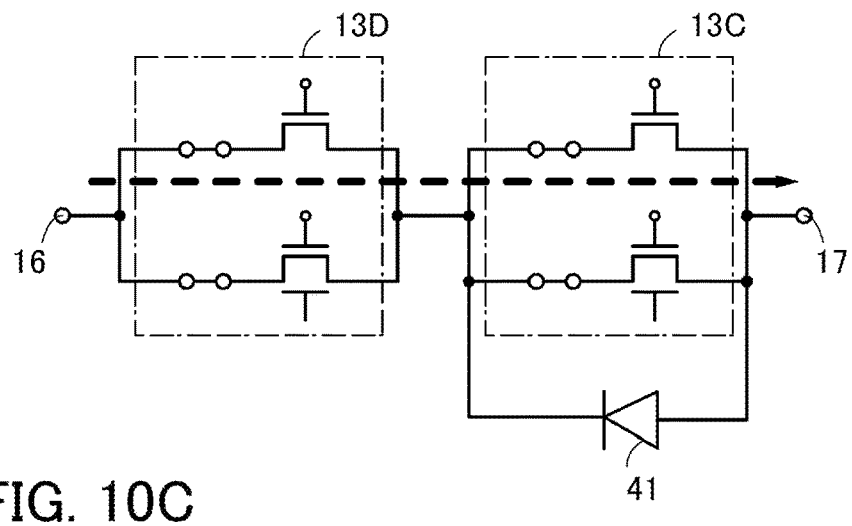

FIG. 10B is a drawing visualizing, with a dotted arrow, the current that flows in the charge/discharge switching circuit 30 during the discharge operation in FIG. 10A. As illustrated in FIG. 10B, current flows when the switch circuits 13C and 13D are both on.

Figure 10C:
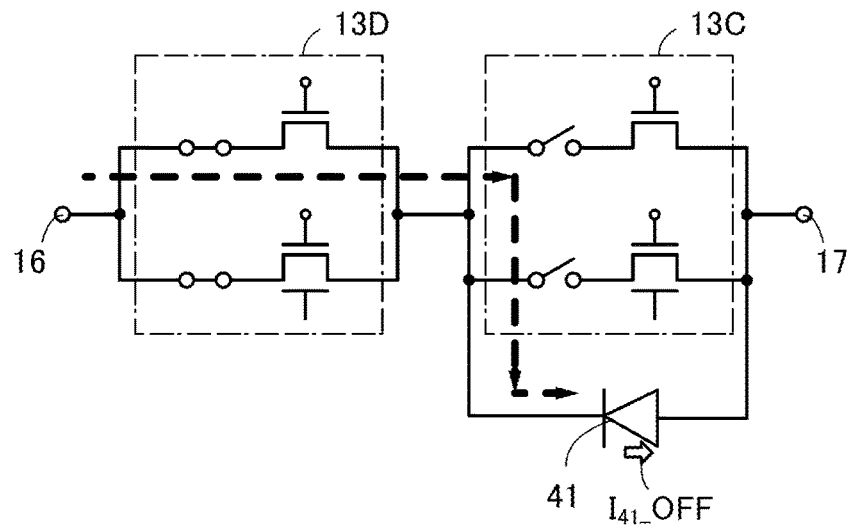

FIG. 10C is a drawing illustrating the state of the charge/discharge switching circuit 30 during the stop operation in FIG. 10A. As illustrated in FIG. 10C, the mechanical relays 21 and 22 are both turned off in the switch circuit 13C to make flowing current extremely low. In this case, leakage current $I_{41}$_OFF flows through the diode element 41 and thus, current flows when the switch circuit 13C is off for the stop operation, whereby the voltage VH slightly changes.

Figure 11A:
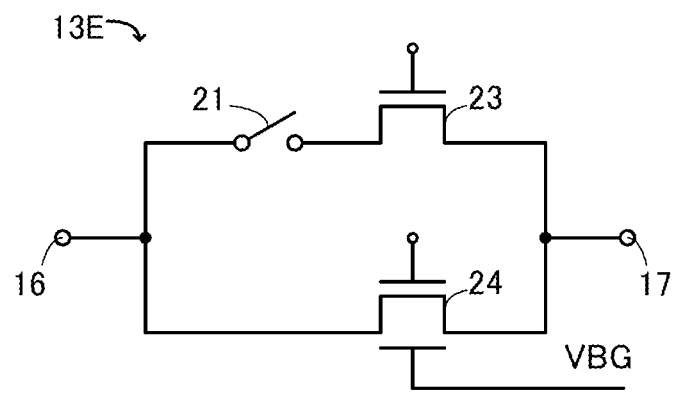
FIG. 11A, FIG. 11B, and FIG. 11C are circuit diagrams illustrating one embodiment of the present invention.
Figure 11B:
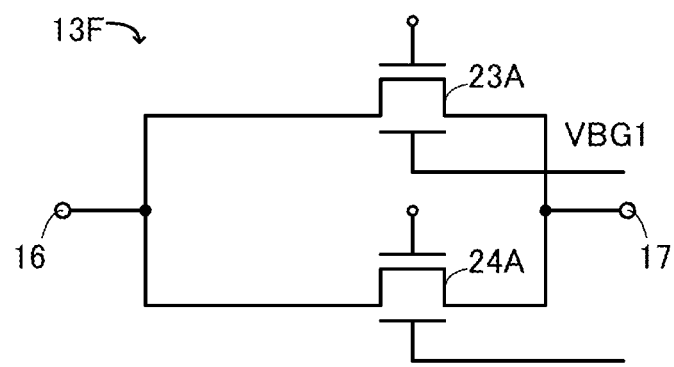
Figure 11C:
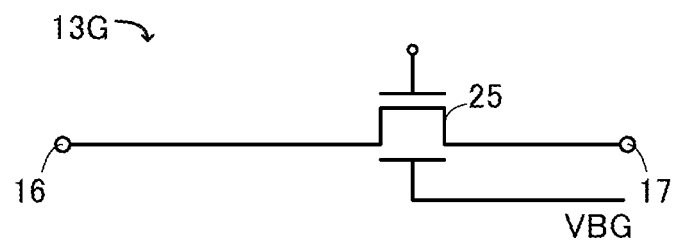

Note that the circuit configuration of the switch circuit 13 described above is not limited to the configuration of the circuit diagram of the switch circuit 13 shown in FIG. 1B or the switch circuit 13A shown in FIG. 5A. FIG. 11A to FIG. 11C show modification examples of the switch circuit.

A switch circuit 13E illustrated in FIG. 11A corresponds to a configuration in which the mechanical relay 22 of the switch circuit 13 illustrated in FIG. 1B is omitted and voltage VBG is applied to the back gate of the transistor 24. When the configuration of the switch circuit 13E illustrated in FIG. 11A is employed, threshold voltage can be controlled by shifting the voltage VBG in the positive or negative direction. This enables a configuration in which the amount of current flowing between the terminal 16 and the terminal 17 is increased and decreased by changing the electrical characteristics of the transistor 24.

A switch circuit 13F illustrated in FIG. 11B corresponds to a configuration in which the mechanical relays 21 and 22 of the switch circuit 13 illustrated in FIG. 1B are omitted and the transistors 23 and 24 thereof are replaced with transistors 23A and 24A that are OS transistors having back gates. A configuration can be employed in which voltage VBG1 is applied to the back gate of the transistor 23A and voltage VBG2 different from the voltage VBG1 is applied to the back gate of the transistor 24A. When the configuration of the switch circuit 13F illustrated in FIG. 11B is employed, the threshold voltages of the transistors can be controlled by separately controlling the voltage VBG1 and the voltage VBG2. This enables a configuration in which the amount of current flowing between the terminal 16 and the terminal 17 is increased and decreased without the mechanical relays 21 and 22.

Alternatively, a configuration including a transistor 25 that is an OS transistor having a back gate as in a switch circuit 13G illustrated in FIG. 11C may be employed. A configuration can be employed in which the electrical characteristics of the transistor 25 are switched by applying a plurality of voltages as a plurality of voltages VBG to the back gate of the transistor 25. This enables a configuration in which the amount of current flowing between the terminal 16 and the terminal 17 is increased and decreased by switching the transistor characteristics.

Figure 12A:
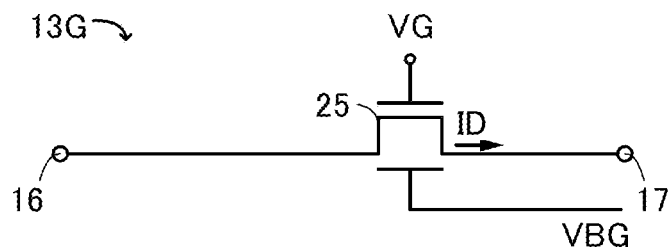
FIG. 12A, FIG. 12B, FIG. 12C, and FIG. 12D are drawings illustrating one embodiment of the present invention.
Figure 12B:
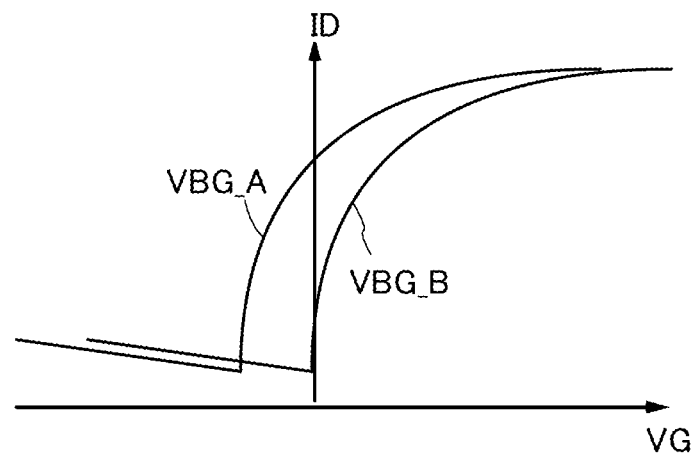
Figure 12C:
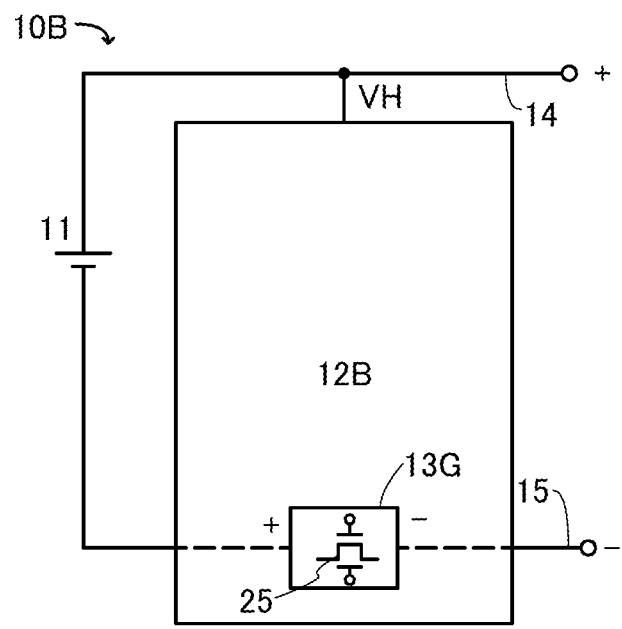

FIG. 12A to FIG. 12C illustrate an operation example and an application example of the switch circuit 13G illustrated in FIG. 11C.

FIG. 12A illustrates the state where current ID flows between the terminal 16 and the terminal 17 when voltage VG and the voltage VBG are respectively applied to the gate and the back gate of the transistor 25 of the switch circuit 13G illustrated in FIG. 11C.

FIG. 12B is a schematic view of a graph showing the current-voltage characteristics of the transistor 25 illustrated in FIG. 12A. The transistor 25 in which states with different electrical characteristics can be switched by switching the back gate voltage between voltages VBG_A and VBG_B (<VBG_A) can be used for the switch circuit 13G. For example, for the switch circuit 13G, it is possible to use the transistor 25 that can be switched between a state where the amount of current flowing between the terminal 16 and the terminal 17 when the transistor 25 is on is increased by setting the back gate voltage to the voltage VBG_A and a state where the amount of current flowing between the terminal 16 and the terminal 17 when the transistor 25 is off is made extremely small by setting the back gate voltage to the voltage VBG_B.

Figure 12D:
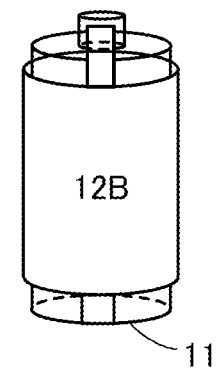

When the transistor 25, which is an OS transistor, is used as the transistor of the switch circuit 13G, a configuration can also be employed in which the switch circuit 13G is provided in a battery protection circuit 12B as in a power storage device 10B illustrated in FIG. 12C. Forming the battery protection circuit 12B with an OS transistor allows the battery protection circuit 12B to be bendable, in which case the battery protection circuit 12B can be configured to be attached to the battery cell 11 by being wrapped therearound as illustrated in FIG. 12D.

Figure 38A:
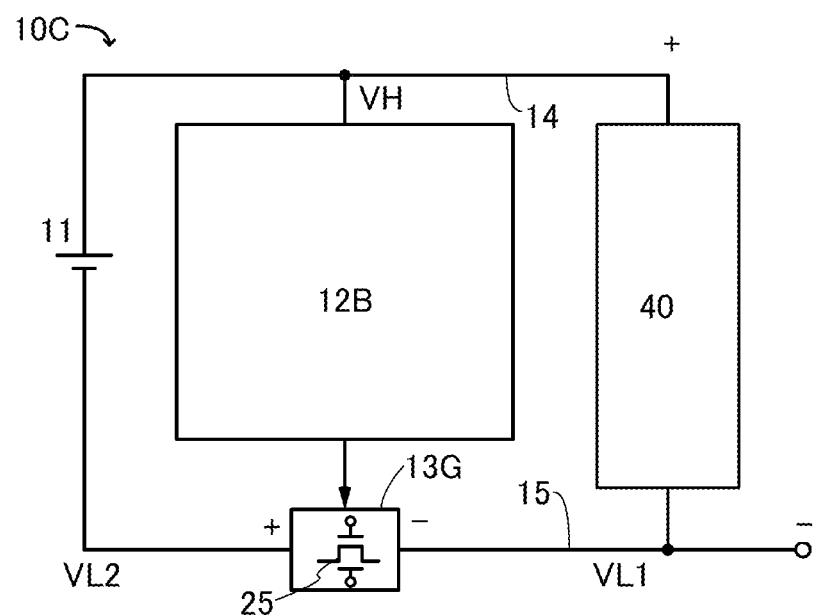
FIG. 38A and FIG. 38B are a block diagram and a graph illustrating one embodiment of the present invention.
Figure 38B:
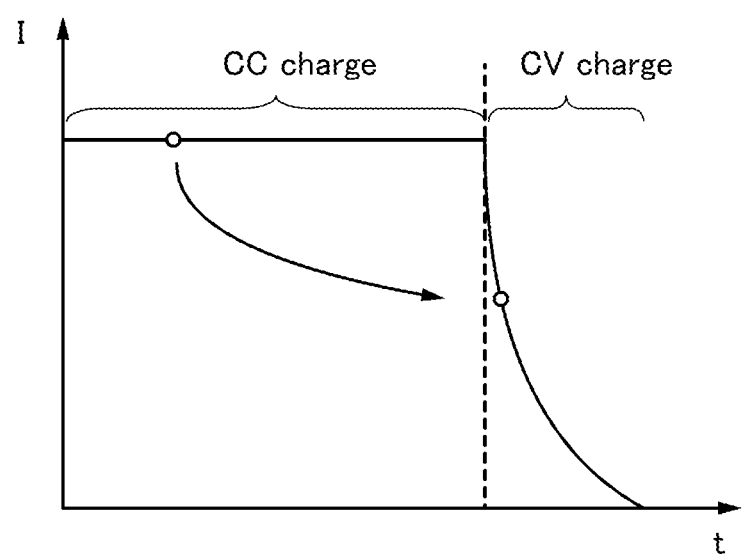

FIG. 38A and FIG. 38B show a modification example of the configuration of the power storage device 10B illustrated in FIG. 12C. In a power storage device 10C illustrated in FIG. 38, the battery protection circuit 12B and the switch circuit 13G are illustrated as separate from each other unlike in the power storage device 10B illustrated in FIG. 12C. Furthermore, a charge control circuit 40 for switching the charge mode of the battery cell 11 is illustrated in FIG. 38A.

The charge control circuit 40 switches the above charge mode in accordance with the voltage VH of the terminal 14 and voltage VL1 of the terminal 15. The charge control circuit 40 switches the charge mode, such as a constant current (CC) charge mode or a constant voltage (CV) charge mode. At the time of CC charge, constant current is supplied to the battery cell 11 to perform charge. The voltage VH for supplying constant current increases if the resistance of the battery cell 11 changes owing to degradation of the battery cell 11.

In the configuration in FIG. 38A, current flowing in the transistor 25 of the switch circuit 13G is adjusted in accordance with control by the battery protection circuit 12B. In other words, the transistor 25 is controlled in an analog manner in this configuration. With the configuration in which the transistor 25 is controlled in an analog manner, voltage VL2 of a negative electrode of the battery cell 11 can be controlled such that the voltage VH side is higher. In this manner, the voltage VH is increased by the analog control, so that the CC charge mode can be switched to the CV charge mode.

Note that the analog control of the transistor 25 for switching the charge mode can be such that in accordance with a signal from the charge control circuit 40, the battery protection circuit 12B adjusts the voltage applied to the gate of the transistor 25 to control the amount of current.

As shown in the graph of FIG. 38B, when the analog control of the transistor 25 is performed to switch from the CC charge mode to the CV charge mode, the amount of current I flowing in the battery cell 11 can be controlled. Therefore, the battery cell 11 can be charged safely even when it deteriorates.

As described above, in the configuration of one embodiment of the present invention, the battery cell can be charged in a short time or a high current can be supplied to the load. In addition, in the configuration of one embodiment of the present invention, supplying and shutting off of current can be switched in operation without any influence of off-state current, which makes it possible to more surely prevent a state of charge to voltage exceeding voltage that causes overcharge or a state of discharge to voltage exceeding overdischarge voltage.

This embodiment can be combined with any of the other embodiments as appropriate.

Embodiment 2

A structure example of a semiconductor device applicable to the battery protection circuit described in the above embodiment will be described.

Figure 13:
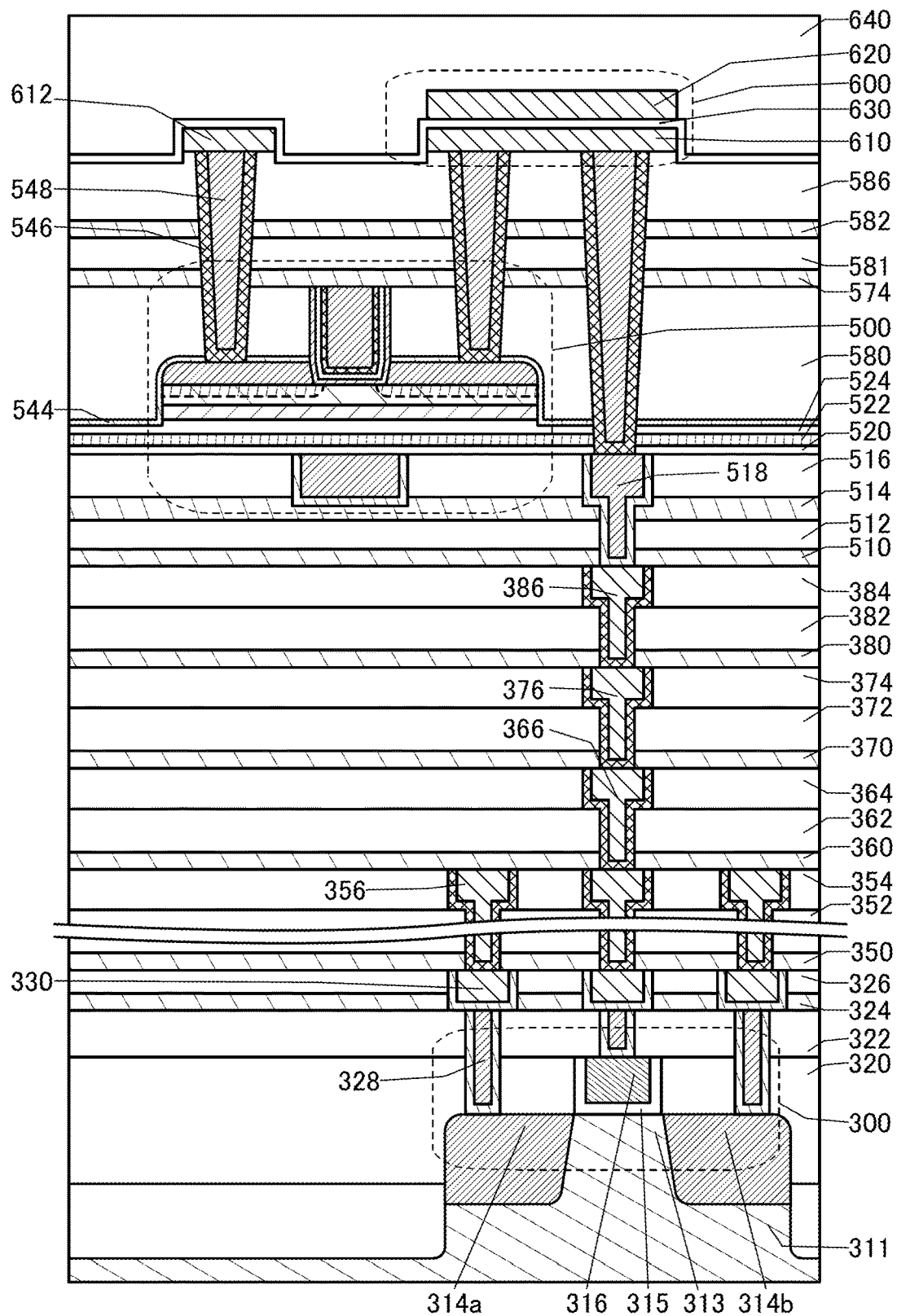
FIG. 13 is a schematic cross-sectional view illustrating a structure of a semiconductor device.
Figure 15A:
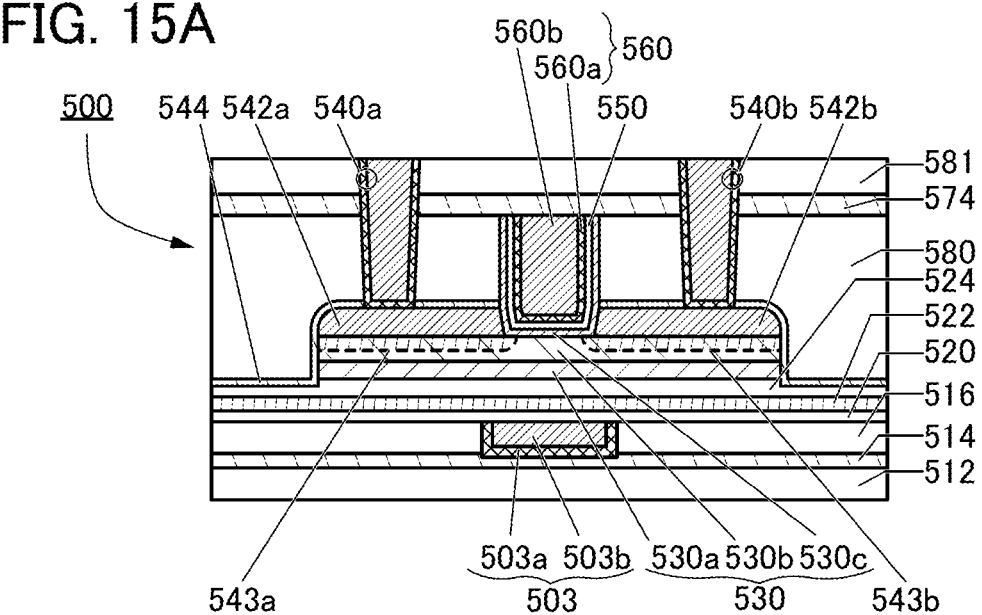
FIG. 15A, FIG. 15B, and FIG. 15C are schematic cross-sectional views illustrating a structure of a semiconductor device.
Figure 15B:
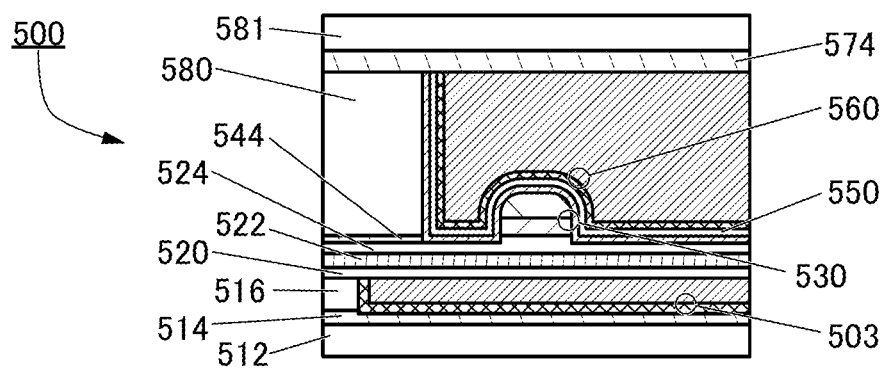
Figure 15C:
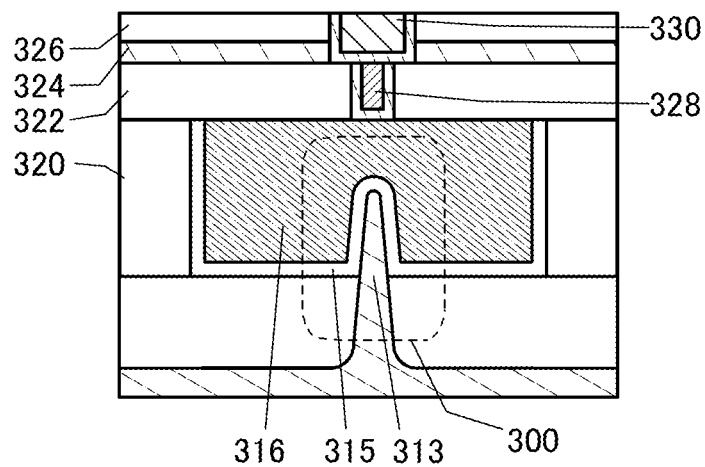

A semiconductor device illustrated in FIG. 13 includes a transistor 300, a transistor 500, and a capacitor 600. FIG. 15A is a cross-sectional view of the transistor 500 in the channel length direction, FIG. 15B is a cross-sectional view of the transistor 500 in the channel width direction, and FIG. 15C is a cross-sectional view of the transistor 300 in the channel width direction.

The transistor 500 is a transistor including a metal oxide in its channel formation region (an OS transistor). Since the off-state current of the transistor 500 is low, when the transistor 500 is used as an OS transistor included in the semiconductor device, written data can be retained for a long time.

The semiconductor device described in this embodiment includes the transistor 300, the transistor 500, and the capacitor 600, as shown in FIG. 13. The transistor 500 is provided above the transistor 300, and the capacitor 600 is provided above the transistor 300 and the transistor 500.

The transistor 300 is provided over a substrate 311 and includes a conductor 316, an insulator 315, a semiconductor region 313 that is part of the substrate 311, and a low-resistance region 314a and a low-resistance region 314b each functioning as a source region or a drain region. Note that the transistor 300 can be used as the transistor 23 and other Si transistors in the above embodiment, for example.

As shown in FIG. 15C, in the transistor 300, a top surface and a side surface in the channel width direction of the semiconductor region 313 are covered with the conductor 316 with the insulator 315 therebetween. Such a Fin-type transistor 300 can have an increased effective channel width, and thus have improved on-state characteristics. In addition, since contribution of an electric field of a gate electrode can be increased, the off-state characteristics of the transistor 300 can be improved.

Note that the transistor 300 can be either a p-channel transistor or an n-channel transistor.

A region of the semiconductor region 313 where a channel is formed, a region in the vicinity thereof, the low-resistance region 314a and the low-resistance region 314b each functioning as a source region or a drain region, and the like preferably contain a semiconductor such as a silicon-based semiconductor, and preferably contain single crystal silicon.

Alternatively, the regions may be formed using a material containing Ge (germanium), SiGe (silicon germanium), GaAs (gallium arsenide), GaAlAs (gallium aluminum arsenide), or the like. A structure may be employed in which silicon whose effective mass is controlled by applying stress to the crystal lattice and changing the lattice spacing is used. Alternatively, the transistor 300 may be an HEMT (High Electron Mobility Transistor) with the use of GaAs and GaAlAs, or the like.

The low-resistance region 314a and the low-resistance region 314b contain an element which imparts n-type conductivity, such as arsenic or phosphorus, or an element which imparts p-type conductivity, such as boron, in addition to the semiconductor material used for the semiconductor region 313.

For the conductor 316 functioning as a gate electrode, a semiconductor material such as silicon containing the element which imparts n-type conductivity, such as arsenic or phosphorus, or the element which imparts p-type conductivity, such as boron, or a conductive material such as a metal material, an alloy material, or a metal oxide material can be used.

Note that since the work function of the conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

Figure 14:
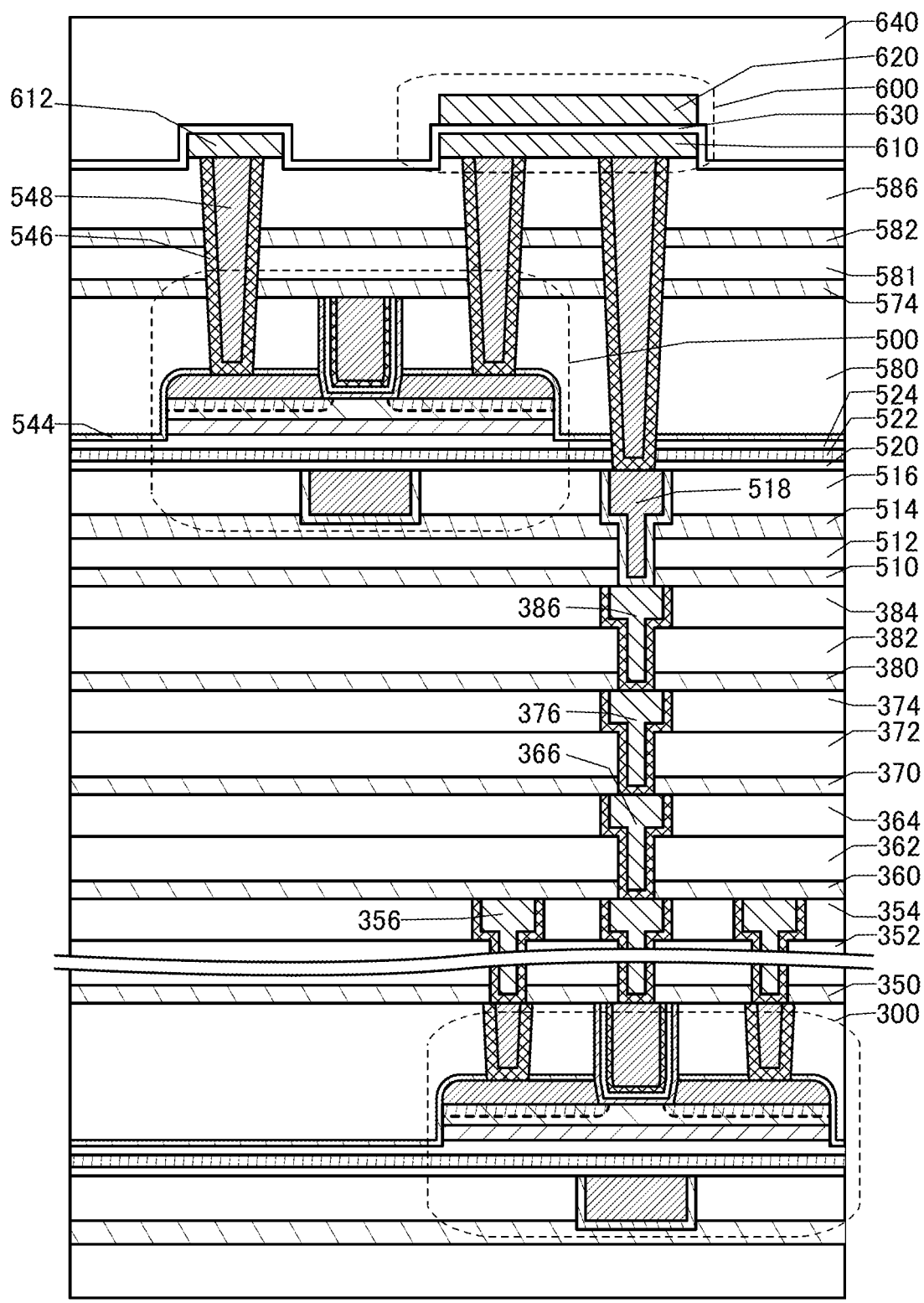
FIG. 14 is a schematic cross-sectional view illustrating a structure of a semiconductor device.

Note that the transistor 300 shown in FIG. 13 is an example and is not limited to the structure shown therein; an appropriate transistor is used in accordance with a circuit configuration or a driving method. For example, when the semiconductor device is composed of only OS transistors, the transistor 300 has a structure similar to that of the transistor 500 using an oxide semiconductor, as shown in FIG. 14. Note that the details of the transistor 500 are described later.

An insulator 320, an insulator 322, an insulator 324, and an insulator 326 are stacked sequentially and provided to cover the transistor 300.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, aluminum nitride, or the like is used, for example.

Note that in this specification, silicon oxynitride refers to a material that contains oxygen at a higher proportion than nitrogen, and silicon nitride oxide refers to a material that contains nitrogen at a higher proportion than oxygen. Furthermore, in this specification, aluminum oxynitride refers to a material that contains oxygen at a higher proportion than nitrogen, and aluminum nitride oxide refers to a material that contains nitrogen at a higher proportion than oxygen.

The insulator 322 may have a function of a planarization film for planarizing a level difference caused by the transistor 300 or the like provided below the insulator 322. For example, a top surface of the insulator 322 may be planarized by planarization treatment using a chemical mechanical polishing (CMP) method or the like to increase planarity.

In addition, for the insulator 324, it is preferable to use a film having a barrier property that prevents diffusion of hydrogen or impurities from the substrate 311, the transistor 300, or the like into a region where the transistor 500 is provided.

For the film having a barrier property against hydrogen, silicon nitride formed by a CVD method can be used, for example. Here, diffusion of hydrogen to a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

The amount of released hydrogen can be analyzed by thermal desorption spectroscopy (TDS) or the like, for example. The amount of hydrogen released from the insulator 324 that is converted into hydrogen atoms per area of the insulator 324 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the dielectric constant of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324. When a material with a low dielectric constant is used for an interlayer film, parasitic capacitance generated between wirings can be reduced.

In addition, a conductor 328, a conductor 330, and the like that are connected to the capacitor 600 or the transistor 500 are embedded in the insulator 320, the insulator 322, the insulator 324, and the insulator 326. Note that the conductor 328 and the conductor 330 each have a function of a plug or a wiring. Furthermore, a plurality of conductors functioning as plugs or wirings are collectively denoted by the same reference numeral in some cases. Moreover, in this specification and the like, a wiring and a plug connected to the wiring may be a single component. That is, there are cases where part of a conductor functions as a wiring and part of a conductor functions as a plug.

As a material for each of the plugs and wirings (the conductor 328, the conductor 330, and the like), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, it is preferable to form the plugs and wirings with a low-resistance conductive material such as aluminum or copper. The use of a low-resistance conductive material can reduce wiring resistance.

A wiring layer may be provided over the insulator 326 and the conductor 330. For example, in FIG. 13, an insulator 350, an insulator 352, and an insulator 354 are stacked sequentially and provided. Furthermore, a conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 and the conductor 330.

Note that for example, as the insulator 350, like the insulator 324, an insulator having a barrier property against hydrogen is preferably used. Furthermore, the conductor 356 preferably contains a conductor having a barrier property against hydrogen. In particular, the conductor having a barrier property against hydrogen is formed in an opening portion of the insulator 350 having a barrier property against hydrogen. With this structure, the transistor 300 and the transistor 500 can be separated by a barrier layer, so that diffusion of hydrogen from the transistor 300 into the transistor 500 can be inhibited.

Note that for the conductor having a barrier property against hydrogen, tantalum nitride is preferably used, for example. In addition, the use of a stack including tantalum nitride and tungsten, which has high conductivity, can inhibit diffusion of hydrogen from the transistor 300 while the conductivity of a wiring is kept. In that case, a structure is preferable in which a tantalum nitride layer having a barrier property against hydrogen is in contact with the insulator 350 having a barrier property against hydrogen.

A wiring layer may be provided over the insulator 354 and the conductor 356. For example, in FIG. 13, an insulator 360, an insulator 362, and an insulator 364 are stacked sequentially and provided. Furthermore, a conductor 366 is formed in the insulator 360, the insulator 362, and the insulator 364. The conductor 366 has a function of a plug or a wiring. Note that the conductor 366 can be provided using a material similar to those for the conductor 328 and the conductor 330.

Note that for example, as the insulator 360, like the insulator 324, an insulator having a barrier property against hydrogen is preferably used. Furthermore, the conductor 366 preferably contains a conductor having a barrier property against hydrogen. In particular, the conductor having a barrier property against hydrogen is formed in an opening portion of the insulator 360 having a barrier property against hydrogen. With this structure, the transistor 300 and the transistor 500 can be separated by a barrier layer, so that diffusion of hydrogen from the transistor 300 into the transistor 500 can be inhibited.

A wiring layer may be provided over the insulator 364 and the conductor 366. For example, in FIG. 13, an insulator 370, an insulator 372, and an insulator 374 are stacked sequentially and provided. Furthermore, a conductor 376 is formed in the insulator 370, the insulator 372, and the insulator 374. The conductor 376 has a function of a plug or a wiring. Note that the conductor 376 can be provided using a material similar to those for the conductor 328 and the conductor 330.

Note that for example, as the insulator 370, like the insulator 324, an insulator having a barrier property against hydrogen is preferably used. Furthermore, the conductor 376 preferably contains a conductor having a barrier property against hydrogen. In particular, the conductor having a barrier property against hydrogen is formed in an opening portion of the insulator 370 having a barrier property against hydrogen. With this structure, the transistor 300 and the transistor 500 can be separated by a barrier layer, so that diffusion of hydrogen from the transistor 300 into the transistor 500 can be inhibited.

A wiring layer may be provided over the insulator 374 and the conductor 376. For example, in FIG. 13, an insulator 380, an insulator 382, and an insulator 384 are stacked sequentially and provided. Furthermore, a conductor 386 is formed in the insulator 380, the insulator 382, and the insulator 384. The conductor 386 has a function of a plug or a wiring. Note that the conductor 386 can be provided using a material similar to those for the conductor 328 and the conductor 330.

Note that for example, as the insulator 380, like the insulator 324, an insulator having a barrier property against hydrogen is preferably used. Furthermore, the conductor 386 preferably contains a conductor having a barrier property against hydrogen. In particular, the conductor having a barrier property against hydrogen is formed in an opening portion of the insulator 380 having a barrier property against hydrogen. With this structure, the transistor 300 and the transistor 500 can be separated by a barrier layer, so that diffusion of hydrogen from the transistor 300 into the transistor 500 can be inhibited.

Although the wiring layer including the conductor 356, the wiring layer including the conductor 366, the wiring layer including the conductor 376, and the wiring layer including the conductor 386 are described above, the semiconductor device of this embodiment is not limited thereto. Three or less wiring layers that are similar to the wiring layer including the conductor 356 may be provided, or five or more wiring layers that are similar to the wiring layer including the conductor 356 may be provided.

An insulator 510, an insulator 512, an insulator 514, and an insulator 516 are stacked sequentially and provided over the insulator 384. A substance having a barrier property against oxygen or hydrogen is preferably used for any of the insulator 510, the insulator 512, the insulator 514, and the insulator 516.

For example, for the insulator 510 and the insulator 514, it is preferable to use a film having a barrier property that prevents diffusion of hydrogen or impurities from the substrate 311, a region where the transistor 300 is provided, or the like into the region where the transistor 500 is provided. Therefore, a material similar to that for the insulator 324 can be used.

For the film having a barrier property against hydrogen, silicon nitride formed by a CVD method can be used, for example. Here, diffusion of hydrogen to a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

In addition, for the film having a barrier property against hydrogen, a metal oxide such as aluminum oxide, hafnium oxide, or tantalum oxide is preferably used for the insulator 510 and the insulator 514, for example.

In particular, aluminum oxide has an excellent blocking effect that prevents the passage of both oxygen and impurities such as hydrogen and moisture which are factors in a change in electrical characteristics of the transistor. Accordingly, aluminum oxide can prevent mixing of impurities such as hydrogen and moisture into the transistor 500 in a manufacturing process and after manufacturing of the transistor. In addition, release of oxygen from the oxide included in the transistor 500 can be inhibited. Therefore, aluminum oxide is suitably used for a protective film of the transistor 500.

In addition, for the insulator 512 and the insulator 516, a material similar to that for the insulator 320 can be used, for example. Furthermore, when a material with a comparatively low dielectric constant is used for these insulators, parasitic capacitance generated between wirings can be reduced. A silicon oxide film, a silicon oxynitride film, or the like can be used for the insulator 512 and the insulator 516, for example.

Furthermore, a conductor 518, a conductor included in the transistor 500 (a conductor 503 for example), and the like are embedded in the insulator 510, the insulator 512, the insulator 514, and the insulator 516. Note that the conductor 518 has a function of a plug or a wiring that is connected to the capacitor 600 or the transistor 300. The conductor 518 can be provided using a material similar to those for the conductor 328 and the conductor 330.

In particular, the conductor 518 in a region in contact with the insulator 510 and the insulator 514 is preferably a conductor having a barrier property against oxygen, hydrogen, and water. With this structure, the transistor 300 and the transistor 500 can be separated by a layer having a barrier property against oxygen, hydrogen, and water; thus, diffusion of hydrogen from the transistor 300 into the transistor 500 can be inhibited.

The transistor 500 is provided above the insulator 516.

As shown in FIG. 15A and FIG. 15B, the transistor 500 includes the conductor 503 positioned to be embedded in the insulator 514 and the insulator 516; an insulator 520 positioned over the insulator 516 and the conductor 503; an insulator 522 positioned over the insulator 520; an insulator 524 positioned over the insulator 522; an oxide 530a positioned over the insulator 524; an oxide 530b positioned over the oxide 530a; a conductor 542a and a conductor 542b positioned apart from each other over the oxide 530b; an insulator 580 that is positioned over the conductor 542a and the conductor 542b and is provided with an opening formed to overlap with a region between the conductor 542a and the conductor 542b; an oxide 530c positioned on a bottom and a side surface of the opening; an insulator 550 positioned on a formation surface of the oxide 530c; and a conductor 560 positioned on a formation surface of the insulator 550.

In addition, as shown in FIG. 15A and FIG. 15B, an insulator 544 is preferably positioned between the insulator 580 and the oxide 530a, the oxide 530b, the conductor 542a, and the conductor 542b. Furthermore, as shown in FIG. 15A and FIG. 15B, the conductor 560 preferably includes a conductor 560a provided inside the insulator 550 and a conductor 560b provided to be embedded inside the conductor 560a. Moreover, as shown in FIG. 15A and FIG. 15B, an insulator 574 is preferably positioned over the insulator 580, the conductor 560, and the insulator 550.

Note that in the following description, the oxide 530a, the oxide 530b, and the oxide 530c are sometimes collectively referred to as an oxide 530.

Note that although a structure of the transistor 500 in which three layers of the oxide 530a, the oxide 530b, and the oxide 530c are stacked in a region where a channel is formed and its vicinity is shown, the present invention is not limited thereto. For example, a single layer of the oxide 530b, a two-layer structure of the oxide 530b and the oxide 530a, a two-layer structure of the oxide 530b and the oxide 530c, or a stacked-layer structure of four or more layers may be employed. Furthermore, although the conductor 560 is shown to have a stacked-layer structure of two layers in the transistor 500, the present invention is not limited thereto. For example, the conductor 560 may have a single-layer structure or a stacked-layer structure of three or more layers. Moreover, the transistor 500 shown in FIG. 13 and FIG. 15A is an example and is not limited to the structure shown therein; an appropriate transistor is used in accordance with a circuit configuration or a driving method.

Here, the conductor 560 functions as a gate electrode of the transistor, and the conductor 542a and the conductor 542b each function as a source electrode or a drain electrode. As described above, the conductor 560 is formed to be embedded in the opening of the insulator 580 and the region between the conductor 542a and the conductor 542b. The positions of the conductor 560, the conductor 542a, and the conductor 542b with respect to the opening of the insulator 580 are selected in a self-aligned manner. That is, in the transistor 500, the gate electrode can be positioned between the source electrode and the drain electrode in a self-aligned manner. Therefore, the conductor 560 can be formed without an alignment margin, resulting in a reduction in the area occupied by the transistor 500. Accordingly, miniaturization and high integration of the semiconductor device can be achieved.

In addition, since the conductor 560 is formed in the region between the conductor 542a and the conductor 542b in a self-aligned manner, the conductor 560 does not have a region overlapping with the conductor 542a or the conductor 542b. Thus, parasitic capacitance formed between the conductor 560 and each of the conductor 542a and the conductor 542b can be reduced. As a result, the switching speed of the transistor 500 can be improved, and the transistor 500 can have high frequency characteristics.

The conductor 560 sometimes functions as a first gate (also referred to as top gate) electrode. In addition, the conductor 503 sometimes functions as a second gate (also referred to as bottom gate) electrode. In that case, the threshold voltage of the transistor 500 can be controlled by changing a potential applied to the conductor 503 independently of a potential applied to the conductor 560. In particular, the threshold voltage of the transistor 500 can be higher than 0 V and the off-state current can be reduced by applying a negative potential to the conductor 503. Thus, a drain current at the time when a potential applied to the conductor 560 is 0 V can be lower in the case where a negative potential is applied to the conductor 503 than in the case where a negative potential is not applied to the conductor 503.

The conductor 503 is positioned to overlap with the oxide 530 and the conductor 560. Thus, in the case where potentials are applied to the conductor 560 and the conductor 503, an electric field generated from the conductor 560 and an electric field generated from the conductor 503 are connected, so that a channel formation region formed in the oxide 530 can be covered. In this specification and the like, a transistor structure in which a channel formation region is electrically surrounded by electric fields of a first gate electrode and a second gate electrode is referred to as a surrounded channel (S-channel) structure.

In addition, the conductor 503 has a structure similar to that of the conductor 518; a conductor 503a is formed in contact with an inner wall of an opening in the insulator 514 and the insulator 516, and a conductor 503b is formed on the inner side. Note that although the transistor 500 having a structure in which the conductor 503a and the conductor 503b are stacked is shown, the present invention is not limited thereto. For example, the conductor 503 may be provided as a single layer or to have a stacked-layer structure of three or more layers.

Here, for the conductor 503a, a conductive material which has a function of inhibiting diffusion of impurities such as a hydrogen atom, a hydrogen molecule, a water molecule, and a copper atom (through which the impurities are less likely to pass) is preferably used. Alternatively, it is preferable to use a conductive material which has a function of inhibiting diffusion of oxygen (e.g., at least one of an oxygen atom, an oxygen molecule, and the like) (through which the oxygen is less likely to pass). Note that in this specification, a function of inhibiting diffusion of impurities or oxygen means a function of inhibiting diffusion of any one or all of the impurities and oxygen.

For example, when the conductor 503a has a function of inhibiting diffusion of oxygen, a reduction in conductivity of the conductor 503b due to oxidation can be inhibited.

In addition, in the case where the conductor 503 also functions as a wiring, a conductive material with high conductivity that contains tungsten, copper, or aluminum as its main component is preferably used for the conductor 503b. Note that the conductor 503b is shown as a single layer but may have a stacked-layer structure, for example, a stack of the above conductive material and titanium or titanium nitride.

The insulator 520, the insulator 522, and the insulator 524 have a function of a second gate insulating film.

Here, as the insulator 524 in contact with the oxide 530, an insulator that contains oxygen more than oxygen in the stoichiometric composition is preferably used. That is, an excess-oxygen region is preferably formed in the insulator 524. When such an insulator containing excess oxygen is provided in contact with the oxide 530, oxygen vacancies in the oxide 530 can be reduced and the reliability of the transistor 500 can be improved.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0\times10^{18}$ atoms/cm$^3$, preferably greater than or equal to $1.0\times10^{19}$ atoms/cm$^3$, further preferably greater than or equal to $2.0\times10^{19}$ atoms/cm$^3$ or greater than or equal to $3.0\times10^{20}$ atoms/cm$^3$ in TDS (Thermal Desorption Spectroscopy) analysis. Note that the temperature of the film surface in the TDS analysis is preferably in a range of higher than or equal to 100° C. and lower than or equal to 700° C., or higher than or equal to 100° C. and lower than or equal to 400° C.

In addition, in the case where the insulator 524 includes an excess-oxygen region, it is preferable that the insulator 522 have a function of inhibiting diffusion of oxygen (e.g., an oxygen atom, an oxygen molecule, or the like) (or that the insulator 522 be less likely to transmit the oxygen).

When the insulator 522 has a function of inhibiting diffusion of oxygen or impurities, oxygen contained in the oxide 530 is not diffused into the insulator 520 side, which is preferable. Furthermore, the conductor 503 can be inhibited from reacting with oxygen contained in the insulator 524 or the oxide 530.

For the insulator 522, a single layer or stacked layers of an insulator containing what is called a high-k material such as aluminum oxide, hafnium oxide, an oxide containing aluminum and hafnium (hafnium aluminate), tantalum oxide, zirconium oxide, lead zirconate titanate (PZT), strontium titanate ($SrTiO_3$), or $(Ba,Sr)TiO_3$ (BST) are preferably used, for example. As miniaturization and high integration of transistors progress, a problem such as leakage current might arise because of a thinner gate insulating film. When a high-k material is used for an insulator functioning as the gate insulating film, a gate potential during transistor operation can be reduced while the physical thickness is maintained.

It is particularly preferable to use an insulator containing an oxide of one or both of aluminum and hafnium, which is an insulating material having a function of inhibiting diffusion of impurities, oxygen, and the like (i.e., an insulating material through which the oxygen is less likely to pass). Aluminum oxide, hafnium oxide, an oxide containing aluminum and hafnium (hafnium aluminate), or the like is preferably used as the insulator containing an oxide of one or both of aluminum and hafnium. In the case where the insulator 522 is formed using such a material, the insulator 522 functions as a layer that inhibits release of oxygen from the oxide 530 and mixing of impurities such as hydrogen from the periphery of the transistor 500 into the oxide 530.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. The insulator over which silicon oxide, silicon oxynitride, or silicon nitride is stacked may be used.

In addition, it is preferable that the insulator 520 be thermally stable. For example, silicon oxide and silicon oxynitride are suitable because they are thermally stable. Furthermore, the combination of an insulator that is a high-k material and silicon oxide or silicon oxynitride enables the insulator 520 to have a stacked-layer structure that has thermal stability and a high dielectric constant.

Note that in the transistor 500 in FIG. 15A and FIG. 15B, the insulator 520, the insulator 522, and the insulator 524 are shown as the second gate insulating film having a stacked-layer structure of three layers; however, the second gate insulating film may be a single layer or may have a stacked-layer structure of two layers or four or more layers. In that case, without limitation to a stacked-layer structure formed of the same material, a stacked-layer structure formed of different materials may be employed.

In the transistor 500, a metal oxide functioning as an oxide semiconductor is preferably used as the oxide 530 including the channel formation region. For example, as the oxide 530, a metal oxide such as an In-M-Zn oxide (the element M is one kind or a plurality of kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. The In-M-Zn oxide that can be used as the oxide 530 is particularly preferably a CAAC-OS or a CAC-OS. Furthermore, as the oxide 530, an In—Ga oxide or an In—Zn oxide may be used. Note that in order to increase the on-state current of the transistor 500, an In—Zn oxide is preferably used as the oxide 530. In the case where an In—Zn oxide is used as the oxide 530, for example, a stacked-layer structure in which an In—Zn oxide is used as the oxide 530a and In-M-Zn oxides are used as the oxide 530b and the oxide 530c, or a stacked-layer structure in which an In-M-Zn oxide is used as the oxide 530a and an In—Zn oxide is used as one of the oxide 530b and the oxide 530c can be employed.

The metal oxide functioning as the channel formation region in the oxide 530 preferably has a bandgap of more than or equal to 2 eV, further preferably more than or equal to 2.5 eV. With the use of a metal oxide having such a wide bandgap, the off-state current of the transistor can be reduced.

When the oxide 530 includes the oxide 530a under the oxide 530b, it is possible to inhibit diffusion of impurities into the oxide 530b from the components formed below the oxide 530a. Moreover, including the oxide 530c over the oxide 530b makes it possible to inhibit diffusion of impurities into the oxide 530b from the components formed above the oxide 530c.

Note that the oxide 530 preferably has a stacked-layer structure of a plurality of oxide layers that differ in the atomic ratio of metal atoms. Specifically, the atomic ratio of the element M to the constituent elements in the metal oxide used as the oxide 530a is preferably higher than the atomic ratio of the element M to the constituent elements in the metal oxide used as the oxide 530b. In addition, the atomic ratio of the element M to In in the metal oxide used as the oxide 530a is preferably higher than the atomic ratio of the element M to In in the metal oxide used as the oxide 530b. Furthermore, the atomic ratio of In to the element M in the metal oxide used as the oxide 530b is preferably higher than the atomic ratio of In to the element M in the metal oxide used as the oxide 530a. Moreover, a metal oxide that can be used as the oxide 530a or the oxide 530b can be used as the oxide 530c.

In addition, the energy of the conduction band minimum of each of the oxide 530a and the oxide 530c is preferably higher than the energy of the conduction band minimum of the oxide 530b. In other words, the electron affinity of each of the oxide 530a and the oxide 530c is preferably smaller than the electron affinity of the oxide 530b.

Here, the energy level of the conduction band minimum gradually changes at junction portions of the oxide 530a, the oxide 530b, and the oxide 530c. In other words, the energy level of the conduction band minimum at the junction portions of the oxide 530a, the oxide 530b, and the oxide 530c continuously changes or is continuously connected. To change the energy level gradually, the densities of defect states in mixed layers formed at an interface between the oxide 530a and the oxide 530b and an interface between the oxide 530b and the oxide 530c is preferably made low.

Specifically, when the oxide 530a and the oxide 530b or the oxide 530b and the oxide 530c contain a common element (as a main component) in addition to oxygen, a mixed layer with a low density of defect states can be formed. For example, in the case where the oxide 530b is an In—Ga—Zn oxide, an In—Ga—Zn oxide, a Ga—Zn oxide, gallium oxide, or the like is preferably used as the oxide 530a and the oxide 530c.

At this time, the oxide 530b serves as a main carrier path. When the oxide 530a and the oxide 530c have the above structures, the densities of defect states at the interface between the oxide 530a and the oxide 530b and the interface between the oxide 530b and the oxide 530c can be made low. Thus, the influence of interface scattering on carrier conduction is small, and the transistor 500 can have a high on-state current.

The conductor 542a and the conductor 542b functioning as the source electrode and the drain electrode are provided over the oxide 530b. For the conductor 542a and conductor 542b, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing the above metal element; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. In addition, tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen. Furthermore, a metal nitride film of tantalum nitride or the like is preferable because it has a barrier property against hydrogen or oxygen.

In addition, although the conductor 542a and the conductor 542b each having a single-layer structure are shown in FIG. 15, a stacked-layer structure of two or more layers may be employed. For example, it is preferable to stack a tantalum nitride film and a tungsten film. Alternatively, a titanium film and an aluminum film may be stacked. Alternatively, a two-layer structure where an aluminum film is stacked over a tungsten film, a two-layer structure where a copper film is stacked over a copper-magnesium-aluminum alloy film, a two-layer structure where a copper film is stacked over a titanium film, or a two-layer structure where a copper film is stacked over a tungsten film may be employed.

Other examples include a three-layer structure where a titanium film or a titanium nitride film is formed, an aluminum film or a copper film is stacked over the titanium film or the titanium nitride film, and a titanium film or a titanium nitride film is formed over the aluminum film or the copper film; and a three-layer structure where a molybdenum film or a molybdenum nitride film is formed, an aluminum film or a copper film is stacked over the molybdenum film or the molybdenum nitride film, and a molybdenum film or a molybdenum nitride film is formed over the aluminum film or the copper film. Note that a transparent conductive material containing indium oxide, tin oxide, or zinc oxide may be used.

In addition, as shown in FIG. 15A, a region 543a and a region 543b are sometimes formed as low-resistance regions at an interface between the oxide 530 and the conductor 542a (the conductor 542b) and in the vicinity of the interface. In that case, the region 543a functions as one of a source region and a drain region, and the region 543b functions as the other of the source region and the drain region. Furthermore, the channel formation region is formed in a region between the region 543a and the region 543b.

When the conductor 542a (the conductor 542b) is provided to be in contact with the oxide 530, the oxygen concentration in the region 543a (the region 543b) sometimes decreases. In addition, a metal compound layer that contains the metal contained in the conductor 542a (the conductor 542b) and the component of the oxide 530 is sometimes formed in the region 543a (the region 543b). In such a case, the carrier density of the region 543a (the region 543b) increases, and the region 543a (the region 543b) becomes a low-resistance region.

The insulator 544 is provided to cover the conductor 542a and the conductor 542b and inhibits oxidation of the conductor 542a and the conductor 542b. At this time, the insulator 544 may be provided to cover a side surface of the oxide 530 and to be in contact with the insulator 524.

A metal oxide containing one kind or two or more kinds selected from hafnium, aluminum, gallium, yttrium, zirconium, tungsten, titanium, tantalum, nickel, germanium, neodymium, lanthanum, magnesium, and the like can be used as the insulator 544. Alternatively, silicon nitride oxide, silicon nitride, or the like can be used for the insulator 544.

It is particularly preferable to use an insulator containing an oxide of one or both of aluminum and hafnium, such as aluminum oxide, hafnium oxide, or an oxide containing aluminum and hafnium (hafnium aluminate), as the insulator 544. In particular, hafnium aluminate has higher heat resistance than a hafnium oxide film. Therefore, hafnium aluminate is preferable because it is less likely to be crystallized by heat treatment in a later step. Note that the insulator 544 is not an essential component when the conductor 542a and the conductor 542b are oxidation-resistant materials or do not significantly lose their conductivity even after absorbing oxygen. Design is appropriately determined in consideration of required transistor characteristics.

When the insulator 544 is included, diffusion of impurities such as water and hydrogen contained in the insulator 580 into the oxide 530b through the oxide 530c and the insulator 550 can be inhibited. Furthermore, oxidation of the conductor 560 due to excess oxygen contained in the insulator 580 can be inhibited.

The insulator 550 functions as a first gate insulating film. The insulator 550 is preferably positioned in contact with an inner side (a top surface and a side surface) of the oxide 530c. Like the insulator 524, the insulator 550 is preferably formed using an insulator that contains excess oxygen and releases oxygen by heating.

Specifically, silicon oxide containing excess oxygen, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride are preferable because they are thermally stable.

When an insulator from which oxygen is released by heating is provided as the insulator 550 in contact with the top surface of the oxide 530c, oxygen can be effectively supplied from the insulator 550 to the channel formation region of the oxide 530b through the oxide 530c. Furthermore, as in the insulator 524, the concentration of impurities such as water or hydrogen in the insulator 550 is preferably reduced. The thickness of the insulator 550 is preferably greater than or equal to 1 nm and less than or equal to 20 nm.

Furthermore, to efficiently supply excess oxygen contained in the insulator 550 to the oxide 530, a metal oxide may be provided between the insulator 550 and the conductor 560. The metal oxide preferably inhibits diffusion of oxygen from the insulator 550 to the conductor 560. Providing the metal oxide that inhibits diffusion of oxygen inhibits diffusion of excess oxygen from the insulator 550 to the conductor 560. That is, a reduction in the amount of excess oxygen supplied to the oxide 530 can be inhibited. Moreover, oxidation of the conductor 560 due to excess oxygen can be inhibited. For the metal oxide, a material that can be used for the insulator 544 is used.

Note that the insulator 550 may have a stacked-layer structure like the second gate insulating film. As miniaturization and high integration of transistors progress, a problem such as leakage current might arise because of a thinner gate insulating film; for that reason, when the insulator functioning as the gate insulating film has a stacked-layer structure of a high-k material and a thermally stable material, a gate potential during transistor operation can be reduced while the physical thickness is maintained. Furthermore, the stacked-layer structure can be thermally stable and have a high dielectric constant.

Although the conductor 560 that functions as the first gate electrode and has a two-layer structure is shown in FIG. 15A and FIG. 15B, a single-layer structure or a stacked-layer structure of three or more layers may be employed.

For the conductor 560*a*, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, and the like), and a copper atom. Alternatively, it is preferable to use a conductive material having a function of inhibiting diffusion of oxygen (e.g., at least one of an oxygen atom, an oxygen molecule, and the like). When the conductor 560*a* has a function of inhibiting diffusion of oxygen, it is possible to inhibit a reduction in conductivity of the conductor 560*b* due to oxidation caused by oxygen contained in the insulator 550. As a conductive material having a function of inhibiting diffusion of oxygen, for example, tantalum, tantalum nitride, ruthenium, ruthenium oxide, or the like is preferably used. For the conductor 560*a*, the oxide semiconductor that can be used as the oxide 530 can be used. In that case, when the conductor 560*b* is deposited by a sputtering method, the electrical resistance value of the oxide semiconductor can be reduced to a value which is low enough for the oxide semiconductor to be used as a conductor; thus, the conductor 560*a* can have excellent conductivity. Such a conductor can be referred to as an OC (Oxide Conductor) electrode.

In addition, a conductive material containing tungsten, copper, or aluminum as its main component is preferably used for the conductor 560*b*. Furthermore, the conductor 560*b* also functions as a wiring and thus a conductor having high conductivity is preferably used as the conductor 560*b*. For example, a conductive material containing tungsten, copper, or aluminum as its main component can be used. Moreover, the conductor 560*b* may have a stacked-layer structure, for example, a stacked-layer structure of the above conductive material and titanium or titanium nitride.

The insulator 580 is provided over the conductor 542*a* and the conductor 542*b* with the insulator 544 therebetween. The insulator 580 preferably includes an excess-oxygen region. For example, the insulator 580 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, a resin, or the like. In particular, silicon oxide and silicon oxynitride are preferable because they are thermally stable. In particular, silicon oxide and porous silicon oxide, in which an excess-oxygen region can be easily formed in a later step, are preferable.

When the insulator 580 that releases oxygen by heating is provided in contact with the oxide 530*c*, oxygen in the insulator 580 can be efficiently supplied to the oxide 530 through the oxide 530*c*. Note that the concentration of impurities such as water or hydrogen in the insulator 580 is preferably reduced.

The opening of the insulator 580 is formed to overlap with the region between the conductor 542*a* and the conductor 542*b*. Accordingly, the conductor 560 is formed to be embedded in the opening of the insulator 580 and the region between the conductor 542*a* and the conductor 542*b*.

The gate length needs to be short for miniaturization of the semiconductor device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening of the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 550. When the insulator 574 is deposited by a sputtering method, excess-oxygen regions can be provided in the insulator 550 and the insulator 580. Accordingly, oxygen can be supplied from the excess-oxygen regions into the oxide 530.

For example, a metal oxide containing one kind or two or more kinds selected from hafnium, aluminum, gallium, yttrium, zirconium, tungsten, titanium, tantalum, nickel, germanium, magnesium, and the like can be used as the insulator 574.

In particular, aluminum oxide has a high barrier property, and even a thin aluminum oxide film having a thickness of greater than or equal to 0.5 nm and less than or equal to 3.0 nm can inhibit diffusion of hydrogen and nitrogen. Accordingly, aluminum oxide deposited by a sputtering method serves as an oxygen supply source and can also have a function of a barrier film against impurities such as hydrogen.

In addition, an insulator 581 functioning as an interlayer film is preferably provided over the insulator 574. As in the insulator 524 or the like, the concentration of impurities such as water or hydrogen in the insulator 581 is preferably reduced.

Furthermore, a conductor 540*a* and a conductor 540*b* are positioned in openings formed in the insulator 581, the insulator 574, the insulator 580, and the insulator 544. The conductor 540*a* and the conductor 540*b* are provided to face each other with the conductor 560 therebetween. The structures of the conductor 540*a* and the conductor 540*b* are similar to a structure of a conductor 546 and a conductor 548 that will be described later.

An insulator 582 is provided over the insulator 581. A substance having a barrier property against oxygen or hydrogen is preferably used for the insulator 582. Therefore, a material similar to that for the insulator 514 can be used for the insulator 582. For the insulator 582, a metal oxide such as aluminum oxide, hafnium oxide, or tantalum oxide is preferably used, for example.

In particular, aluminum oxide has an excellent blocking effect that prevents the passage of both oxygen and impurities such as hydrogen and moisture which are factors in a change in electrical characteristics of the transistor. Accordingly, aluminum oxide can prevent mixing of impurities such as hydrogen and moisture into the transistor 500 in the manufacturing process and after the manufacturing of the transistor. In addition, release of oxygen from the oxide included in the transistor 500 can be inhibited. Therefore, aluminum oxide is suitably used for the protective film of the transistor 500.

In addition, an insulator 586 is provided over the insulator 582. For the insulator 586, a material similar to that for the insulator 320 can be used. Furthermore, when a material with a comparatively low dielectric constant is used for the insulator 586, parasitic capacitance between wirings can be reduced. A silicon oxide film, a silicon oxynitride film, or the like can be used for the insulator 586, for example.

Furthermore, the conductor 546, the conductor 548, and the like are embedded in the insulator 520, the insulator 522, the insulator 524, the insulator 544, the insulator 580, the insulator 574, the insulator 581, the insulator 582, and the insulator 586.

The conductor 546 and the conductor 548 have functions of plugs or wirings that are connected to the capacitor 600, the transistor 500, or the transistor 300. The conductor 546 and the conductor 548 can be provided using materials similar to those for the conductor 328 and the conductor 330.

Next, the capacitor 600 is provided above the transistor 500. The capacitor 600 includes a conductor 610, a conductor 620, and an insulator 630.

In addition, a conductor 612 may be provided over the conductor 546 and the conductor 548. The conductor 612 has a function of a plug or a wiring that is connected to the transistor 500. The conductor 610 has a function of an electrode of the capacitor 600. Note that the conductor 612 and the conductor 610 can be formed at the same time.

For the conductor 612 and the conductor 610, a metal film containing an element selected from molybdenum, titanium, tantalum, tungsten, aluminum, copper, chromium, neodymium, and scandium; a metal nitride film containing the above element as its component (a tantalum nitride film, a titanium nitride film, a molybdenum nitride film, or a tungsten nitride film); or the like can be used. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

Although the conductor 612 and the conductor 610 each having a single-layer structure are shown in FIG. 13, they are not limited to having the structures shown therein and may have a stacked-layer structure of two or more layers. For example, between a conductor having a barrier property and a conductor having high conductivity, a conductor that is highly adhesive to the conductor having a barrier property and the conductor having high conductivity may be formed.

The conductor 620 is provided to overlap with the conductor 610 with the insulator 630 therebetween. Note that a conductive material such as a metal material, an alloy material, or a metal oxide material can be used for the conductor 620. It is preferable to use a high-melting-point material that has both heat resistance and conductivity, such as tungsten or molybdenum, and it is particularly preferable to use tungsten. In addition, in the case where the conductor 620 is formed concurrently with another component such as a conductor, Cu (copper), Al (aluminum), or the like, which is a low-resistance metal material, is used.

An insulator 640 is provided over the conductor 620 and the insulator 630. The insulator 640 can be provided using a material similar to that for the insulator 320. In addition, the insulator 640 may function as a planarization film that covers an uneven shape therebelow.

With the use of this structure, a change in electrical characteristics can be inhibited and reliability can be improved in a semiconductor device using a transistor including an oxide semiconductor. Alternatively, a battery protection circuit using a transistor including an oxide semiconductor can be miniaturized or highly integrated.

This embodiment can be combined with any of the other embodiments as appropriate.

Embodiment 3

In this embodiment, an example in which the battery protection circuit described in the above embodiment is used as an electronic component will be described with reference to FIG. 16.

Figure 16A:
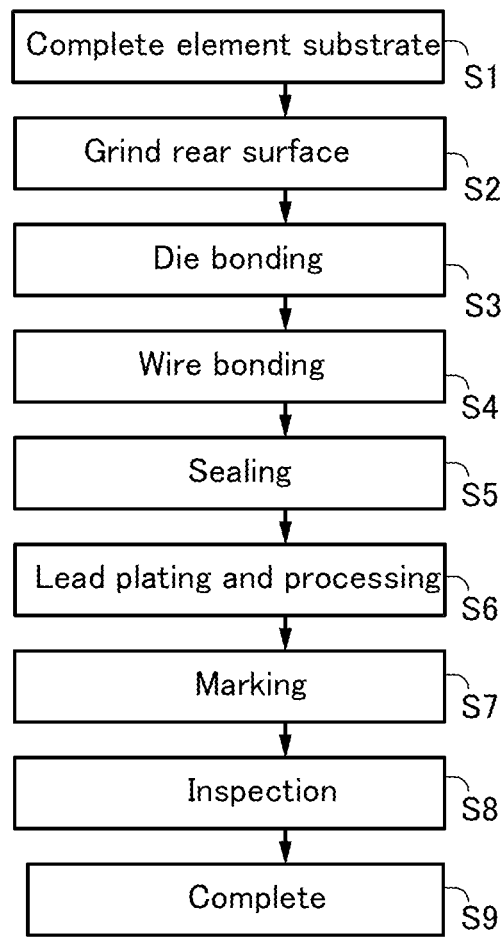
FIG. 16A and FIG. 16B are a flow chart showing a manufacturing process of an electronic component and a schematic perspective view of the electronic component.

FIG. 16A shows an example in which the battery protection circuit described in the above embodiment is used as an electronic component. Note that the electronic component is also referred to as a semiconductor package or an IC package. For the electronic component, there are a plurality of standards and names corresponding to a terminal extraction direction and a terminal shape. Thus, examples thereof are described in this embodiment.

A circuit portion including an OS transistor or a Si transistor is completed by integrating a plurality of detachable components on a printed circuit board through an assembly process (a post-process).

The post-process can be completed through steps shown in FIG. 16A. Specifically, after an element substrate obtained in a pre-process is completed (Step S1), a rear surface of the substrate is ground (Step S2). The substrate is thinned down at this stage, so that warpage or the like of the substrate in the pre-process is reduced and the size of the component is reduced.

The rear surface of the substrate is ground, and a dicing step is performed to divide the substrate into a plurality of chips. Then, a die bonding step of individually picking up the divided chips to be mounted on and bonded to a lead frame is performed (Step S3). To bond the chip and the lead frame in this die bonding step, a method such as bonding with a resin or bonding with a tape is selected as appropriate depending on products. Note that in the die bonding step, chips may be mounted on and bonded to an interposer.

Next, wire bonding in which a lead of the lead frame and an electrode on the chip are electrically connected with a metal fine line (wire) is performed (Step S4). A silver line or a gold line can be used as the metal fine line. Furthermore, ball bonding or wedge bonding can be used as the wire bonding.

The wire-bonded chip is subjected to sealing with an epoxy resin or the like in a molding step (Step S5). With the molding step, the inside of the electronic component is filled with a resin, so that damage to the incorporated circuit portion and wire due to external mechanical force can be reduced, and degradation in characteristics due to moisture or dust can be reduced.

Next, the lead of the lead frame is subjected to plating treatment. Then, the lead is cut and processed (Step S6). This plating treatment prevents corrosion of the lead and enables more reliable soldering at the time of mounting the electronic component on a printed circuit board in a later step.

Next, printing treatment (marking) is performed on a surface of the package (Step S7). Then, through a final inspection step (Step S8), an electronic component that includes a circuit portion including a PLD is completed (Step S9).

Figure 16B:
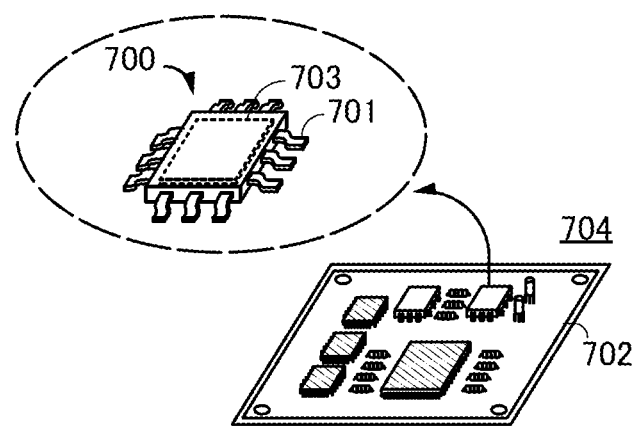

Furthermore, FIG. 16B shows a schematic perspective view of the completed electronic component. FIG. 16B shows a schematic perspective view of a QFP (Quad Flat Package) as an example of the electronic component. A lead 701 and a circuit portion 703 of an electronic component 700 are shown in FIG. 16B. The electronic component 700 shown in FIG. 16B is mounted on a printed circuit board 702, for example. A plurality of electronic components 700 that are combined and electrically connected to each other over the printed circuit board 702 can be mounted inside an electric device. A completed circuit board 704 is provided in an electric device or the like.

Embodiment 4

In this embodiment, structures of a power storage device and a power storage system to which an electronic component including the battery protection circuit described in the above embodiment can be applied will be described.

[Cylindrical Secondary Battery]

Figure 17A:
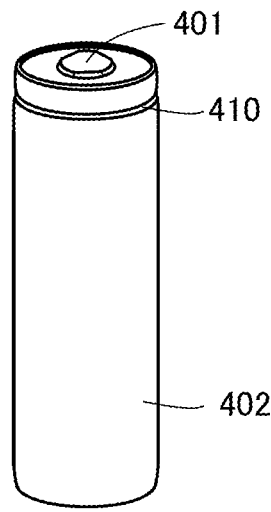
FIG. 17A, FIG. 17B, and FIG. 17C are drawings illustrating electric devices of embodiments of the present invention.

An example of a cylindrical secondary battery is described with reference to FIG. 17A. A cylindrical secondary battery 400 includes, as illustrated in FIG. 17A, a positive electrode cap (battery lid) 401 on the top surface and a battery can (outer can) 402 on the side and bottom surfaces. The positive electrode cap 401 and the battery can (outer can) 402 are insulated from each other by a gasket (insulating packing) 410.

Figure 17B:
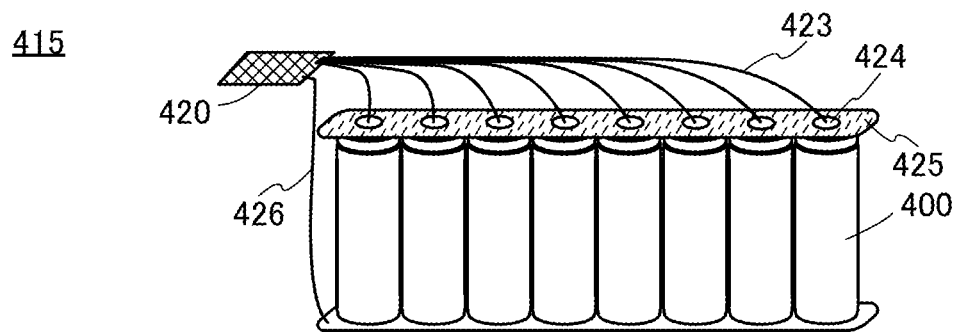

FIG. 17B illustrates an example of a power storage system 415. The power storage system 415 includes a plurality of secondary batteries 400. Positive electrodes of the secondary batteries are in contact with conductors 424 isolated by an insulator 425 and are electrically connected. The conductor 424 is electrically connected to a control circuit 420 through a wiring 423. Negative electrodes of the secondary batteries are electrically connected to the control circuit 420 through a wiring 426. As the control circuit 420, the battery protection circuit described in the above embodiment can be used.

Figure 17C:
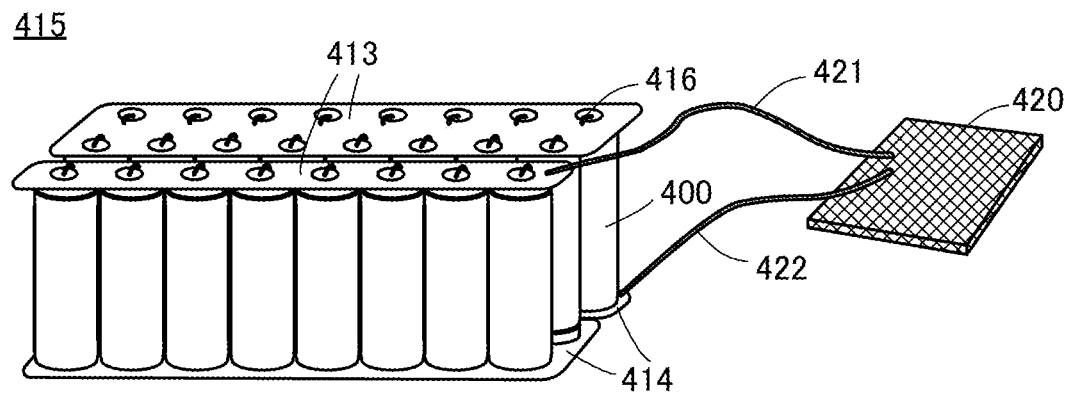

FIG. 17C illustrates an example of the power storage system 415. The power storage system 415 includes the plurality of secondary batteries 400, and the plurality of secondary batteries 400 are sandwiched between a conductive plate 413 and a conductive plate 414. The plurality of secondary batteries 400 are electrically connected to the conductive plate 413 and the conductive plate 414 through the wiring 416. The plurality of secondary batteries 400 may be connected parallel to each other, connected in series, or connected in series after being connected parallel to each other. With the power storage system 415 including the plurality of secondary batteries 400, large electric power can be extracted.

A temperature control device may be provided between the plurality of secondary batteries 400. When the secondary batteries 400 are heated excessively, the temperature control device can cool them, and when the secondary batteries 400 are cooled too much, the temperature control device can heat them. Thus, the performance of the power storage system 415 is not easily influenced by the outside air temperature.

In FIG. 17C, the power storage system 415 is electrically connected to the control circuit 420 through a wiring 421 and a wiring 422. As the control circuit 420, the battery protection circuit described in the above embodiment can be used. The wiring 421 is electrically connected to the positive electrodes of the plurality of secondary batteries 400 through the conductive plate 413. The wiring 422 is electrically connected to the negative electrodes of the plurality of secondary batteries 400 through the conductive plate 414.

[Secondary Battery Pack]

Next, examples of the power storage system of one embodiment of the present invention are described with reference to FIG. 18.

Figure 18A:
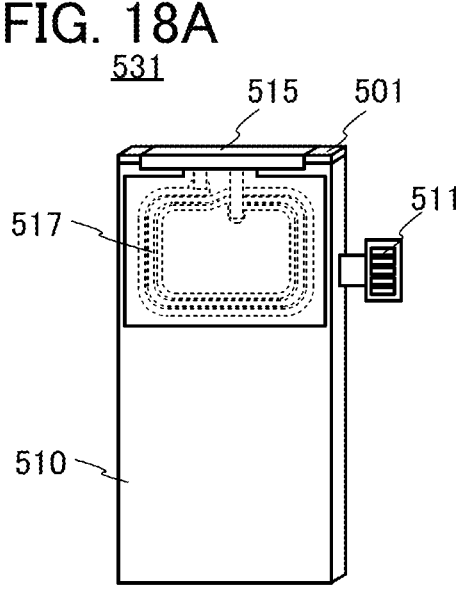
FIG. 18A, FIG. 18B, and FIG. 18C are drawings illustrating electric devices of embodiments of the present invention.
Figure 18B:
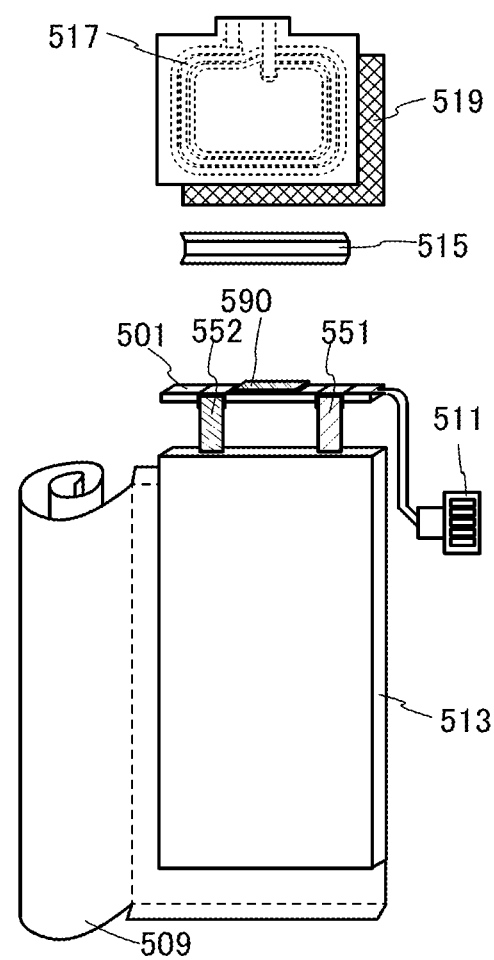

FIG. 18A is an external view of a secondary battery pack 531. FIG. 18B illustrates a structure of the secondary battery pack 531. The secondary battery pack 531 includes a circuit board 501 and a secondary battery 513. A label 509 is attached onto the secondary battery 513. The circuit board 501 is fixed by a sealant 515. The secondary battery pack 531 also includes an antenna 517.

The circuit board 501 includes a control circuit 590. As the control circuit 590, the battery protection circuit described in the above embodiment can be used. For example, as illustrated in FIG. 18B, the control circuit 590 is provided over the circuit board 501. The circuit board 501 is electrically connected to a terminal 511. The circuit board 501 is electrically connected to the antenna 517, one 551 of a positive electrode lead and a negative electrode lead of the secondary battery 513, and the other 552 of the positive electrode lead and the negative electrode lead.

Figure 18C:
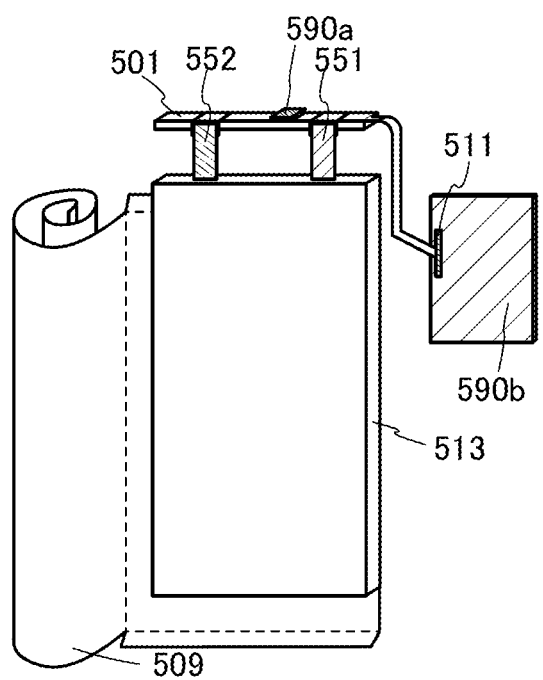

Alternatively, as illustrated in FIG. 18C, a circuit system 590a provided over the circuit board 501 and a circuit system 590b electrically connected to the circuit board 501 through the terminal 511 may be included. For example, a part of the control circuit of one embodiment of the present invention is provided in the circuit system 590a, and another part of the control circuit of one embodiment of the present invention is provided in the circuit system 590b.

The shape of the antenna 517 is not limited to a coil shape and may be a linear shape or a plate shape. An antenna such as a planar antenna, an aperture antenna, a traveling-wave antenna, an EH antenna, a magnetic-field antenna, or a dielectric antenna may be used. Alternatively, the antenna 517 may be a flat-plate conductor. This flat-plate conductor can serve as one of conductors for electric field coupling. That is, the antenna 517 can serve as one of two conductors of a capacitor. Thus, electric power can be transmitted and received not only by an electromagnetic field or a magnetic field but also by an electric field.

The secondary battery pack 531 includes a layer 519 between the antenna 517 and the secondary battery 513. The layer 519 has a function of blocking an electromagnetic field from the secondary battery 513, for example. As the layer 519, for example, a magnetic body can be used.

The secondary battery 513 may include a wound battery element. The wound battery element is obtained through winding a sheet of a stack in which the negative electrode overlaps with the positive electrode with the separator interposed therebetween.

This embodiment can be combined with any of the other embodiments as appropriate.

Embodiment 5

In this embodiment, an example of a vehicle equipped with a power storage system which is one embodiment of the present invention is described. Examples of vehicles are automobiles, motorcycles, bicycles, and the like.

The use of power storage systems in vehicles enables production of next-generation clean energy vehicles such as hybrid electric vehicles (HEVs), electric vehicles (EVs), and plug-in hybrid electric vehicles (PHEVs).

Figure 19A:
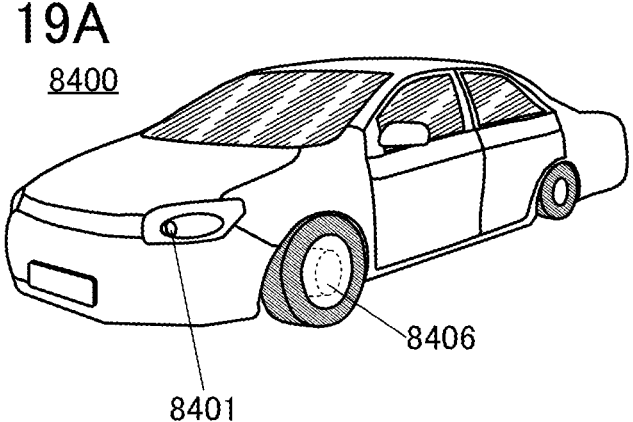
FIG. 19A, FIG. 19B, and FIG. 19C are drawings illustrating electric devices of embodiments of the present invention.

FIG. 19 illustrates examples of vehicles using the power storage system which is one embodiment of the present invention. An automobile 8400 illustrated in FIG. 19A is an electric vehicle that runs on an electric motor as a power source. Alternatively, the automobile 8400 is a hybrid electric vehicle capable of driving appropriately using either an electric motor or an engine. The use of one embodiment of the present invention can achieve a high-mileage vehicle. The automobile 8400 includes a power storage system. The power storage system is used not only for driving an electric motor 8406, but also for supplying electric power to a light-emitting device such as a headlight 8401 or a room light (not illustrated).

The power storage system can also supply electric power to a display device of a speedometer, a tachometer, or the like included in the automobile 8400. Furthermore, the power storage system can supply electric power to a navigation system or the like included in the automobile 8400.

Figure 19B:
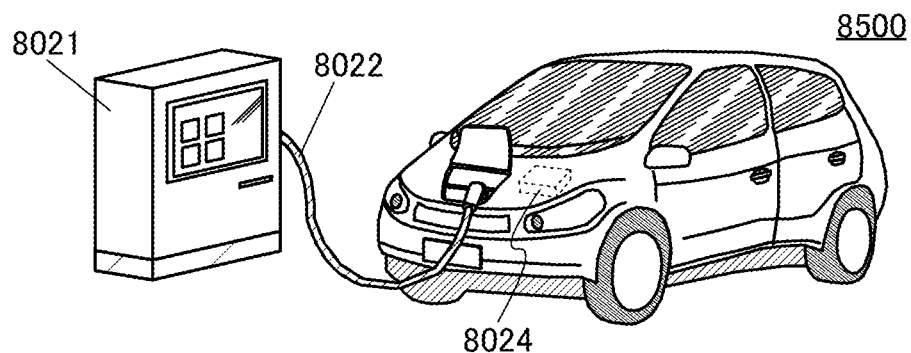

An automobile 8500 illustrated in FIG. 19B can be charged when the power storage system 8024 included in the automobile 8500 is supplied with electric power from external charging equipment by a plug-in system, a contactless power feeding system, or the like. FIG. 19B illustrates the state in which the power storage system 8024 included in the automobile 8500 is charged with a ground-based charging apparatus 8021 through a cable 8022. In charge, a given method such as CHAdeMO (registered trademark) or Combined Charging System may be employed as a charging method, the standard of a connector, or the like as appropriate. The charging apparatus 8021 may be a charging station provided in a commerce facility or a power source in a house. With the use of a plug-in technique, the power storage system 8024 included in the automobile 8500 can be charged by being supplied with electric power from the outside, for example. The charge can be performed by converting AC electric power into DC electric power through a converter, such as an AC-DC converter.

Although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charge can be performed not only when the vehicle is stopped but also when driven. In addition, the contactless power feeding system may be utilized to perform transmission and reception of electric power between vehicles. A solar cell may be provided in the exterior of the vehicle to charge the power storage system when the vehicle stops or moves. To supply electric power in such a contactless manner, an electromagnetic induction method or a magnetic resonance method can be used.

Figure 19C:
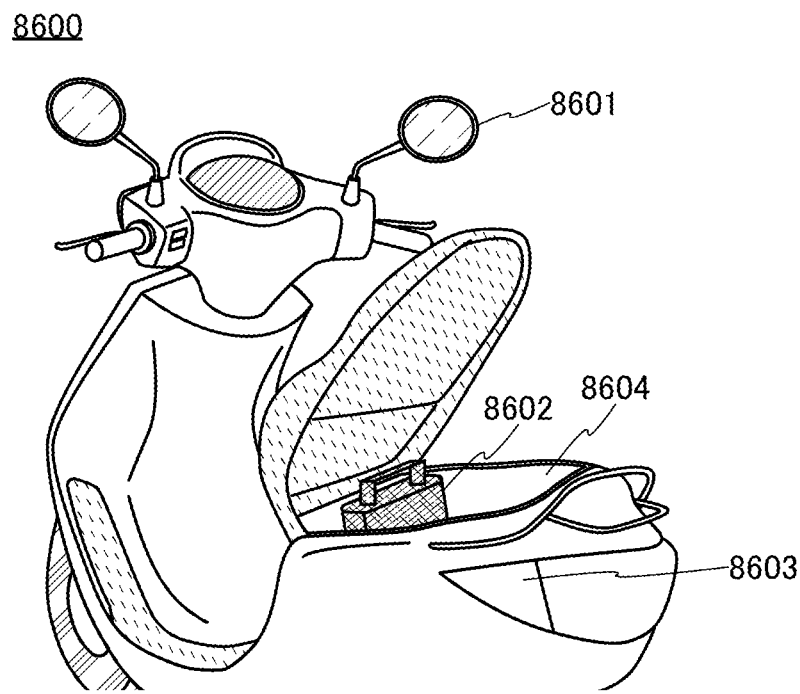

FIG. 19C is an example of a two-wheeled vehicle using the power storage system of one embodiment of the present invention. A motor scooter 8600 illustrated in FIG. 19C includes a power storage system 8602, side mirrors 8601, and indicator lights 8603. The power storage system 8602 can supply electricity to the indicator lights 8603.

In the motor scooter 8600 illustrated in FIG. 19C, the power storage system 8602 can be stored in a storage unit under seat 8604. The power storage system 8602 can be stored in the storage unit under seat 8604 even with a small size.

Figure 20A:
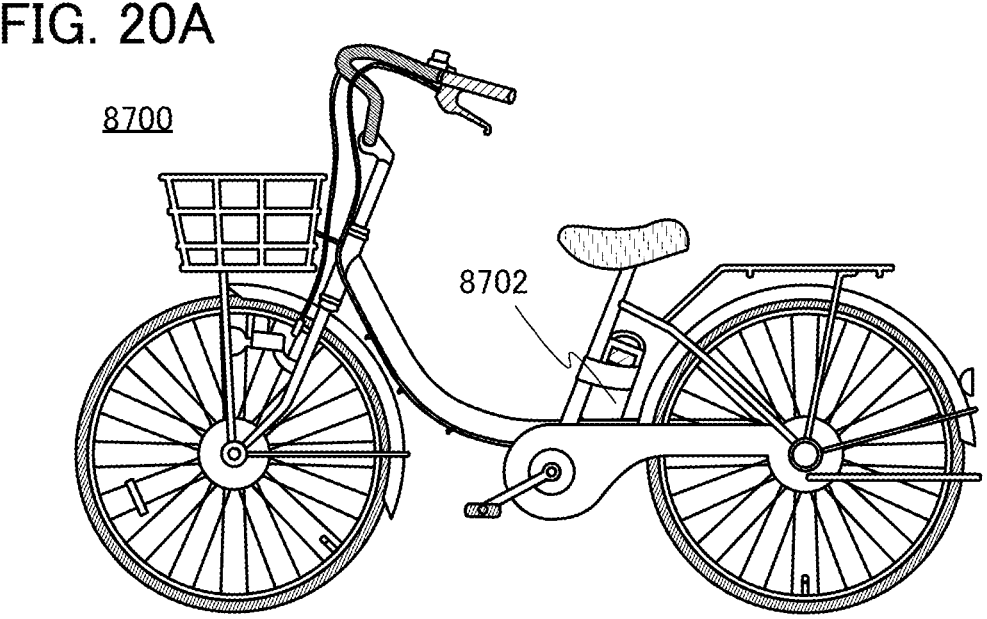
FIG. 20A and FIG. 20B are drawings illustrating electric devices of embodiments of the present invention.

FIG. 20A is an example of an electric bicycle using the power storage system of one embodiment of the present invention. The power storage system of one embodiment of the present invention can be used for an electric bicycle 8700 illustrated in FIG. 20A. The power storage system of one embodiment of the present invention includes a plurality of storage batteries, a protective circuit, and a neural network, for example.

Figure 20B:
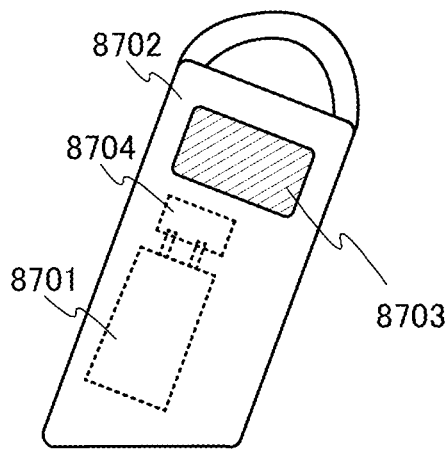

The electric bicycle 8700 includes a power storage system 8702. The power storage system 8702 can supply electricity to a motor that assists a rider. The power storage system 8702 is portable, and FIG. 20B illustrates the state where the power storage system 8702 is detached from the bicycle. A plurality of storage batteries 8701 included in the power storage system of one embodiment of the present invention are incorporated in the power storage system 8702, and the remaining battery capacity and the like can be displayed on a display portion 8703. The power storage system 8702 also includes a control circuit 8704 of one embodiment of the present invention. The control circuit 8704 is electrically connected to a positive electrode and a negative electrode of the storage battery 8701. The battery protection circuit described in the above embodiment can be used as the control circuit 8704.

This embodiment can be combined with any of the other embodiments as appropriate.

Embodiment 6

In this embodiment, examples of electronic devices each including the power storage system described in the above embodiments will be described.

Figure 21A:
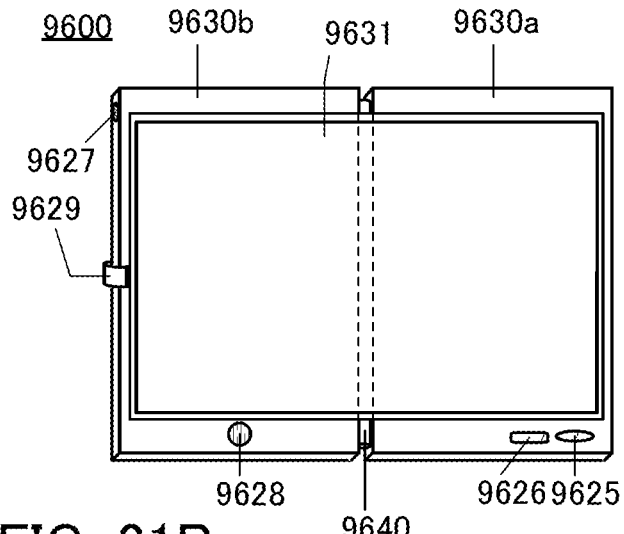
FIG. 21A, FIG. 21B, and FIG. 21C are drawings illustrating electronic devices of embodiments of the present invention.
Figure 21B:
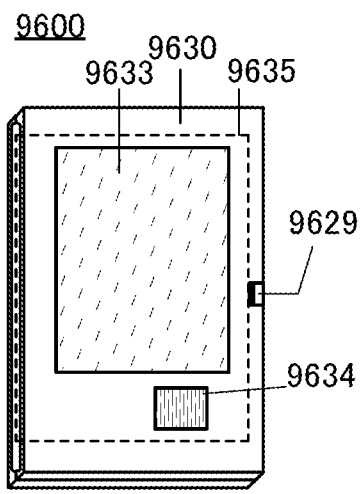

Next, FIG. 21A and FIG. 21B illustrate examples of a tablet terminal that can be folded in half (including a clamshell tablet). A tablet terminal 9600 illustrated in FIG. 21A and FIG. 21B includes a housing 9630$a$, a housing 9630$b$, a movable portion 9640 connecting the housing 9630$a$ and the housing 9630$b$, a display portion 9631, a display mode changing switch 9626, a power switch 9627, a power saving mode changing switch 9625, a fastener 9629, and an operation switch 9628. A flexible panel is used for the display portion 9631, whereby a tablet terminal with a larger display portion can be provided. FIG. 21A illustrates the tablet terminal 9600 that is opened, and FIG. 21B illustrates the tablet terminal 9600 that is closed.

The tablet terminal 9600 includes a power storage unit 9635 inside the housing 9630$a$ and the housing 9630$b$. The power storage unit 9635 is provided across the housing 9630$a$ and the housing 9630$b$, passing through the movable portion 9640.

Part of the display portion 9631 can be a touch panel region and data can be input when a displayed operation key is touched. When a position where a keyboard display switching button is displayed on the touch panel is touched with a finger, a stylus, or the like, keyboard buttons can be displayed on the display portion 9631.

The display mode changing switch 9626 can switch the display between a portrait mode and a landscape mode, and between monochrome display and color display, for example. With the power saving mode changing switch 9625, display luminance can be optimized in accordance with the amount of external light in use, which is detected with an optical sensor incorporated in the tablet terminal 9600. Another detection device including a sensor for detecting inclination, such as a gyroscope sensor or an acceleration sensor, may be incorporated in the tablet terminal, in addition to the optical sensor.

FIG. 21B is a closed state and the tablet terminal includes the housing 9630, a solar cell 9633, and the power storage system of one embodiment of the present invention. The power storage system includes a control circuit 9634 and the power storage unit 9635. The battery protection circuit described in the above embodiment can be used as the control circuit 9634.

The tablet terminal 9600 can be folded in half and thus can be folded such that the housing 9630*a* and the housing 9630*b* overlap with each other when not in use. Thus, the display portion 9631 can be protected, which increases the durability of the tablet terminal 9600.

The tablet terminal illustrated in FIG. 21A and FIG. 21B can also have a function of displaying various kinds of information (a still image, a moving image, a text image, and the like), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged efficiently.

Figure 21C:
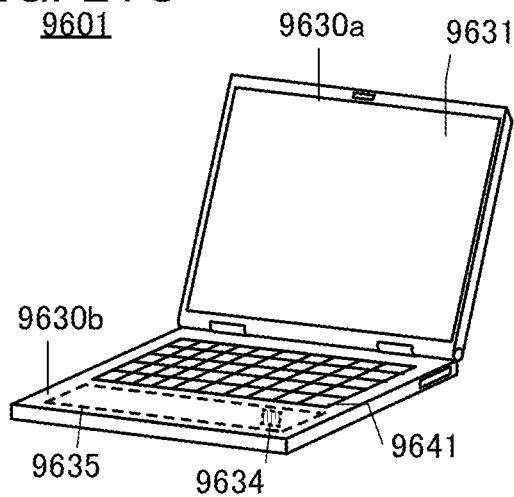

Note that although FIG. 21A and FIG. 21B illustrate a structure in which the control circuit using the battery protection circuit described in the above embodiment is used for a tablet terminal that can be folded in half, another structure may be employed. For example, application to a laptop personal computer that is a clamshell terminal is possible as illustrated in FIG. 21C. FIG. 21C illustrates a laptop personal computer 9601 including a display portion 9631 in a housing 9630*a* and a keyboard portion 9641 in a housing 9630*b*. The laptop personal computer 9601 includes the control circuit 9634 and the power storage unit 9635 which are described with reference to FIG. 21A and FIG. 21B. The battery protection circuit described in the above embodiment can be used as the control circuit 9634.

Figure 22:
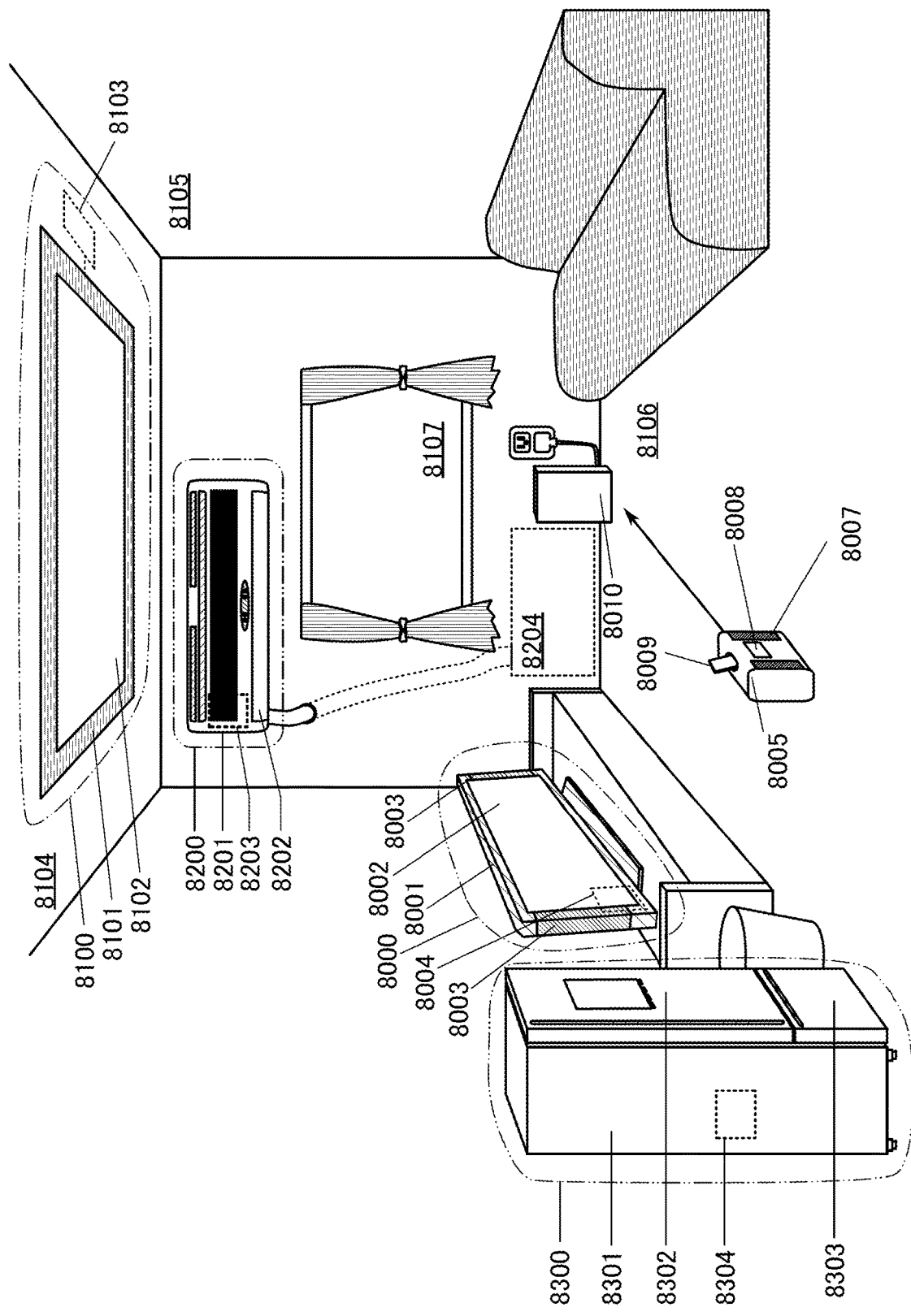
FIG. 22 is a drawing illustrating electronic devices of embodiments of the present invention.

FIG. 22 illustrates other examples of electronic devices. In FIG. 22, a display device 8000 is an example of an electronic device including the power storage system of one embodiment of the present invention. Specifically, the display device 8000 corresponds to a display device for TV broadcast reception and includes a housing 8001, a display portion 8002, speaker portions 8003, the secondary battery 8004, and the like. A detection system according to one embodiment of the present invention is provided in the housing 8001. The display device 8000 can receive electric power from a commercial power supply. Alternatively, the display device 8000 can use electric power stored in the secondary battery 8004.

A semiconductor display device such as a liquid crystal display device, a light-emitting device in which a light-emitting element such as an organic EL element is provided in each pixel, an electrophoretic display device, a DMD (Digital Micromirror Device), a PDP (Plasma Display Panel), or an FED (Field Emission Display) can be used for the display portion 8002.

An audio input device 8005 also uses a secondary battery. The audio input device 8005 includes the power storage system described in the above embodiments. The audio input device 8005 includes a plurality of sensors (an optical sensor, a temperature sensor, a humidity sensor, a pressure sensor, an illuminance sensor, a motion sensor, and the like) including a microphone, in addition to wireless communication elements. In accordance with an instruction spoken by a user, another device can be operated; for example, powering of the display device 8000 can be controlled, the amount of light of a lighting device 8100 can be adjusted, or the like. The audio input device 8005 is capable of audio operation of a peripheral device and replaces a manual remote controller.

The audio input device 8005 includes a wheel or a mechanical transfer means and is configured to be capable of, while listening to an instruction precisely with the incorporated microphone by moving in the direction in which speaking by a user can be heard, displaying the content on a display portion 8008 or performing touch input operation on the display portion 8008.

The audio input device 8005 can also function as a charging doc of a portable information terminal 8009 such as a smartphone. Electric power can be transmitted and received with a wire or wirelessly between the portable information terminal 8009 and the audio input device 8005. The portable information terminal 8009 does not particularly need to be carried indoors, and a load on the secondary battery and degradation thereof are desirably avoided while a necessary capacity is ensured. Thus, control or maintenance of the secondary battery or the like is desirably performed by the audio input device 8005. Since the audio input device 8005 includes the speaker 8007 and the microphone, hands-free conversation is possible even while the portable information terminal 8009 is charged. When the capacity of the secondary battery of the audio input device 8005 decreases, the audio input device 8005 moves in the direction indicated by the arrow and is charged by wireless charging from a charging module 8010 connected to an external power source.

The audio input device 8005 may be put on a stand. The audio input device 8005 may be provided with a wheel or a mechanical transfer means to move to a desired position. Alternatively, a stand or a wheel is not provided and the audio input device 8005 may be fixed to a desired position, for example, on the floor or the like.

Note that the display device includes, in its category, all of information display devices for personal computers, advertisement displays, and the like besides information display devices for TV broadcast reception.

In FIG. 22, the tabletop lighting device 8100 is an example of an electronic device using a secondary battery 8103 which is controlled by a microprocessor that controls charge (including an APS). Specifically, the lighting device 8100 includes a housing 8101, a light source 8102, the secondary battery 8103, and the like. Although FIG. 22 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103.

Note that although the tabletop lighting device 8100 provided on the ceiling 8104 is illustrated in FIG. 22 as an example, the secondary battery 8103 can be used as an installation lighting device provided in, for example, a side wall 8105, a floor 8106, a window 8107, or the like other than the ceiling 8104. Alternatively, the secondary battery can be used in a tabletop lighting device or the like.

As the light source 8102, an artificial light source which emits light artificially by using power can be used. Specifically, an incandescent lamp, a discharge lamp such as a fluorescent lamp, and a light-emitting element such as an LED or an organic EL element are given as examples of the artificial light source.

In FIG. 22, an air conditioner including an indoor unit 8200 and an outdoor unit 8204 is an example of an electronic device using a secondary battery 8203. Specifically, the indoor unit 8200 includes a housing 8201, an air outlet 8202, the secondary battery 8203, and the like. Although FIG. 22 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203.

In FIG. 22, an electric refrigerator-freezer 8300 is an example of an electronic device using a secondary battery 8304. Specifically, the electric refrigerator-freezer 8300 includes a housing 8301, a door for refrigerator compartment 8302, a door for freezer compartment 8303, the secondary battery 8304, and the like. The secondary battery 8304 is provided in the housing 8301 in FIG. 22. The electric refrigerator-freezer 8300 can receive electric power from a commercial power supply. Alternatively, the electric refrigerator-freezer 8300 can use electric power stored in the secondary battery 8304.

In addition, in a time period when electronic devices are not used, particularly in a time period when the proportion of the amount of electric power which is actually used to the total amount of electric power which can be supplied from a commercial power source (such a proportion referred to as a usage rate of electric power) is low, electric power can be stored in the secondary battery, whereby an increase in the usage rate of electric power can be inhibited in a time period other than the above time period. For example, in the case of the electric refrigerator-freezer 8300, electric power can be stored in the secondary battery 8304 in night time when the temperature is low and the door for refrigerator compartment 8302 and the door for freezer compartment 8303 are not opened and closed. In daytime when the temperature is high and the door for refrigerator compartment 8302 and the door for freezer compartment 8303 are opened and closed, the secondary battery 8304 is used as an auxiliary power source; thus, the usage rate of electric power in daytime can be reduced.

A secondary battery can be provided in any electronic device other than the above-described electronic devices. According to one embodiment of the present invention, the secondary battery can have excellent cycle characteristics. Thus, the microprocessor that controls charge (including an APS) of one embodiment of the present invention is mounted on the electronic device described in this embodiment, whereby an electronic device with a longer lifetime can be obtained. This embodiment can be implemented in an appropriate combination with the other embodiments.

FIG. 23A to FIG. 23E show examples of electronic devices including the power storage system of one embodiment of the present invention. Examples of electronic devices to which the power storage system of one embodiment of the present invention is applied are television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines, and the like.

Figure 23A:
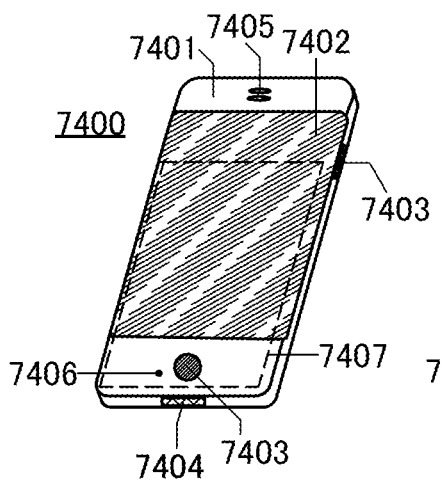
FIG. 23A, FIG. 23B, FIG. 23C, FIG. 23D, and FIG. 23E are drawings illustrating electronic devices of embodiments of the present invention.

FIG. 23A illustrates an example of a mobile phone. A mobile phone 7400 includes operation buttons 7403, an external connection port 7404, a speaker 7405, a microphone 7406, and the like in addition to a display portion 7402 incorporated in a housing 7401. The mobile phone 7400 includes the power storage system of one embodiment of the present invention. The power storage system of one embodiment of the present invention includes, for example, a storage battery 7407 and the battery protection circuit described in the above embodiment.

Figure 23B:
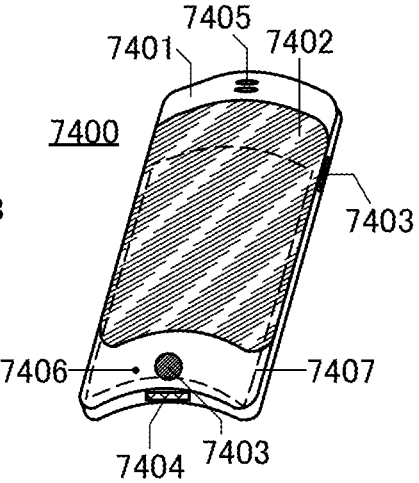
Figure 23C:
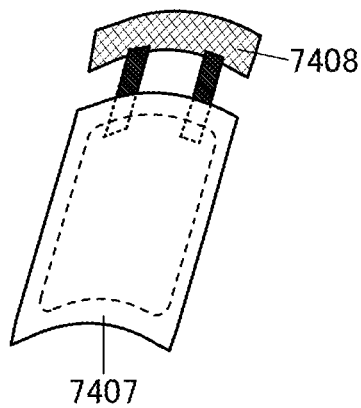

FIG. 23B illustrates the state where the mobile phone 7400 is curved. When the mobile phone 7400 is entirely curved by external force, the storage battery 7407 provided therein is also curved in some cases. In such a case, a storage battery having flexibility is preferably used as the storage battery 7407. FIG. 23C illustrates the state where the storage battery having flexibility is curved. A control circuit 7408 is electrically connected to the storage battery. The battery protection circuit described in the above embodiment can be used as the control circuit 7408.

A storage battery having a flexible shape can also be incorporated along a curved inside/outside wall surface of a house or a building or a curved interior/exterior surface of an automobile.

Figure 23D:
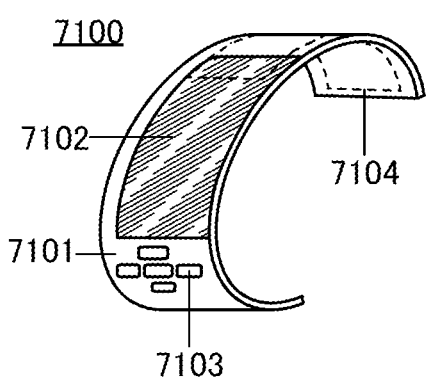

FIG. 23D illustrates an example of a bangle-type display device. A portable display device 7100 includes a housing 7101, a display portion 7102, operation buttons 7103, and the power storage system of one embodiment of the present invention. The power storage system of one embodiment of the present invention includes, for example, a storage battery 7104 and the battery protection circuit described in the above embodiment.

Figure 23E:
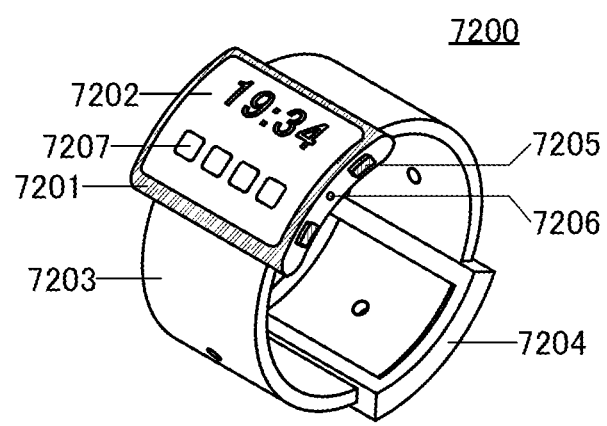

FIG. 23E shows an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. The display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication based on an existing communication standard. For example, mutual communication between the portable information terminal and a headset capable of wireless communication can be performed, and thus hands-free calling is possible.

The portable information terminal 7200 includes the input output terminal 7206, and data can be directly transmitted to and received from another information terminal via a connector. In addition, charge via the input output terminal 7206 is possible. The charge operation may be performed by wireless power feeding without using the input output terminal 7206.

The portable information terminal 7200 includes the power storage system of one embodiment of the present invention. The power storage system includes a storage battery and the battery protection circuit described in the above embodiment.

The portable information terminal 7200 preferably includes a sensor. As the sensor, for example, a human body sensor such as a fingerprint sensor, a pulse sensor, or a temperature sensor, a touch sensor, a pressure sensitive sensor, an acceleration sensor, or the like is preferably mounted.

This embodiment can be combined with any of the other embodiments as appropriate.

EXAMPLE

Example 1

In this example, a structure example of a change-over switch of a battery protection circuit which was actually fabricated will be described. In this example, the results of evaluating a change-over switch 13G fabricated using the transistor 25 with a back gate electrode illustrated in FIG. 11C will be described.

Figure 24A:
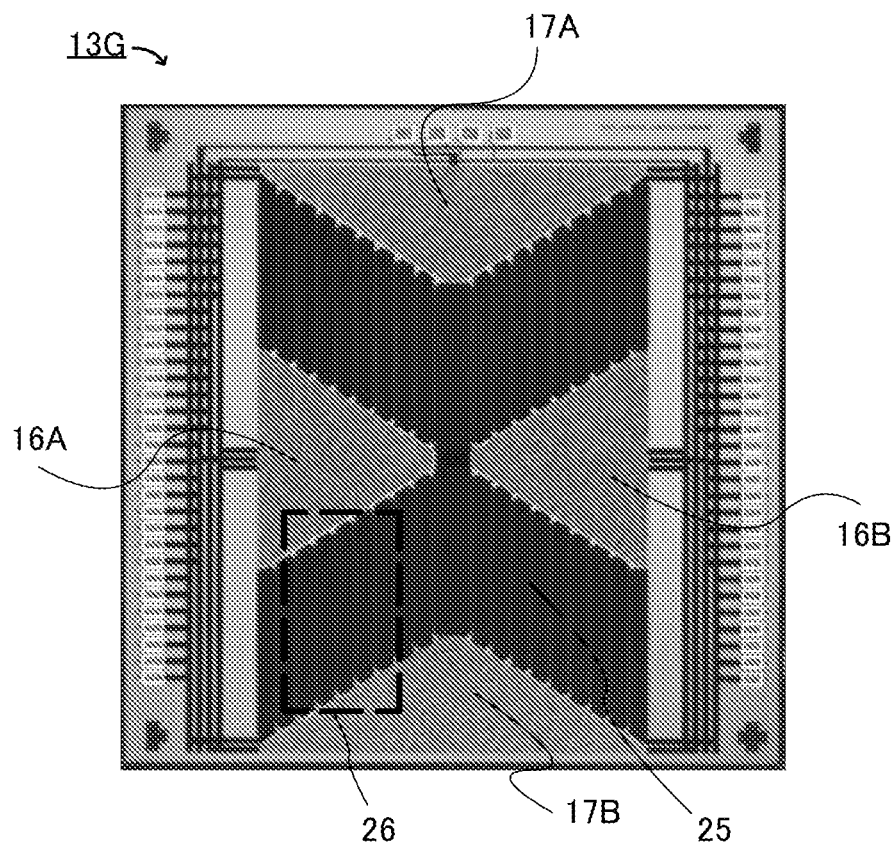
FIG. 24A and FIG. 24B are layout diagrams illustrating Example of the present invention.

FIG. 24A shows a top-view layout of the change-over switch 13G. FIG. 24A shows an X-shaped region 26 in which a plurality of transistors 25 for controlling electrical connection between terminals 16A and 16B and terminals 17A and 17B are provided. The terminal 16A and the terminal 16B are electrically connected to each other to function as the terminal 16. The terminal 17A and the terminal 17B are electrically connected to each other to function as the terminal 17. Note that the terminal 16A, the terminal 16B, the terminal 17A, and the terminal 17B shown in the top-view layout can function as electrodes to which wirings for external connection are connected.

Note that the shapes of the electrodes functioning as the terminal 16 and the terminal 17 when seen from above are preferably such that the distances between the wirings for external connection and the region 26 are equal to each other. Preferred examples include a circular shape or a triangular shape as shown in FIG. 24A. Favorably, the region where the terminals 16A and 16B or the terminals 17A and 17B which function as the drain side of the transistor 25 are provided is designed wider than the region 26 to have reduced wiring resistance and a high heat dissipation property so that heat generation due to current flow is reduced.

Figure 24B:
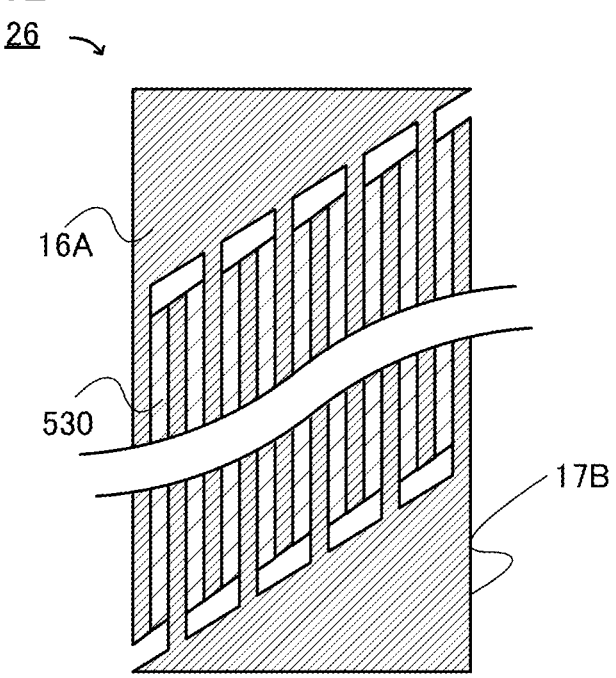

In the region 26, the plurality of transistors 25 are provided. FIG. 24B shows a top-view layout corresponding to the region 26 shown in FIG. 24A. In FIG. 24B, the oxide 530 described in Embodiment 2 is provided between comb-like electrodes extending from the terminal 16A and the terminal 17B.

Figure 25A:
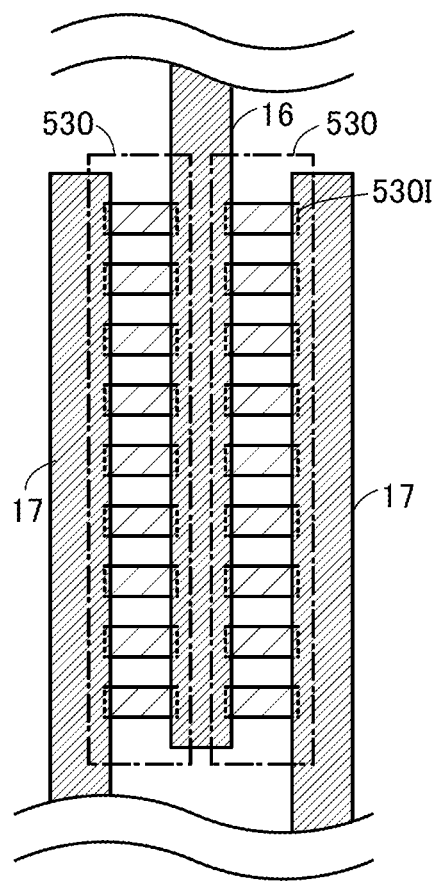
FIG. 25A and FIG. 25B are layout diagrams illustrating Example of the present invention.

Note that a semiconductor layer formed using the oxide 530 has a structure in which a plurality of island-like oxides 530I are provided between the electrodes shown as the terminal 16 and the terminal 17 as illustrated in FIG. 25A. This structure can suppress fluctuation in the electrical characteristics of the transistors 25.

Figure 25B:
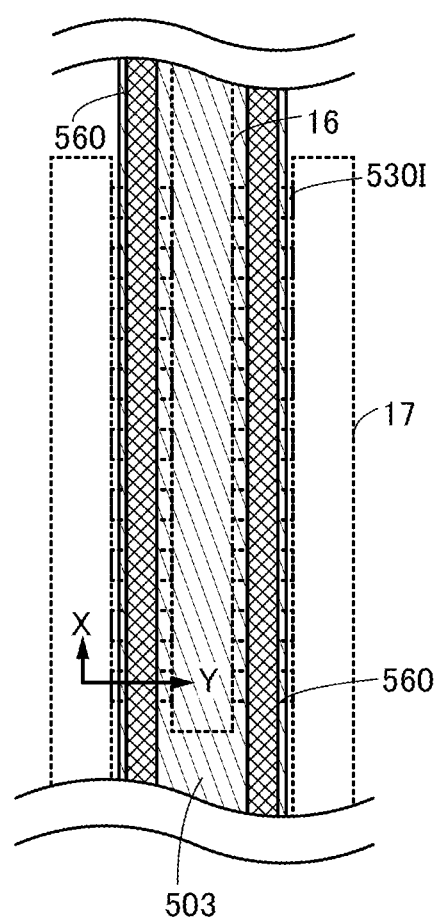

In FIG. 25B, the electrodes functioning as the terminal 16 and the terminal 17 are indicated with dotted lines. FIG. 25B shows the conductor 560 functioning as the gate electrode and the conductor 503 functioning as the back gate electrode, which overlap with the island-like oxides 530I.

Figure 26A:
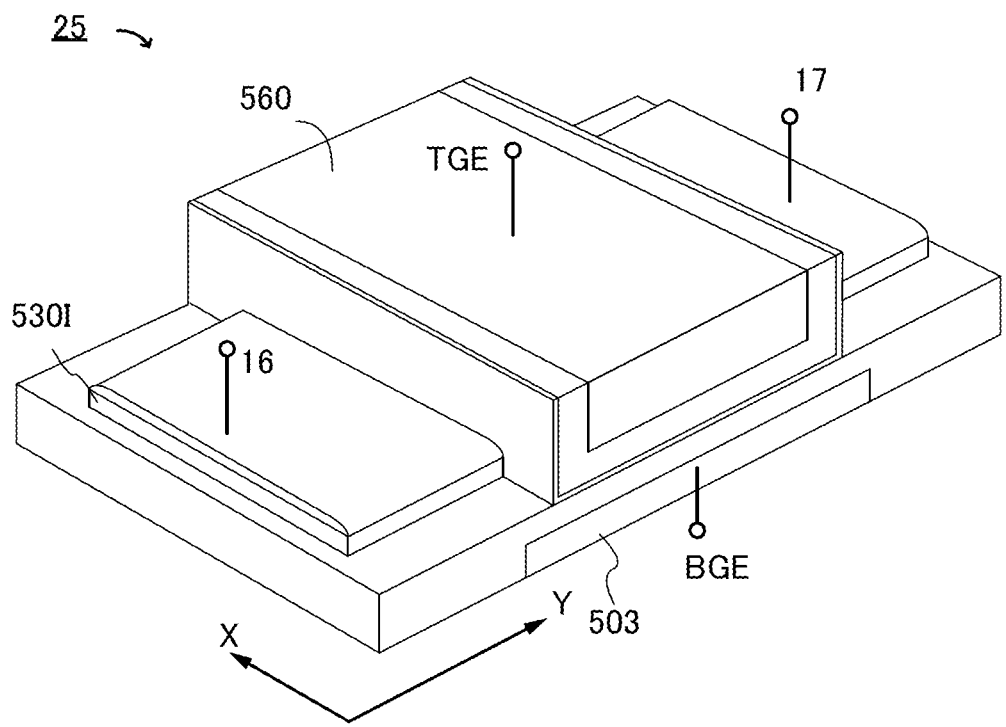
FIG. 26A and FIG. 26B are a perspective view and a circuit diagram illustrating Example of the present invention.
Figure 26B:
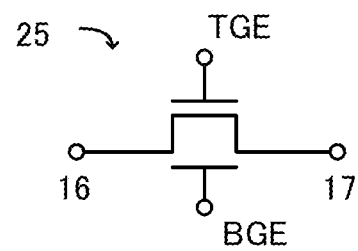

FIG. 26A shows a perspective view of the transistor 25 in the X direction and the Y direction indicated in FIG. 25B. FIG. 26A illustrates the conductor 560 and the conductor 503 overlapping with the island-like oxide 530I. In FIG. 26B, the conductor 503 is the back gate electrode and is shown as an electrode BGE. In FIG. 26B, the conductor 560 is the top gate electrode and is shown as an electrode TGE. In FIG. 26B, one end of the island-like oxide 530I sandwiched between the conductors 503 and 560 is shown as the terminal 16, and the other end is shown as the terminal 17. The transistor illustrated in FIG. 26A can be represented by the symbol shown in FIG. 26B.

Figure 27:
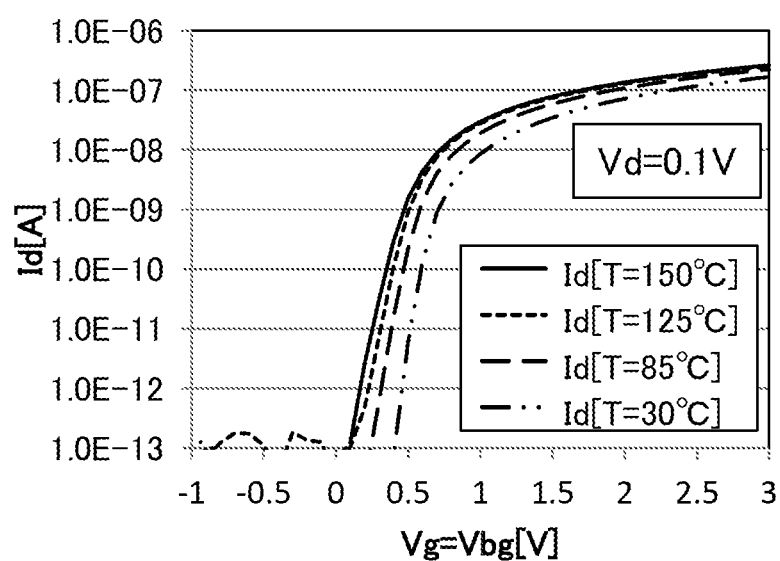
FIG. 27 is a graph illustrating Example of the present invention.

The electrical characteristics of the transistor 25 illustrated in FIG. 26A and FIG. 26B will be described. FIG. 27 shows temperature dependence of a change in drain current (Id) as a function of voltage applied to the gate electrode (gate voltage: Vg) and voltage applied to the back gate electrode (back gate voltage: Vbg), which is one example of electrical characteristics of a transistor. Note that the transistor used for the measurement had a channel length of 0.350 μm and a channel width of 0.350 μm. The temperature conditions under which the measurement was performed were 30° C., 85° C., 125° C., and 150° C. The drain voltage was 0.1 V. FIG. 27 is a graph of the drain current on a logarithmic scale, where the gate voltage and the back gate voltage changed are equal to each other.

As shown in FIG. 27, the transistor characteristics were achieved where the drain current constantly increased, instead of decreasing with increasing temperature from 30° C. to 150° C.

Figure 28:
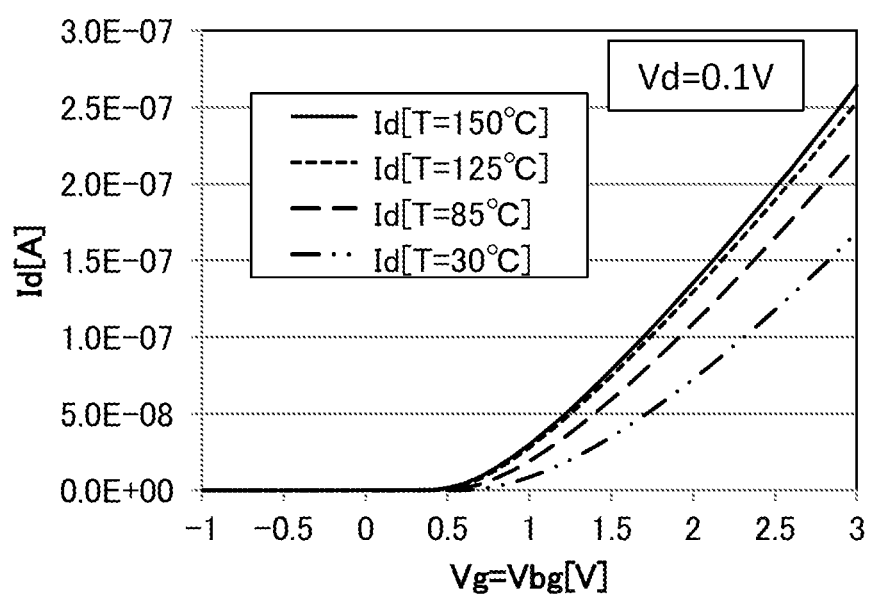
FIG. 28 is a graph illustrating Example of the present invention.

FIG. 28 shows a graph of the drain current on a linear scale, where the gate voltage and the back gate voltage changed are equal to each other, which shows temperature dependence of a change in the drain current as a function of the gate voltage and the back gate voltage. The temperature conditions under which the measurement was performed were 30° C., 85° C., 125° C., and 150° C. The drain voltage was 0.1 V.

As shown in FIG. 28, the transistor characteristics were achieved where the drain current constantly increased, instead of decreasing with increasing temperature from 30° C. to 150° C.

Figure 29:
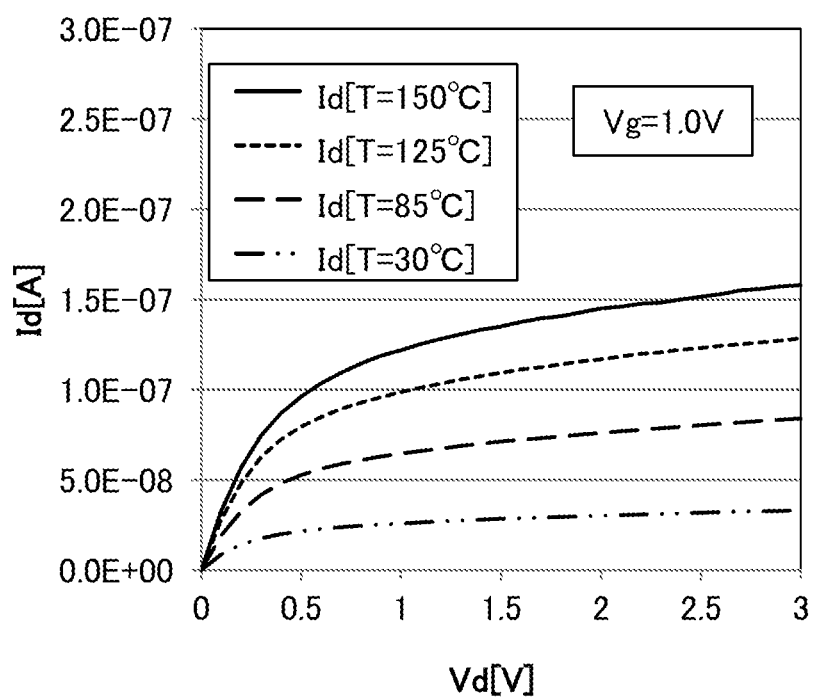
FIG. 29 is a graph illustrating Example of the present invention.

FIG. 29 shows a graph of the drain current on a linear scale, where the gate voltage and the back gate voltage changed are equal to each other, which shows temperature dependence of a change in the drain current as a function of the drain voltage. The temperature conditions under which the measurement was performed were 30° C., 85° C., 125° C., and 150° C. The gate voltage and the back gate voltage were 1.0 V.

As shown in FIG. 29, the transistor characteristics were achieved where the drain current constantly increased, instead of decreasing with increasing temperature from 30° C. to 150° C.

Figure 30:
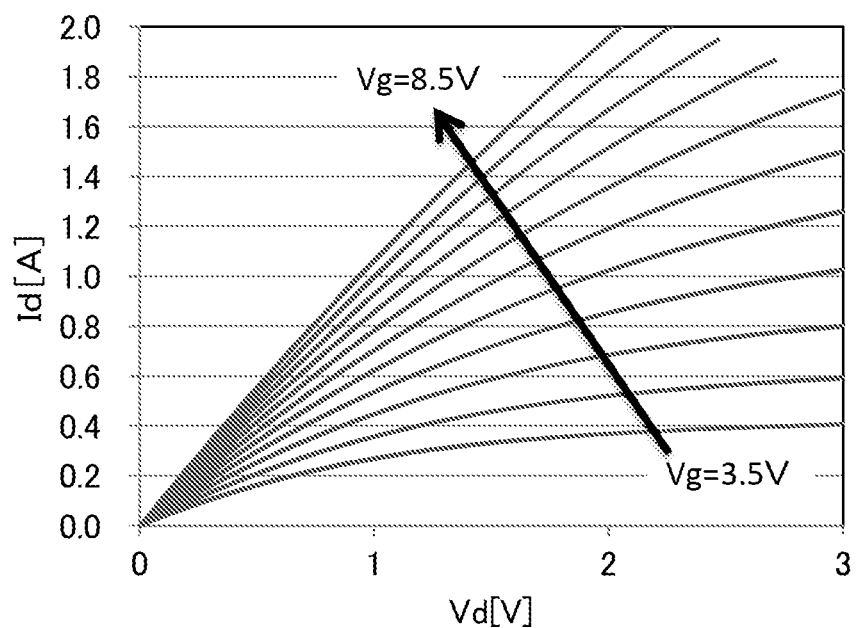
FIG. 30 is a graph illustrating Example of the present invention.

FIG. 30 shows the drain current as a function of the drain voltage when the back gate voltage was 0 V, i.e., single-gate driving was performed, and the gate voltage was varied from 3.5 V to 8.5 V in steps of 0.5 V. Although the measurement was performed at room temperature (25° C.), the measured temperature of the package was 55° C. owing to self-generated heat.

As shown in FIG. 30, favorable output characteristics were achieved with each voltage although the drain current increased as the gate voltage increased from 3.5 V to 8.5 V.

Figure 31:
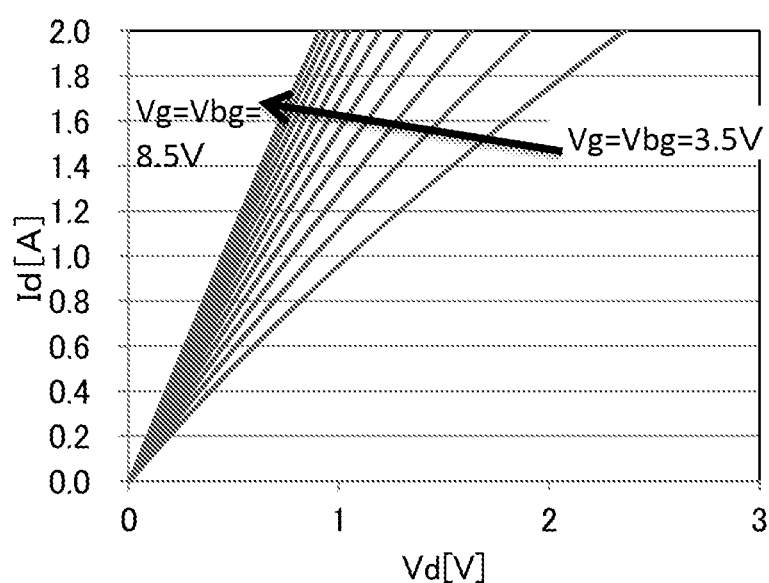
FIG. 31 is a graph illustrating Example of the present invention.

FIG. 31 shows the drain current as a function of the drain voltage when both the back gate voltage and the gate voltage were varied from 3.5 V to 8.5 V in steps of 0.5 V, i.e., when dual-gate driving was performed. Although the measurement was performed at room temperature (25° C.), the measured temperature of the package was 56° C. owing to self-generated heat.

As shown in FIG. 31, favorable output characteristics were achieved with each voltage although the drain current increased as the back gate voltage and the gate voltage both increased from 3.5 V to 8.5 V.

Figure 32:
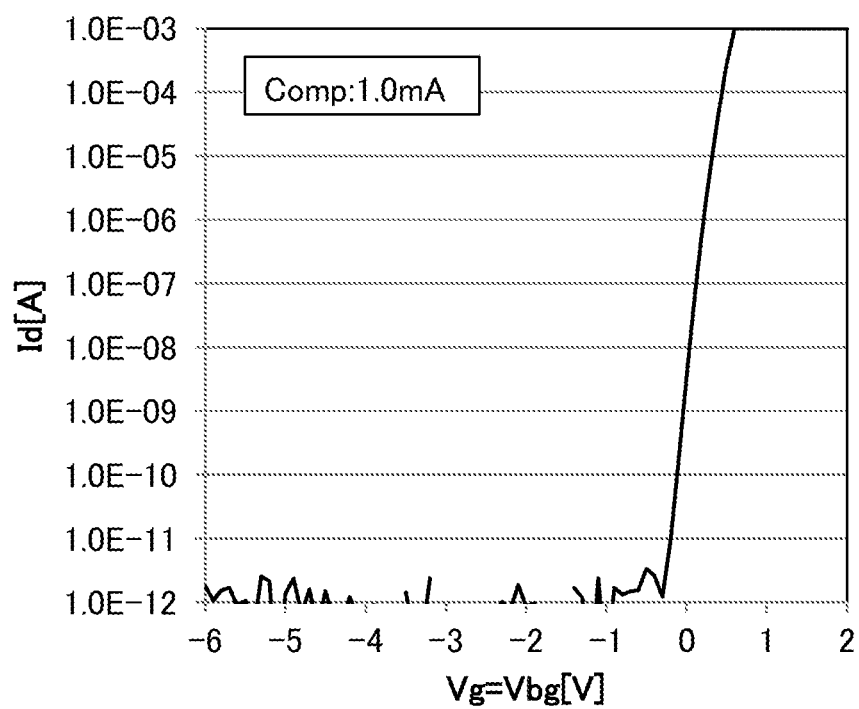
FIG. 32 is a graph illustrating Example of the present invention.

FIG. 32 shows a graph of the drain current on a logarithmic scale at the time of performing dual-gate driving in which the gate voltage and the back gate voltage changed are equal to each other, which shows a change in the drain current as a function of the gate voltage and the back gate voltage. The temperature condition under which the measurement was performed was 30° C.

As shown in FIG. 32, transistor characteristics with an extremely low off-state current and an abrupt change in drain current were achieved. Note that "Comp: 1 mA" in FIG. 32 means that "the data was obtained by the measurement where the upper limit of the current value measurable by a measurement apparatus was set to 1 mA". The same applies to FIG. 33.

Figure 33:
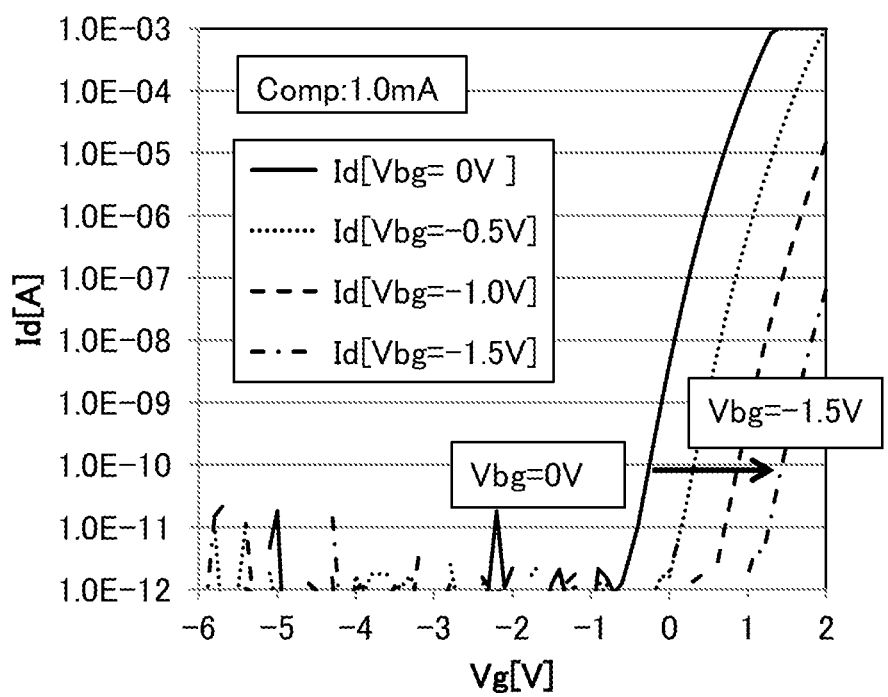
FIG. 33 is a graph illustrating Example of the present invention.

FIG. 33 shows a change in the drain current as a function of the gate voltage at the time of dual-gate driving in which the back gate voltage was varied from 0 V to −1.5 V in steps of −0.5 V. The temperature condition under which the measurement was performed was 30° C.

As shown in FIG. 33, the Id–Vg curve shifts in the positive direction as the back gate voltage decreases from 0 V to −1.5 V, which shows that the transistor characteristics such as threshold voltage can be switched.

Figure 34:
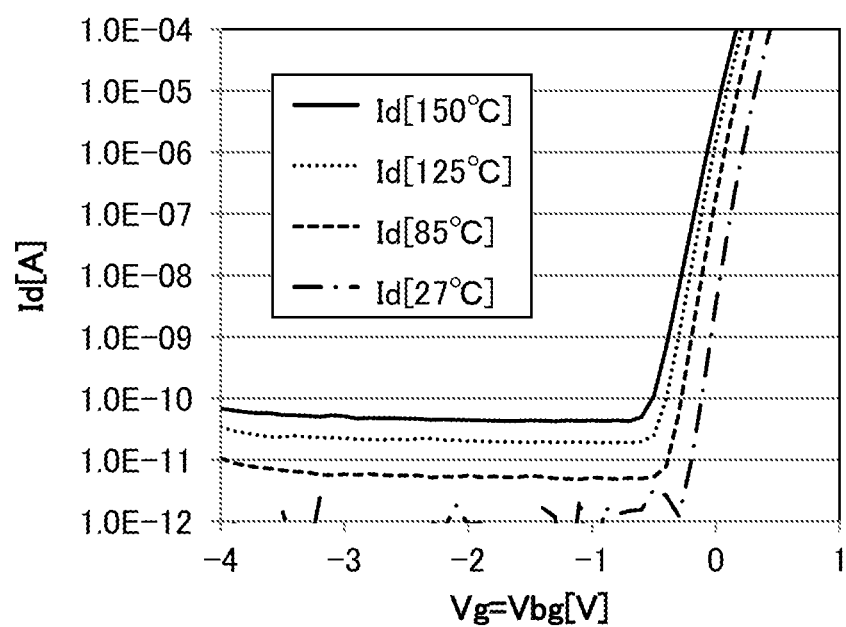
FIG. 34 is a graph illustrating Example of the present invention.

FIG. 34 shows a graph of the drain current on a logarithmic scale, where the gate voltage and the back gate voltage changed are equal to each other, which shows a change in the drain current as a function of the gate voltage and the back gate voltage. The temperature conditions under which the measurement was performed were 27° C., 85° C., 125° C., and 150° C.

As shown in FIG. 34, favorable output characteristics were achieved under each temperature condition although the off-state current increased as the temperature increased.

The electrical characteristics of the above-described transistor including an oxide semiconductor in its semiconductor layer can be switched by control of the back gate voltage. Specifically, switching between a state where a high current is supplied and a state where the off-state current is extremely low is possible. Thus, a battery protection circuit or the like that can have reduced power consumption can be obtained.

Example 2

In this example, the relation between the channel length L and channel width W of an OS transistor of one embodiment of the present invention and the reliability of the OS transistor will be described. Specifically, behavior of the ΔVsh of the OS transistor in +GBT (Gate Bias Temperature) stress tests and noise in drain current of the OS transistor were evaluated as the reliability of the OS transistor.

<Behavior of ΔVsh of OS Transistor in +GBT Stress Test>

Behavior of the ΔVsh of the OS transistor in +GBT stress tests will be described below.

Note that in the following description, shift voltage (Vsh) is defined as Vg at which, in a drain current (Id)–gate voltage (Vg) curve of a transistor, the tangent at a point where the slope of the curve is the steepest intersects the straight line of Id=1 pA. Furthermore, the amount of change in shift voltage is represented by ΔVsh.

The ΔVsh of an OS transistor under a +GBT stress test shifts in the negative direction with time in some cases. In other cases, the ΔVsh shows the behavior of changing in both the negative direction and the positive direction, instead of changing in the negative direction. Note that this behavior is sometimes referred to as jagged behavior in +GBT stress tests in this specification and the like.

First, a method for calculating the amount of change in jagged behavior (which is referred to as the amount of jaggedness in some cases) in a +GBT stress test will be described. Here, the case where an Id–Vg curve is measured at Time $T_i$ (i is an integer greater than or equal to one and less than or equal to N) in a +GBT stress test is considered.

The number of times of measuring an Id–Vg curve between Time $T_1$ and Time $T_N$ is N (N is an integer of two or more). At this time, the value of ΔVsh calculated from the Id–Vg curve measured at Time $T_i$ is $v_i$. Furthermore, the value of ΔVsh smoothed with a moving average filter at Time $T_i$ is $u_i$. Note that examples of moving average include simple moving average, weighted moving average, and exponential moving average, any of which may be used. In this example, simple moving average was used.

Note that in the case where no Id–Vg curve is measured before Time $T_1$, $u_i$ cannot be calculated at and around Time $T_1$. Accordingly, the number of $v_i$'s and the number of $u_i$'s cannot be the same. "At and around Time $T_1$" specifically means Time $T_i$ where i is greater than or equal to one and less than or equal to k, when employing k such that the number M of the terms at the time of taking an average is 2k+1 or 2k (k is an integer greater than or equal to one and less than or equal to (N−1)/2). Thus, in the calculation of $u_i$ at and around Time $T_1$, the number M of the terms at the time of taking an average is reduced. Specifically, in the calculation of $u_i$ at and around Time $T_1$, the number of the terms is reduced to 2i−1. As a result, the number of $v_i$'s and the number of $u_i$'s can be the same.

Furthermore, in the case where no Id–Vg curve is measured after Time $T_N$, $u_i$ cannot be calculated at and around Time $T_N$. Accordingly, the number of $v_i$'s and the number of $u_i$'s cannot be the same. "At and around Time $T_N$" specifically means Time $T_i$ where i is greater than or equal to N−k+1 and less than or equal to N, when employing k such that the number M of the terms at the time of taking an average is 2k+1 or 2k. Thus, in the calculation of $u_i$ at and around Time $T_N$, the number M of the terms at the time of taking an average is reduced. Specifically, in the calculation of $u_i$ at and around Time $T_N$, the number of the terms is reduced to 2(N−i)+1. As a result, the number of $v_i$'s and the number of $u_i$'s can be the same.

Standard deviation σ of ΔVsh calculated from the Id–Vg curve measured between Time $T_1$ and Time $T_N$ is calculated by the following formula. Note that in this specification, the standard deviation σ calculated by the following formula is defined as the amount of jaggedness.

$$\sigma = \sqrt{\frac{1}{N}\sum_{i=1}^{N}(v_i - u_i)^2}$$ [Formula 1]

The above is the method for calculating the amount of jaggedness.

Next, samples used for the measurement of the amount of jaggedness will be described.

As the samples, 11 kinds of samples each of which included transistors corresponding to the transistor 500 illustrated in FIG. 15 and between which the channel length L and the channel width W of the transistors were different were fabricated. Note that the number of the transistors included in each of the 11 kinds of samples is five.

Note that the reference numerals used for the transistor 500 illustrated in FIG. 15 are used in the following description of the above 11 kinds of samples.

As the insulator 512, silicon oxide was used. As the insulator 514, a stacked-layer structure of silicon nitride and aluminum oxide was used. As the insulator 516, silicon oxynitride was used. As the conductor 503, a stacked-layer structure of tantalum nitride, titanium nitride, tungsten, titanium nitride, and tungsten was used.

As the insulator 522, hafnium oxide formed by an ALD method was used. As the insulator 524, silicon oxynitride formed by a CVD method was used. Note that the insulator 520 was not provided in this example.

As the oxide 530a, a metal oxide formed to a thickness of 5 nm by a sputtering method using an oxide target with In:Ga:Zn=1:3:4 [atomic ratio] was used. As the oxide 530b, a metal oxide formed to a thickness of 15 nm by a sputtering method using an oxide target with In:Ga:Zn=4:2:4.1 [atomic ratio] was used.

As the conductor 542a and the conductor 542b, tantalum nitride formed by a sputtering method was used. As the insulator 544, a stacked-layer structure of aluminum oxide formed by a sputtering method and aluminum oxide formed by an ALD method was used. As the insulator 580, a stacked-layer structure of silicon oxide formed by a sputtering method and silicon oxynitride formed by a CVD method was used.

As the oxide 530c, a stacked-layer structure of a metal oxide formed by a sputtering method using an oxide target with In:Ga:Zn=4:2:4.1 [atomic ratio] and a metal oxide formed by a sputtering method using an oxide target with In:Ga:Zn=1:3:4 [atomic ratio] was used.

As the insulator 550, silicon oxynitride formed by a CVD method was used. As the conductor 560a, titanium nitride formed by a CVD method was used. As the conductor 560b, tungsten deposited by a CVD method was used.

As the insulator 574, a stacked-layer structure of aluminum oxide formed by an ALD method and silicon nitride formed by a sputtering method was used. As the insulator 581, silicon oxynitride deposited by a CVD method was used.

Among the above 11 kinds of samples, the group of the samples including the transistors whose designed value of the channel length L is equal to that of the channel width W (L/W=70 nm/70 nm, L/W=80 nm/80 nm, L/W=100 nm/100 nm, L/W=200 nm/200 nm, and L/W=350 nm/350 nm) is referred to as Sample Group A. Among the above 11 kinds of samples, the group of the samples including the transistors whose designed value of the channel width W is 60 nm (L/W=60 nm/60 nm, L/W=70 nm/60 nm, L/W=80 nm/60 nm, L/W=100 nm/60 nm, L/W=200 nm/60 nm, and L/W=350 nm/60 nm) is referred to as Sample Group B.

The above is the description of the 11 kinds of samples.

Next, Id–Vg curves of the five transistors included in each of the 11 kinds of samples fabricated were measured. In other words, the amounts of jaggedness of 55 transistors were calculated. Note that in the measurement of the Id–Vg curves, the temperature was 150° C., a drain potential Vd was 2.5 V, a back gate potential Vbg was 0 V, a source potential Vs was 0 V, and a gate potential Vg was swept from −3.3 V to +3.3 V in steps of 0.1 V.

The ΔVsh was calculated from the Id–Vg curves obtained by the above measurement, and the amount of jaggedness in each transistor was calculated.

Figure 35:
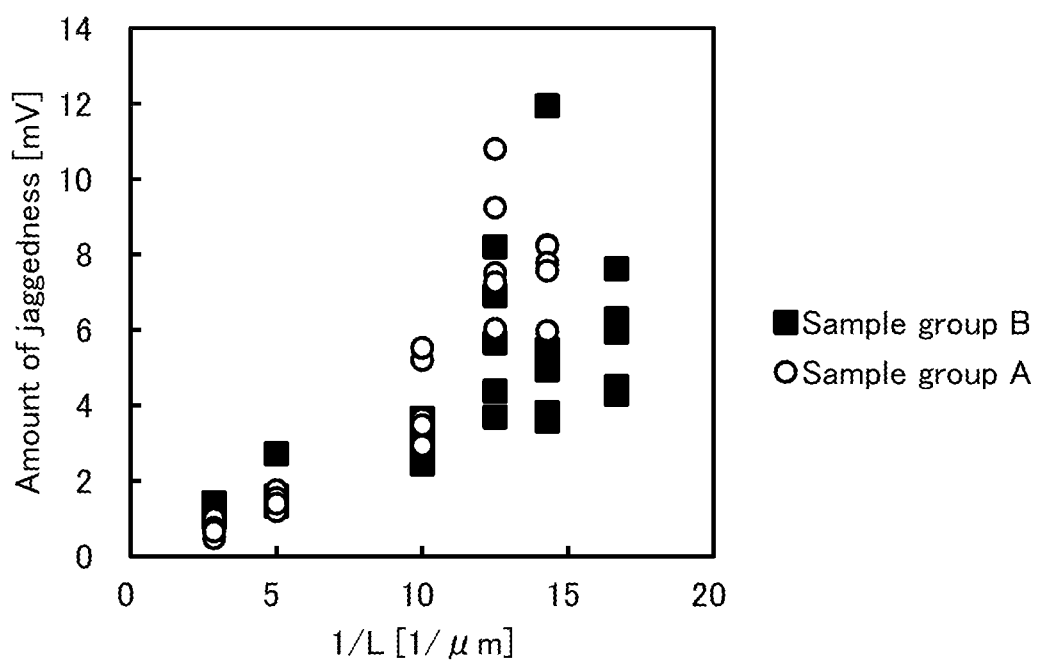
FIG. 35 is a graph showing results of measuring channel length and channel width dependences of the amount of jaggedness.

FIG. 35 shows the results of measuring dependence of the amount of jaggedness on the channel length L and the channel width W. In FIG. 35, the horizontal axis represents the inverse of the channel length L (1/L) [1/μm] and the vertical axis represents the amount of jaggedness [mV]. Note that circles shown in FIG. 35 indicate measurement results of Sample Group A (the group of the samples including the transistors whose designed value of the channel length is equal to that of the channel width), and squares shown in FIG. 35 indicate measurement results of Sample Group B (the group of the samples including the transistors whose designed value of the channel width W is 60 nm).

FIG. 35 reveals that the larger the channel length L is, the smaller the amount of jaggedness tends to be. Furthermore, the smaller amounts of jaggedness tended to fluctuate less.

From the above, in the case of transistor miniaturization, it is preferable that the transistor have a large channel length L. For example, the channel length L of the transistor is preferably greater than or equal to 80 nm and less than or equal to 400 nm, further preferably greater than or equal to 100 nm and less than or equal to 350 nm. This makes it possible to maintain the reliability of the transistor while reducing the footprint of the transistor.

<Noise in Drain Current of OS Transistor>

Noise in drain current of OS transistors will be described below.

A factor in causing noise in drain current of a transistor is 1/f noise. The 1/f noise is a frequency component of current fluctuation that increases inversely with frequency f. Models of the 1/f noise include a model in which the 1/f noise is regarded as resulting from fluctuation in carrier concentration and a model in which the 1/f noise is regarded as resulting from fluctuation in mobility. In the model in which the 1/f noise is regarded as resulting from fluctuation in carrier concentration, electrons are expected to be bound by defects or to be released from defects. In other words, by reducing the density of defect states, the 1/f noise can be reduced.

The noise in drain current of a transistor can be evaluated using a value ($S_{Id}/Id^2$) which is obtained by normalizing spectral density $S_{Id}$ of noise power of drain current by drain current Id with a 1/f noise measurement system.

In this example, a 1/f noise measurement system manufactured by Agilent Technologies, Inc. was used to measure the noise in drain current of the transistors. The Agilent B1500A semiconductor device analyzer and the Agilent E5052B signal source analyzer were used. As a prober, SUMMIT 11000B-M manufactured by Cascade Microtech, Inc. (with a temperature regulation function (from 213 K to 473 K)) was used. The measurement was performed in a dark environment. The measurement range was within the specifications of voltage and current of the measurement equipment (200 V/1 A or 100 V/100 mA) and the specifications of frequency (5 Hz to 40 MHz).

Next, samples evaluated with the 1/f noise measurement system will be described.

As the samples, six kinds of samples (Sample Group C) each of which included a transistor corresponding to the transistor 500 illustrated in FIG. 15 and between which the channel length and the channel width of the transistor were different were fabricated.

Note that the reference numerals used for the transistor 500 illustrated in FIG. 15 are used in the following description of the above Sample Group C. Differences of the above Sample Group C from the above Sample Group A and the above Sample Group B will be mainly described and their commonalities will not be described.

The transistor included in each sample of the above Sample Group C includes a metal oxide formed by a sputtering method using an oxide target with In:Ga:Zn=1:

3:4 [atomic ratio], between the oxide 530b and the conductor 542a and between the oxide 530b and the conductor 542b.

The designed values of the channel length L and the channel width W of the transistors included in the samples of the above Sample Group C are L/W=60 nm/60 nm, L/W=80 nm/80 nm, L/W=100 nm/100 nm, L/W=350 nm/350 nm, L/W=100 nm/60 nm, and L/W=350 nm/60 nm.

The above is the description of Sample Group C.

Next, results of evaluating the noise in the drain current of the transistor included in each sample of the above Sample Group C with the 1/f noise measurement system will be described.

Figure 36A:
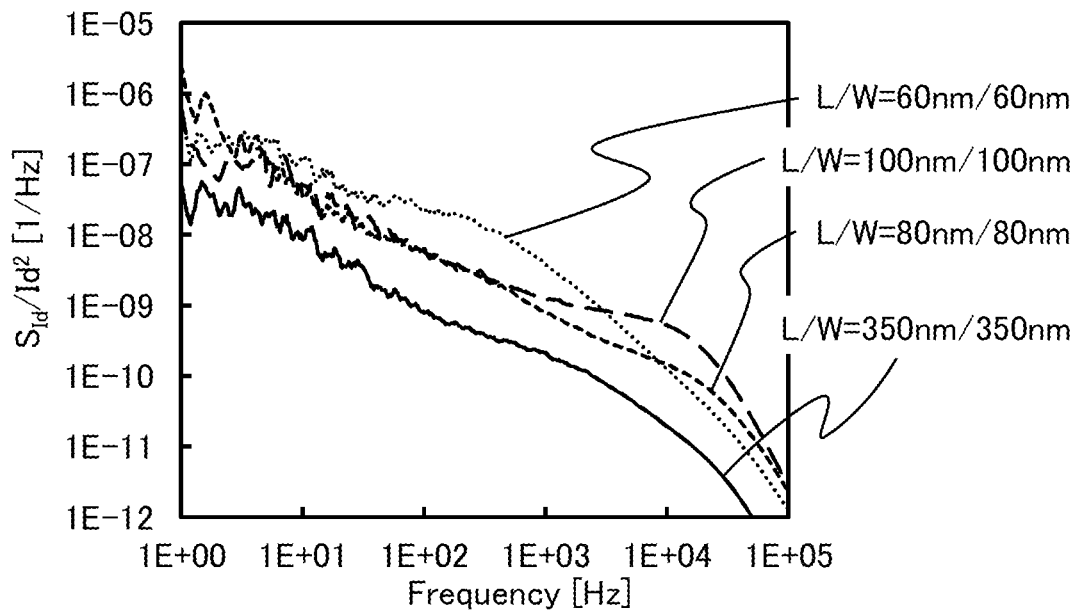
FIG. 36A and FIG. 36B are graphs showing results obtained using a 1/f noise measurement system.
Figure 36B:
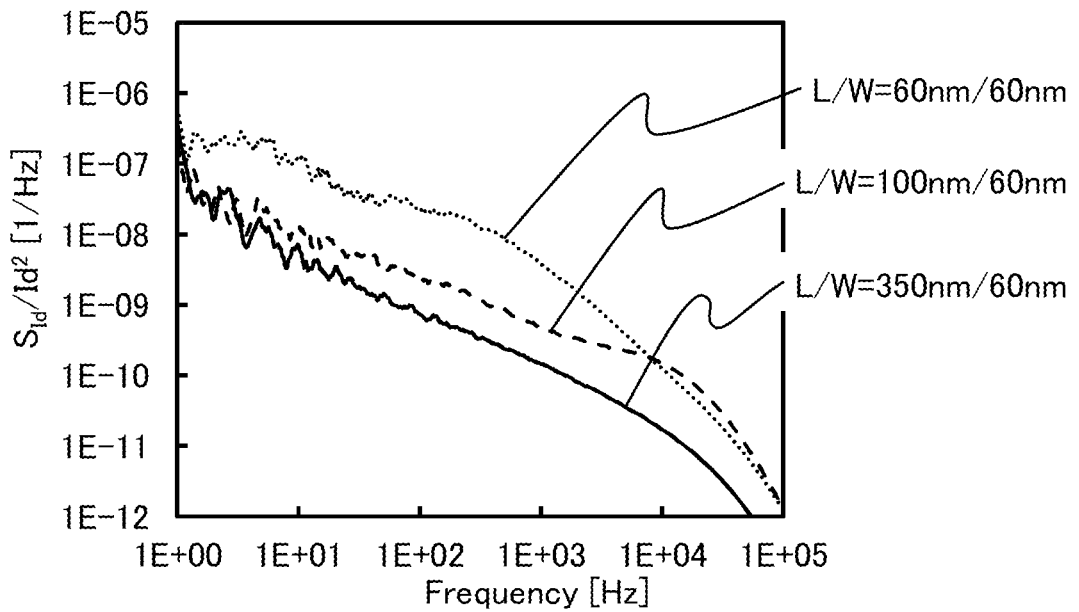

FIG. 36A and FIG. 36B show the results for the transistor included in each sample of Sample Group C, which were obtained using the 1/f noise measurement system. In FIG. 36A and FIG. 36B, the horizontal axis represents the frequency f of noise [Hz], and the range of the frequency f of noise is from 1 Hz to 100 kHz. The vertical axis represents the value $S_{Id}/Id^2$ [1/Hz] which was obtained by normalizing the spectral density of the noise power of the drain current by the drain current.

FIG. 36A shows the results for the sample groups including the transistors whose designed value of the channel length L was equal to that of the channel width W (L/W=60 nm/60 nm, L/W=80 nm/80 nm, L/W=100 nm/100 nm, and L/W=350 nm/350 nm), out of the samples of Sample Group C. FIG. 36B shows the results for the sample groups including the transistors whose designed value of the channel width W was 60 nm (L/W=60 nm/60 nm, L/W=100 nm/60 nm, and L/W=350 nm/60 nm), out of the samples of Sample Group C.

FIG. 36A and FIG. 36B show that the frequency dependence of the noise is roughly proportional to 1/f at frequencies lower than 1 kHz, in particular, at frequencies lower than 100 Hz. Furthermore, the larger the channel length L of the transistor was, the smaller the value ($S_{Id}/Id^2$) obtained by normalizing the spectral density of the noise power of the drain current by the drain current tended to be.

Next, the correlation between the amount of jaggedness and the 1/f noise will be described.

To calculate the amount of jaggedness in the transistor of each sample of Sample Group C, the Id–Vg curve of each transistor was measured and the above-described method for calculating the amount of jaggedness was used.

The frequency dependence of the noise is substantially proportional to 1/f on the low frequency side as shown in FIG. 36A and FIG. 36B; thus, the spectral density ($S_{Id}/Id^2$) of the noise power of the drain current normalized by the drain current, which was obtained using the 1/f noise measurement system, was integrated by the frequency f by calculation, and the calculated value was used as an indicator of 1/f noise. Note that the range of the frequency f used for the integration was from 5 Hz to 1 kHz. The frequency range less than 5 Hz was excluded from the frequency range used for the integration because the frequency range less than 5 Hz is out of the apparatus specifications and the measurement values in that range are less reliable.

Figure 37:
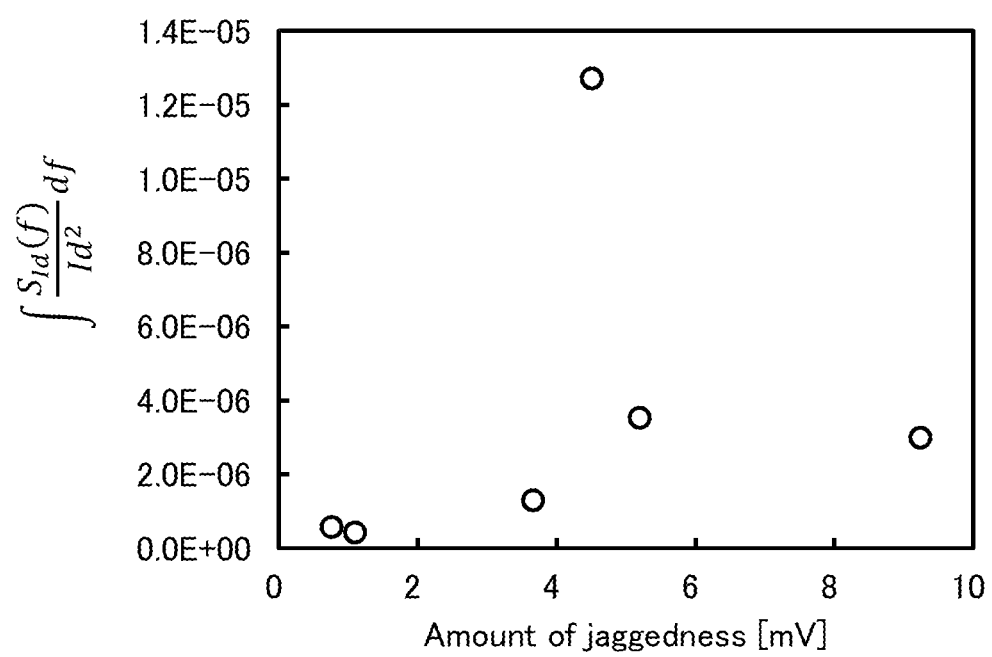
FIG. 37 is a graph illustrating correlation between the amount of jaggedness and 1/f noise.

FIG. 37 is a graph illustrating correlation between the amount of jaggedness and the 1/f noise in Sample Group C. In FIG. 37, the horizontal axis represents the amount of jaggedness [mV] and the vertical axis represents the value obtained by integrating, by the frequency f, the spectral density of the noise power of the drain current normalized by the drain current.

FIG. 37 reveals that the smaller the amount of jaggedness is, the smaller the 1/f noise tends to be.

From the above, in the case of transistor miniaturization, a large channel length L of the transistor can reduce the amount of jaggedness and/or the 1/f noise and can increase the reliability of the transistor. For example, the channel length L of the transistor is preferably greater than or equal to 80 nm and less than or equal to 400 nm, further preferably greater than or equal to 100 nm and less than or equal to 350 nm.

In the OS transistor described in this example, the 1/f noise can be reduced by control of the channel length L. Thus, the OS transistor can be suitably used for a battery protection circuit capable of reducing power consumption.

This example can be implemented in an appropriate combination with the structures described in the embodiments, the other example, and the like.

(Supplementary Notes on the Description in this Specification and the Like)

The description of the above embodiments and each structure in the embodiments are noted below.

One embodiment of the present invention can be constituted by combining, as appropriate, the structure described in each embodiment with any of the structures described in the other embodiments and Examples. In addition, in the case where a plurality of structure examples are described in one embodiment, the structure examples can be combined as appropriate.

Note that content (or may be part of the content) described in one embodiment can be applied to, combined with, or replaced with another content (or may be part of the content) described in the embodiment and/or content (or may be part of the content) described in another embodiment or other embodiments.

Note that in each embodiment, content described in the embodiment is content described using a variety of diagrams or content described with text disclosed in the specification.

Note that by combining a diagram (or may be part thereof) described in one embodiment with another part of the diagram, a different diagram (or may be part thereof) described in the embodiment, and/or a diagram (or may be part thereof) described in another embodiment or other embodiments, much more diagrams can be formed.

In addition, in this specification and the like, components are classified on the basis of the functions, and shown as blocks independent of one another in block diagrams. However, in an actual circuit or the like, it is difficult to separate components on the basis of the functions, and there are such a case where one circuit is associated with a plurality of functions and a case where a plurality of circuits are associated with one function. Therefore, blocks in the block diagrams are not limited by the components described in the specification, and the description can be changed appropriately depending on the situation.

Furthermore, in the drawings, the size, the layer thickness, or the region is shown with given magnitude for description convenience. Therefore, the size, the layer thickness, or the region is not necessarily limited to the illustrated scale. Note that the drawings are schematically shown for clarity, and embodiments of the present invention are not limited to shapes, values or the like shown in the drawings. For example, fluctuation in signal, voltage, or current due to noise, fluctuation in signal, voltage, or current due to difference in timing, or the like can be included.

In this specification and the like, expressions "one of a source and a drain" (or a first electrode or a first terminal) and "the other of the source and the drain" (or a second electrode or a second terminal) are used in the description of the connection relationship of a transistor. This is because the source and the drain of the transistor change depending on the structure, operating conditions, or the like of the transistor. Note that the source or the drain of the transistor can also be referred to as a source (drain) terminal, a source (drain) electrode, or the like as appropriate depending on the situation.

In addition, in this specification and the like, the terms "electrode" and "wiring" do not functionally limit these components. For example, an "electrode" is used as part of a "wiring" in some cases, and vice versa. Furthermore, the term "electrode" or "wiring" also includes the case where a plurality of "electrodes" or "wirings" are formed in an integrated manner, for example.

Furthermore, in this specification and the like, "voltage" and "potential" can be interchanged with each other as appropriate. The voltage refers to a potential difference from a reference potential, and when the reference potential is a ground voltage, for example, the voltage can be rephrased into the potential. The ground potential does not necessarily mean 0 V. Note that potentials are relative values, and a potential applied to a wiring or the like is sometimes changed depending on the reference potential.

Note that in this specification and the like, the terms such as "film" and "layer" can be interchanged with each other depending on the case or according to circumstances. For example, the term "conductive layer" can be changed into the term "conductive film" in some cases. As another example, the term "insulating film" can be changed into the term "insulating layer" in some cases.

In this specification and the like, a switch has a function of controlling whether current flows or not by being in a conduction state (an on state) or a non-conduction state (an off state). Alternatively, a switch has a function of selecting and changing a current path.

In this specification and the like, channel length refers to, for example, the distance between a source and a drain in a region where a semiconductor (or a portion where current flows in a semiconductor when a transistor is in an on state) and a gate overlap with each other or a region where a channel is formed in a top view of the transistor.

In this specification and the like, channel width refers to, for example, the length of a portion where a source and a drain face each other in a region where a semiconductor (or a portion where current flows in a semiconductor when a transistor is in an on state) and a gate electrode overlap with each other or a region where a channel is formed.

In this specification and the like, the expression "A and B are connected" includes the case where A and B are electrically connected as well as the case where A and B are directly connected. Here, the expression "A and B are electrically connected" includes the case where electrical signals can be transmitted and received between A and B when an object having any electric action exists between A and B.

REFERENCE NUMERALS

10: power storage device, 10A: power storage device, 10B: power storage device, 11: battery cell, 12: battery protection circuit, 12A: battery protection circuit, 12B: battery protection circuit, 13: switch circuit, 13A: switch circuit, 13C: switch circuit, 13D: switch circuit, 13E: switch circuit, 13F: switch circuit, 13G: switch circuit, 14: terminal, 15: terminal, 16: terminal, 16A: terminal, 16B: terminal, 17: terminal, 17A: terminal, 17B: terminal, 18: voltage detection circuit, 21: mechanical relay, 22: mechanical relay, 23: transistor, 23A: transistor, 24: transistor, 24A: transistor, 25: transistor, 26: region, 30: charge/discharge switching circuit, 31: transistor, 32: transistor, 33: mechanical relay, 40: charge control circuit, 41: diode element, 300: transistor, 311: substrate, 313: semiconductor region, 314a: low-resistance region, 314b: low-resistance region, 315: insulator, 316: conductor, 320: insulator, 322: insulator, 324: insulator, 326: insulator, 328: conductor, 330: conductor, 350: insulator, 352: insulator, 354: insulator, 356: conductor, 360: insulator, 362: insulator, 364: insulator, 366: conductor, 370: insulator, 372: insulator, 374: insulator, 376: conductor, 380: insulator, 382: insulator, 384: insulator, 386: conductor, 400: secondary battery, 401: positive electrode cap, 413: conductive plate, 414: conductive plate, 415: power storage system, 416: wiring, 420: control circuit, 421: wiring, 422: wiring, 423: wiring, 424: conductor, 425: insulator, 426: wiring, 500: transistor, 501: circuit board, 503: conductor, 503a: conductor, 503b: conductor, 509: label, 510: insulator, 511: terminal, 512: insulator, 513: secondary battery, 514: insulator, 515: sealant, 516: insulator, 517: antenna, 518: conductor, 519: layer, 520: insulator, 522: insulator, 524: insulator, 530: oxide, 530a: oxide, 530b: oxide, 530c: oxide, 530I: oxide, 531: secondary battery pack, 540a: conductor, 540b: conductor, 542a: conductor, 542b: conductor, 543a: region, 543b: region, 544: insulator, 546: conductor, 548: conductor, 550: insulator, 551: one, 552: the other, 560: conductor, 560a: conductor, 560b: conductor, 574: insulator, 580: insulator, 581: insulator, 582: insulator, 586: insulator, 590: control circuit, 590a: circuit system, 590b: circuit system, 600: capacitor, 610: conductor, 612: conductor, 620: conductor, 630: insulator, 640: insulator, 700: electronic component, 701: lead, 702: printed circuit board, 703: circuit portion, 704: circuit board, 7100: portable display device, 7101: housing, 7102: display portion, 7103: operation button, 7104: storage battery, 7200: portable information terminal, 7201: housing, 7202: display portion, 7203: band, 7204: buckle, 7205: operation button, 7206: input output terminal, 7207: icon, 7400: mobile phone, 7401: housing, 7402: display portion, 7403: operation button, 7404: external connection port, 7405: speaker, 7406: microphone, 7407: storage battery, 7408: control circuit, 8000: display device, 8001: housing, 8002: display portion, 8003: speaker portion, 8004: secondary battery, 8005: audio input device, 8007: speaker, 8008: display portion, 8009: portable information terminal, 8010: charging module, 8021: charging apparatus, 8022: cable, 8024: power storage system, 8100: lighting device, 8101: housing, 8102: light source, 8103: secondary battery, 8104: ceiling, 8105: side wall, 8106: floor, 8107: window, 8200: indoor unit, 8201: housing, 8202: air outlet, 8203: secondary battery, 8204: outdoor unit, 8300: electric refrigerator-freezer, 8301: housing, 8302: door for refrigerator compartment, 8303: door for freezer compartment, 8304: secondary battery, 8400: automobile, 8401: headlight, 8406: electric motor, 8500: automobile, 8600: motor scooter, 8601: side mirror, 8602: power storage system, 8603: indicator light, 8604: storage unit under seat, 8700: electric bicycle, 8701: storage battery, 8702: power storage system, 8703: display portion, 8704: control circuit, 9600: tablet terminal, 9601: laptop personal computer, 9625: switch, 9626: switch, 9627: power switch, 9628: operation switch, 9629: fastener, 9630: housing, 9630a: housing, 9630b: housing, 9630B: housing, 9631: display portion, 9633: solar cell, 9634: control circuit, 9635: power storage unit, 9640: movable portion, 9641: keyboard portion This application is based on Japanese Patent Application Serial No. 2018-215129 filed on Nov. 16, 2018, Japanese Patent Application Serial No. 2018-224703 filed on Nov. 30, 2018, and Japanese Patent Application Serial No. 2018-239482 filed on Dec. 21, 2018, the entire contents of which are hereby incorporated herein by reference.

The invention claimed is:

1. A battery protection circuit comprising a switch circuit for controlling charge and discharge of a battery cell,
   wherein the switch circuit comprises a mechanical relay, a first transistor, and a second transistor,
   wherein the switch circuit has a function of controlling electrical connection between a first terminal and a second terminal,
   wherein the mechanical relay has a function of breaking electrical connection between the first terminal and the second terminal,
   wherein the first transistor has a function of supplying first current between the first terminal and the second terminal,
   wherein the second transistor has a function of supplying second current between the first terminal and the second terminal, and
   wherein the first current is higher than the second current.

2. The battery protection circuit according to claim 1,
   wherein the first current is on-state current flowing between a source and a drain of the first transistor and the second current is on-state current flowing between a source and a drain of the second transistor.

3. The battery protection circuit according to claim 2,
   wherein first off-state current flowing between the source and the drain of the first transistor during off operation thereof is higher than second off-state current flowing between the source and the drain of the second transistor during off operation thereof.

4. A battery protection circuit comprising a switch circuit for controlling charge and discharge of a battery cell,
   wherein the switch circuit comprises a mechanical relay, a first transistor, and a second transistor,
   wherein the switch circuit has a function of controlling electrical connection between a first terminal and a second terminal,
   wherein the mechanical relay has a function of breaking electrical connection between the first terminal and the second terminal,
   wherein the first transistor has a function of supplying first current between the first terminal and the second terminal,
   wherein in the first transistor, a semiconductor layer comprising a channel formation region is formed of silicon,
   wherein the second transistor has a function of supplying second current between the first terminal and the second terminal,
   wherein in the second transistor, a semiconductor layer comprising a channel formation region is formed of an oxide semiconductor, and
   wherein the first current is higher than the second current.

5. The battery protection circuit according to claim 4,
   wherein the first current is on-state current flowing between a source and a drain of the first transistor and the second current is on-state current flowing between a source and a drain of the second transistor.

6. The battery protection circuit according to claim 5,
   wherein first off-state current flowing between the source and the drain of the first transistor during off operation thereof is higher than second off-state current flowing between the source and the drain of the second transistor during off operation thereof.

7. A battery protection circuit comprising a switch circuit for controlling charge and discharge of a battery cell,
   wherein the switch circuit has a function of controlling electrical connection between a first terminal and a second terminal,
   wherein the switch circuit comprises a first transistor,
   wherein the first transistor comprises a back gate electrode,
   wherein the first transistor is capable of switching first current and second current flowing between the first terminal and the second terminal during on operation, by control of voltage applied to the back gate electrode, and
   wherein the first current is higher than the second current.

8. A power storage device comprising:
   a battery cell; and
   a switch circuit for controlling charge and discharge of the battery cell,
   wherein the switch circuit comprises a mechanical relay, a first transistor, and a second transistor,
   wherein the switch circuit has a function of controlling electrical connection between a first terminal and a second terminal,
   wherein the mechanical relay has a function of breaking electrical connection between the first terminal and the second terminal,
   wherein the first transistor has a function of supplying first current between the first terminal and the second terminal,
   wherein the second transistor has a function of supplying second current between the first terminal and the second terminal, and
   wherein the first current is higher than the second current.

9. The power storage device according to claim 8,
   wherein the first current is on-state current flowing between a source and a drain of the first transistor and the second current is on-state current flowing between a source and a drain of the second transistor.

10. The power storage device according to claim 9,
    wherein first off-state current flowing between the source and the drain of the first transistor during off operation thereof is higher than second off-state current flowing between the source and the drain of the second transistor during off operation thereof.

11. The power storage device according to claim 8, further comprising:
    a battery protection circuit for controlling the switch circuit; and
    a charge control circuit for switching a charge mode of the battery cell,
    wherein the first transistor has a function of controlling the amount of current flowing between the first terminal and the second terminal, and
    wherein the battery protection circuit controls the amount of the current in accordance with a signal of the charge control circuit.

12. The power storage device according to claim 11,
    wherein the battery protection circuit has a function of controlling the amount of the current such that the charge mode is switched from a constant current charge mode to a constant voltage charge mode.

13. The power storage device according to claim 8,
    wherein the first transistor comprises an oxide semiconductor in a channel formation region.

14. An electric device comprising:
    the power storage device according to claim 6; and
    a housing.

15. A power storage device comprising:
a battery cell; and
a switch circuit for controlling charge and discharge of the battery cell,
wherein the switch circuit comprises a mechanical relay, a first transistor, and a second transistor,
wherein the switch circuit has a function of controlling electrical connection between a first terminal and a second terminal,
wherein the mechanical relay has a function of breaking electrical connection between the first terminal and the second terminal,
wherein the first transistor has a function of supplying first current between the first terminal and the second terminal,
wherein in the first transistor, a semiconductor layer comprising a channel formation region is formed of silicon,
wherein the second transistor has a function of supplying second current between the first terminal and the second terminal,
wherein in the second transistor, a semiconductor layer comprising a channel formation region is formed of an oxide semiconductor, and
wherein the first current is higher than the second current.

16. The power storage device according to claim 15,
wherein the first current is on-state current flowing between a source and a drain of the first transistor and the second current is on-state current flowing between a source and a drain of the second transistor.

17. The power storage device according to claim 16,
wherein first off-state current flowing between the source and the drain of the first transistor during off operation thereof is higher than second off-state current flowing between the source and the drain of the second transistor during off operation thereof.

18. The power storage device according to claim 15, further comprising:
a battery protection circuit for controlling the switch circuit; and
a charge control circuit for switching a charge mode of the battery cell,
wherein the first transistor has a function of controlling the amount of current flowing between the first terminal and the second terminal, and
wherein the battery protection circuit controls the amount of the current in accordance with a signal of the charge control circuit.

19. The power storage device according to claim 18,
wherein the battery protection circuit has a function of controlling the amount of the current such that the charge mode is switched from a constant current charge mode to a constant voltage charge mode.

20. A power storage device comprising:
a battery cell; and
a switch circuit for controlling charge and discharge of the battery cell,
wherein the switch circuit has a function of controlling electrical connection between a first terminal and a second terminal,
wherein the switch circuit comprises a first transistor,
wherein the first transistor comprises a back gate electrode,
wherein the first transistor is capable of switching first current and second current flowing between the first terminal and the second terminal during on operation, by control of voltage applied to the back gate electrode, and
wherein the first current is higher than the second current.

* * * * *